(12) United States Patent
Hancock et al.

(10) Patent No.: US 12,385,508 B2
(45) Date of Patent: Aug. 12, 2025

(54) SYSTEMS, METHODS, AND DEVICES FOR MAGNETICALLY CONNECTING STRUCTURES

(71) Applicants: Jeffrey D. Hancock, Ogden, UT (US); Christopher N. Schenck, Ogden, UT (US); Jeffrey McKade Hancock, Ogden, UT (US)

(72) Inventors: Jeffrey D. Hancock, Ogden, UT (US); Christopher N. Schenck, Ogden, UT (US); Jeffrey McKade Hancock, Ogden, UT (US)

( * ) Notice: Subject to any disclaimer, the term of this patent is extended or adjusted under 35 U.S.C. 154(b) by 0 days.

(21) Appl. No.: 19/034,420

(22) Filed: Jan. 22, 2025

(65) Prior Publication Data

US 2025/0237242 A1 Jul. 24, 2025

Related U.S. Application Data

(60) Provisional application No. 63/623,751, filed on Jan. 22, 2024.

(51) Int. Cl.
  *F16M 13/02* (2006.01)
  *F16B 1/00* (2006.01)
  *A63B 57/00* (2015.01)

(52) U.S. Cl.
  CPC .............. *F16B 1/00* (2013.01); *F16M 13/022* (2013.01); *A63B 57/00* (2013.01); *A63B 2209/08* (2013.01); *F16B 2200/83* (2023.08)

(58) Field of Classification Search
  CPC ..... F16B 1/00; F16B 2200/83; F16M 13/022; A63B 57/00; A63B 2209/08
  USPC ..................................................... 248/206.5
  See application file for complete search history.

(56) References Cited

U.S. PATENT DOCUMENTS

| 9,505,355 | B1* | 11/2016 | Cho ........................... A45F 5/00 |
| 9,610,485 | B2* | 4/2017 | Lewter ................. A63B 55/408 |
| 9,616,822 | B1 | 4/2017 | Hamilton |
| 10,113,689 | B2 | 10/2018 | Oh |
| D854,971 | S | 7/2019 | McCuskey |
| 10,988,197 | B1* | 4/2021 | Hamilton .................. F16B 2/10 |
| 11,679,315 | B2* | 6/2023 | Wisnom ............... A63B 55/408 |
| | | | 206/315.3 |
| 2014/0061261 | A1 | 3/2014 | Yakeley |
| 2023/0035430 | A1 | 2/2023 | DeCastro et al. |

FOREIGN PATENT DOCUMENTS

KR 101781342 B1 9/2017

* cited by examiner

*Primary Examiner* — Todd M Epps
(74) *Attorney, Agent, or Firm* — Maschoff Brennan

(57) ABSTRACT

An attachment system may include a base and one or more connectors. The connectors may be magnetically connected, interchangeably connected, and/or disposed in a stacked configuration. The connectors may also be interchangeably attached to the base and the base may be connected to a support or structure such as a golf cart or golf bag. The base may include a first base portion, and the first base portion may include a first surface having one or more magnets. The first surface may be configured to attach the base to a mounting surface. The base may include one or more base attachment portions, and one or more connectors may be attached to the base attachment portions. The base and/or connectors may also allow one or more accessories to be mounted to the base, and the accessories may be disposed in desired arrangements and configurations.

26 Claims, 53 Drawing Sheets

SYSTEMS, METHODS, AND DEVICES FOR MAGNETICALLY CONNECTING STRUCTURES

CROSS-REFERENCE TO RELATED APPLICATIONS

This patent application claims priority to and the benefit of U.S. Provisional Patent Application Ser. No. 63/623,751, entitled MAGNETIC CONNECTORS, filed Jan. 22, 2024, which is incorporated by reference in its entirety.

FIELD

The disclosed embodiments are generally related to systems, methods, and devices for magnetically connecting structures and, in particular, to magnetically connecting one or more connectors to a base.

BACKGROUND

Individuals often want accessories nearby and conveniently located during various activities. For example, individuals playing, watching, or participating in sporting activities may want equipment nearby. In some sports, such as golf, an individual may want accessories or equipment readily available. Conventional golf bags are used to carry golf clubs as a user plays a round of golf. Many traditional golf bags include a compartment to store a player's golf clubs and pockets for storage of smaller golf related items, such as golf balls, golf tees, gloves, and golf ball markers. The pockets usually include zippers that may be closed to keep items secure while a player carries the golf bag, and the zippers are opened when the player needs access to the items. Golf towels are frequently attached to golf bags by a clamp or a ring. Because golf towels are commonly attached to the golf bag, the player usually must be near the golf bag to use the golf towel, or the player must open or unlock the clamp or ring to detach the golf towel from the golf bag. Such a task may be bothersome, particularly in situations where the golf towel is frequently used such as playing golf in wet or rainy conditions.

Golf related accessories may also be attached to a golf cart. For example, a bracket may be used to attach a rangefinder to a golf cart. Conventional mounting brackets often include screws, rivets, or bolts to securely attach the bracket to the golf cart. Conventional mounting brackets often include multiple parts and components, and these mounting brackets may be custom made for a particular use or environment.

The claimed subject matter is not limited to embodiments that solve any disadvantages or that operate only in environments such as those described above. Rather, this background is only provided to illustrate one exemplary area where some embodiments described in the present disclosure may be practiced.

SUMMARY

The present disclosure generally relates to systems, methods, and devices for magnetically connecting structures. This Summary may introduce exemplary concepts and embodiments, which may be further described below in the Detailed Description. This Summary is not intended to identify key features or essential characteristics of the claimed subject matter, nor is it intended to be used to limit the scope of the claimed subject matter.

In various activities and settings, it may be desirable to have accessories, which may include one or more tools, supplies, equipment, gear, and the like, nearby and/or readily available. It may also be desirable to have accessories within arm's length and/or instantly accessible. It may further be desirable to have accessories conveniently stored until needed and/or stored with easy access. For instance, in sporting activities such as golf, fishing, skeet shooting, archery, and the like, it may be desirable to have accessories readily available, accessible, and close at hand.

In some activities and settings, it may be desirable to have accessories available in a given order. It may also be desirable to have accessories available in an order that may be readily changed. For instance, it may be desirable for golf related accessories to be in one order for some conditions and in a different order for other conditions. For example, some golfers may prefer accessories to be in one order when playing in certain conditions and other golfers may prefer accessories to be in a different order when playing in the same or different conditions. Additionally, or alternatively, some golfers may prefer accessories in one configuration while other golfers may prefer accessories in a different configuration. Advantageously, the disclosed attachment system may allow one or more accessories to be disposed in convenient locations, easily accessible, and/or disposed in desired configurations and arrangements. The attachment system may also allow accessories to be interchangeably connected, which may increase the functionality of the attachment system.

Conventional golf accessories, for example, are usually independently attached to support structures. For instance, a golf rangefinder may be attached to a golf cart by straps, a golf towel may be attached to a golf bag by a clamp or ring, and a golf glove may be attached to a golf bag by hook and loop fasteners such as Velcro®. Thus, each accessory may be independently attached, and each accessory may be attached using different structures or attachment methods. Therefore, it may be inconvenient, difficult, and/or time-consuming for the user to access the different accessories. Moreover, accessory mounting space may be limited, and two or more items may have to compete for the same mounting area. In addition, one location may be optimal for viewing, convenience, and/or functionality, which may prevent or impede other accessories from being positioned in desired locations. Further, one accessory mounting location may be spaced apart from another accessory mounting location by a considerable distance, which may make using the accessories inconvenient.

An attachment system may provide users with a more convenient and/or efficient way to access and utilize accessories. Exemplary embodiments of the attachment system may include a base. The base may be removable and/or magnetically attachable, and the base may allow multiple accessories to be mounted in a secure, efficient, and/or organized manner. The attachment system may also include one or more connectors, and the connectors may be attached to the base. The connectors may also be connected. For example, in an exemplary embodiment, a connector may have a first side with a first connector attachment portion and a second side with a second connector attachment portion. The first connector attachment portion may be sized and configured to be connected to a second connector attachment portion of an adjacent connector, which may allow the connectors to be connected. If desired, the connectors may be disposed in a stacked configuration. The base may include a base attachment portion, and the base attachment portion may be sized and configured to connect the base and one or more connectors. For example, the base attachment portion may be sized and configured to be connected to the first connector attachment portion and/or the second connector attachment portion of a connector. Advantageously, the base may be connected to one or more connectors, and any number of connectors may be interconnected. Additionally, the connectors may be interchangeably connected. This may allow, for example, any desired number of connectors to be connected to a base in any desired order. Because an accessory may be connected to a connector, this may allow any desired number of accessories to be connected to the base and in any desired order. This may allow one or more accessories to be disposed in a suitable configuration and/or arrangement. This may also allow the user to conveniently access one or more accessories in one location at the same time.

In some embodiments, each connector of the one or more connectors may be interchangeably connected to another connector of the one or more connectors. In some embodiments, each connector of the one or more connectors may be interchangeably connected to the base. The connectors may be releasably connected, magnetically connected, and/or sized and configured to be disposed in a stacked configuration. For example, the connectors may include one or more magnets, and the magnets may facilitate interconnection of the connectors and/or connection of the base and the connector. In an exemplary embodiment, the connector may include a magnet at least partially disposed between the first connector attachment portion and the second connector attachment portion.

In some embodiments, the connectors and/or the base may provide or include a universal type of attachment. For example, the base may include a base attachment portion, the connector may include a second connector attachment portion, and the second connector attachment portion may be sized and configured to engage the base attachment portion when a connector of the one or more connectors is connected to the base. For instance, the base attachment portion and the second connector attachment portion may have corresponding generally ring-shaped structures. The base attachment portion may have an outwardly extending generally ring-shaped structure and the second connector attachment portion may have a corresponding inwardly extending generally ring-shaped structure. The outwardly extending generally ring-shaped structure of the base attachment portion may be sized and configured to be disposed in the inwardly extending generally ring-shaped structure of the second connector attachment portion.

In some embodiments, the base attachment portion may be sized and configured to engage the first connector attachment portion when a connector of the one or more connectors is connected to the base. For example, the base attachment portion and the first connector attachment portion may have corresponding generally ring-shaped structures. The base attachment portion may have an inwardly extending generally ring-shaped structure and the first connector attachment portion may have a corresponding outwardly extending generally ring-shaped structure. The outwardly extending generally ring-shaped structure of the first connector attachment portion may be sized and configured to be disposed in in the inwardly extending generally ring-shaped structure of the base attachment portion.

Additionally, the first connector attachment portion and the second connector attachment portion of the connectors may have corresponding generally-ring-shaped structures, and the attachment portions may be disposed on opposing sides of a connector. In some embodiments, the first connector attachment portion may have an outwardly extending generally-ring shaped structure that corresponds to the inwardly extending generally ring-shaped structure of the second connector attachment portion. In exemplary embodiments, the base attachment portion, the first connector attachment portion, and the second connector attachment portion may have corresponding generally-ring shaped structures with generally the same size, shape, configuration, and/or arrangement, which may facilitate interchangeable connection of the base and connectors. For example, the first connector attachment portion may have an outwardly extending structure, the base attachment portion may have a similar outwardly extending structure, and the second connector attachment portion may have an inwardly extending structure that corresponds to the base attachment portion and/or the first connector attachment portion. This may allow one or more components of the attachment system to be substituted, swapped, and/or exchanged, as desired.

The attachment system may allow any suitable number of connectors and/or bases to be connected, and one or more accessories may be attached to the connectors and/or the bases. In some embodiments, the connectors, accessories, and/or bases may be magnetically connected, releasably connected, and/or connected in various suitable configurations and arrangements. This may allow, for example, one or more accessories to be connected and/or disposed in various suitable configurations and arrangements.

The attachment system may include one or more magnets, and the magnets may facilitate attachment of the connectors, bases, and/or accessories. For example, the connectors may have magnets that create magnetic fields, and the magnetic fields may facilitate alignment of the connectors. For instance, when two or more connectors are disposed in a stacked configuration, the magnetic fields may be generally aligned. In some embodiments, the magnetic fields may cooperate or work together, which may create a cumulative magnetic field and that may impact the strength of the magnetic attachment. Oher portions of the attachment system, such as the base, the base attachment portions, and/or the accessories, may also include magnets.

In some embodiments, the base may include a first surface, and the first surface may include one or more magnets. The base may also include a second surface, and the second surface may include one or more magnets. The first surface and the second surface may be sized and configured to attach the base to a mounting surface. In some embodiments, the first surface and the second surface may be disposed at an angle relative to each other. In some embodiments, the first surface and the second surface may be disposed at an at least substantially ninety-degree (90°) angle, such as a right angle.

The attachment system may allow one or more accessories to be ready for use individually and/or collectively, and the attachment system may allow one or more accessories to be placed in a predetermined location and/or in a preferred order. In some embodiments, a single base may be used with multiple accessories, which may allow multiple accessories to be positioned in a desired location, configuration, and/or arrangement. The attachment system may also allow one or more accessories to be removed, used, returned, and/or attached, and the accessories to be removed, used, returned, and/or attached in a group or individually.

The attachment system may include one or more magnets, and the magnets may allow the base and the connectors to be interchangeably connected. The magnets may also allow one or more accessories to be connected to the base and/or the connectors.

The attachment system may be used in a variety of situations including situations where there is not an appropriate amount of ferrous metal or a magnetic surface, such as a golf bag. In some embodiments, the base of the attachment system may be attached to the golf bag or a magnetic material (e.g., a metal plate) may be attached to the golf bag and the base may be connected to the magnetic material.

In some embodiments, one or more magnets may be used to mount the base to a mounting surface, such as a golf cart or golf bag, and the one or more magnets may work cooperatively, which may increase the strength and/or holding power of the magnets. For example, the base may have a first base portion on one side of the base and a second base portion on another side of the base. The first base portion may include one or more magnets, and the first base portion may be sized and configured to connect the base to a structure, such as a mounting surface. The second base portion may include one or more magnets, and the second base portion may be sized and configured to connect one or more accessories to the base. For instance, the second base portion may include one or more base attachment portions. In some embodiments, the magnets in the first base portion and the magnets in the second base portion may be positioned and/or aligned so that the magnetic fields are disposed in a desired arrangement and/or configuration. For instance, the one or more magnets of the first base portion and the one or more magnets of the second base portion may cooperate to create a cumulative magnetic field, which may create a magnetic field with increased strength. In some embodiments, the magnetic fields proximate the base may be enhanced, which may facilitate a more secure connection of the base to the mounting surface. In some embodiments, the enhanced magnetic force may allow for a reduction in the number, size, and/or holding power of one or more magnets, which may reduce the cost and complexity of the attachment system. In some embodiments, the connectors and/or accessories may be stacked and magnetically attached, which may further leverage the cooperative effect of the one or more magnets in the base, accessories, and/or connectors.

In some embodiments, the base and/or the connectors may allow one or more of the accessories to be quickly and easily attached and/or removed from the base. For example, the base and the connectors may be magnetically connected. The magnetic connection may allow the connectors to be quickly and easily connected and disconnected from the base. The base may be magnetically connected to the support surface, and the magnetic connection may allow the base to be quickly and easily connected and disconnected from the support surface. The stackable nature of the accessories and connectors, the fast connection and removal of the accessories and connectors from the base, and the fast connection and removal of the base from the support surface or structure may allow the attachment system to be quickly and easily assembled, disassembled, and/or stored in a compact form, such as in a storage pocket of a golf bag.

In some embodiments, the base attachment portions may be an integral part of the base as a unitary, one-piece structure. The base attachment portions may include one or more magnetic surfaces and/or one or more surfaces that may be connected to a magnet.

In some embodiments, the attachment system may be attached to a mounting surface and the mounting surface may be part of a structure, such as part of a vehicle or other means of transport. For example, the mounting surface may be part of a golf cart, and the base may be attached to the golf cart. The base may also be attached to other mounting surfaces and structures, such as other sporting-related goods and equipment, such as golf bags. In some embodiments, the attachment system could be part of a golf accessory or golf related attachment system, which may allow one or more accessories to be attached to a golf cart, golf bag, and the like. Significantly, in some embodiments, the connectors may be disposed in a stacked configuration, which may allow a plurality of golfing accessories to be conveniently attached to a golf cart, golf bag, etc.

In some embodiments, the first base portion may include two or more sides. In embodiments where the first base portion includes two or more sides, two of the two or more sides may be disposed at a substantially right angle. At least one of the two or more sides may include one or more magnets. For example, a first side may include one or more magnets, a second side may include one or more magnets, and the first side may be disposed at an angle relative to the second side. Thus, in an exemplary embodiment, the magnets on the first side of the first base portion may be sized and configured to be attached to a first portion of a golf cart, and the magnets on the second side of the second base portion may be sized and configured to be attached a second portion of the golf cart. Additionally, or alternatively, the base may be attached to a support structure or surface by one or more fasteners such as bolts, screws, straps, clamps, adhesives, and the like.

In some embodiments, at least one magnet may be disposed in the first base portion, and the at least one magnet may be at least partially disposed, recessed, and/or enclosed within a border. In some embodiments, the border may include a high friction surface. The first base portion may be sized and configured to facilitate attachment of the base to a support structure or surface, such as a portion of a golf cart.

In some embodiments, the second base portion may include one or more magnets, and the one or more magnets may be sized and configured to allow one or more accessories to be magnetically mounted to the base. For example, a rangefinder and a phone holder may be magnetically attached to the base via the one or more magnets. In some embodiments, the first base portion and the second base portion may include at least one magnet and a magnetic field of the at least one magnet of the first base portion and a magnetic field of the at least one magnet of the second base portion may cooperate to create a cumulative magnetic field.

In some embodiments, a connector may be magnetically attached to the base by the base attachment portions. In some embodiments, a magnetic field of the base attachment portions and a magnetic field of the connector may cooperate to create a cumulative magnetic field. The magnets and magnetic structures may be at least partially disposed, recessed, and/or enclosed in the connectors and/or base, which may help prevent the magnets and magnetic structures from damage or harm In some embodiments, the base attachment portions may include one or more magnets and/or an engagement portion, and a connector may be sized and configured to be magnetically attached to the base attachment portions. The connector may include a connector attachment portion that engages the engagement portion of the base attachment portion when the connector is attached to the base attachment portion.

In some embodiments, the connectors may be disposed in a stacked configuration. This may allow any desired number of connectors to be interconnected and/or connected to the base.

One skilled in the art, after reviewing this disclosure, may appreciate that the base and connectors may include one or more magnets, magnetic structures, metal or metallic portions, and the like, and these portions may be integrally formed with the base or connector as part of a unitary, one-piece structure. In addition, the one or more magnets, magnetic structures, metal or metallic portions, and the like may be sized and configured so that one or more magnetic fields are aligned and/or disposed in desired configurations. This may allow, for example, the strength of the magnetic fields to be increased and/or allow one or more magnetic portions to be aligned. Advantageously, the magnetic fields may allow the base and/or the connectors to be attached to other objects and structures, including items such as golf clubs. The magnetic fields may cooperate, which may increase the strength of the magnetic fields, and that may allow the number, size, and/or holding power of the magnets to be decreased, which may decrease costs, reduce size, and/or simply manufacturing or assembly.

In some embodiments, the connector attachment or engagement portions and/or the base attachment portions may include one or more protruding or outwardly extending portions and/or one or more indented or inwardly extending portions. For example, the first connector attachment may include a protruding or outwardly extending portion, and the first connector attachment may have a generally circular and/or ring-shaped configuration. The second connector attachment may include a debossed or inwardly extending portion, and the second connector attachment may have a generally circular and/or ring-shaped configuration. In some embodiments, the first and second connector attachment portions may be sized and configured to facilitate attachment of the connectors to the base and/or other connectors. For instance, the outwardly and inwardly extending portions may be sized and configured to cooperate with corresponding outwardly and inwardly extending portions of an adjacent and/or stacked connector, which may facilitate attachment, alignment, and/or stacking of the connectors. In some embodiments, a connector of the one or more connectors may include a locking mechanism configured to lock the connector to the base when the connector is attached to the base.

In some embodiments, the connectors may include one or more accessory attachment mechanisms. The accessory attachment mechanisms may be sized and configured to attach the connectors and one or more accessories. In some embodiment, the accessory attachment mechanisms may be sized and configured to be attached to one or more golf accessories such as towels, brushes, divot repair tools, rangefinders, GPS devices, phones, and the like. For example, a towel may be attached to a first connector via a first accessory attachment mechanism, a brush may be connected to a second connector via a second accessory attachment mechanism, a divot repair tool may be connected to a third connector via third accessory attachment mechanism, a rangefinder may be connected to a fourth connector via a fourth accessory attachment mechanism, and the like. In some embodiments, the connectors may allow the accessories to be connected in any desired order and/or to any desired structure, such as a golf cart or golf bag. Additionally, and/or alternatively, the connectors may allow the accessories to be connected in any desired order to a base, and the base may be connected to any desired structure, such as a golf cart or golf bag. In some embodiments, a connector may be integrated with an accessory as part of a one-piece structure.

In some embodiments, the base may be sized and configured to provide a more secure, rigid, and/or permanent attachment to a desired structure, and the connectors may be sized and configured to provide a connection that is easier to release or disengage. Thus, in some embodiments, the connector may be easier to remove or release from the base, another connector, or a structure than the attachment of the base to a structure. One skilled in the art may appreciate, after reviewing this disclosure, that the attachment of the connectors and/or base may have different features, mechanisms, and/or strengths depending, for example, upon the intended use of the system.

According to some embodiments, an attachment system may include a base, and the base may include a first base portion and a second base portion. In some embodiments, the first base portion may include a first magnetic structure and a second magnetic structure. The first magnetic structure and the second magnetic structure may be spaced apart by a distance, and the first magnetic structure and the second magnetic structure may be sized and configured to allow the base to be magnetically attached to a support surface. In some embodiments, the second base portion may include a first base attachment portion and a second base attachment portion. The first base attachment portion and the second base attachment portion may be spaced apart by a distance. In these and other embodiments, the first base attachment portion may be sized and configured to allow a first connector to be magnetically attached to the base and the second base attachment portion may be sized and configured to allow a second connector to be magnetically attached to the base.

In some embodiments, a magnetic field of the first magnetic structure of the first base portion may cooperate with a magnetic field of the first base attachment portion. In some embodiments, a magnetic field of the second magnetic structure of the first base portion may cooperate with a magnetic field of the second base attachment portion.

In embodiments where a first connector is connected to the first base attachment portion, a magnetic field of the first connector may cooperate with the magnetic field of the first base portion and the magnetic field of the first base attachment portion. In embodiments where a second connector is attached to the second base attachment portion, a magnetic field of the second connector may cooperate with the magnetic field of the first base portion and the magnetic field of the second base attachment portion.

Advantageously, the attachment system may allow the base to be securely connected to a structure, such as a golf cart or golf bag, which may prevent the base from inadvertently moving. The attachment system may also allow the connectors to be readily detachable, which may facilitate use of the connectors and/or accessories. For example, in some circumstances, a golfer may desire to use one accessory, such as a rangefinder, and in other circumstances a golfer may desire to use more than one accessory, such as a towel and divot repair tool. The attachment system may allow a user to select the desired accessories quickly and easily. The attachment system may also provide a convenient and readily accessible location for the accessories, and the accessories may be used by one or more users. In addition, the attachment system may allow the accessories to be arranged in any desired order, configuration, and/or arrangement, and may allow the user to change the order, configuration, and/or arrangement at any time. Further, the attachment system may be used in different environments, and the attachment system may be customized as desired. Additionally, the attachment system may help prevent accessories from being lost, misplaced, or inadvertently left behind.

The attachment system may allow one or more accessories to be attached to a structure such as a golf cart, golf bag, or other suitable structures such as a vehicle. If desired, the attachment system may be used in connection with various types of accessories and the attachment system may include a universal type of connector to facilitate use with various accessories. For example, the attachment system may be used to attach any desired accessory to an appropriate apparatus.

After reviewing this disclosure, one skilled in the art may appreciate that words such as "attached," "connected," and "coupled" may mean one or more items are connected, although not necessarily directly, and not necessarily mechanically, and may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed configuration, the term "substantially" may be substituted with "within [a percentage] of" what is specified, where the percentage includes about 0.1 percent, about 1 percent, about 5 percent, about 10 percent, and about 15 percent.

The feature or features of one embodiment or configuration may be applied to other embodiments or configurations, even though not described or illustrated, unless expressly prohibited by this disclosure or the nature of the configurations. Some details of the above embodiments and configurations, and other embodiments and configurations, are described below.

The various aspects and advantages of the exemplary embodiments may be realized and/or achieved by one or more of the elements, features, and/or combinations of elements and features. Both the foregoing general description and the following detailed description are given as examples, and these descriptions are explanatory and are not restrictive of the invention.

These and other aspects, features and advantages may become more fully apparent from the following brief description of the drawings, the drawings, the detailed description, and appended claims.

BRIEF DESCRIPTION OF THE DRAWINGS

The appended drawings contain figures of example embodiments to further illustrate and clarify the above and other aspects, advantages, and features of the present invention. It will be appreciated that these drawings depict only example embodiments of the invention and are not intended to limit its scope. Additionally, it will be appreciated that while the drawings may illustrate preferred sizes, scales, relationships and configurations of the invention, the drawings are not intended to limit the scope of the claimed invention. Example embodiments will be described and explained with additional specificity and detail through the use of the accompanying drawings in which:

DETAILED DESCRIPTION

Figure 1:
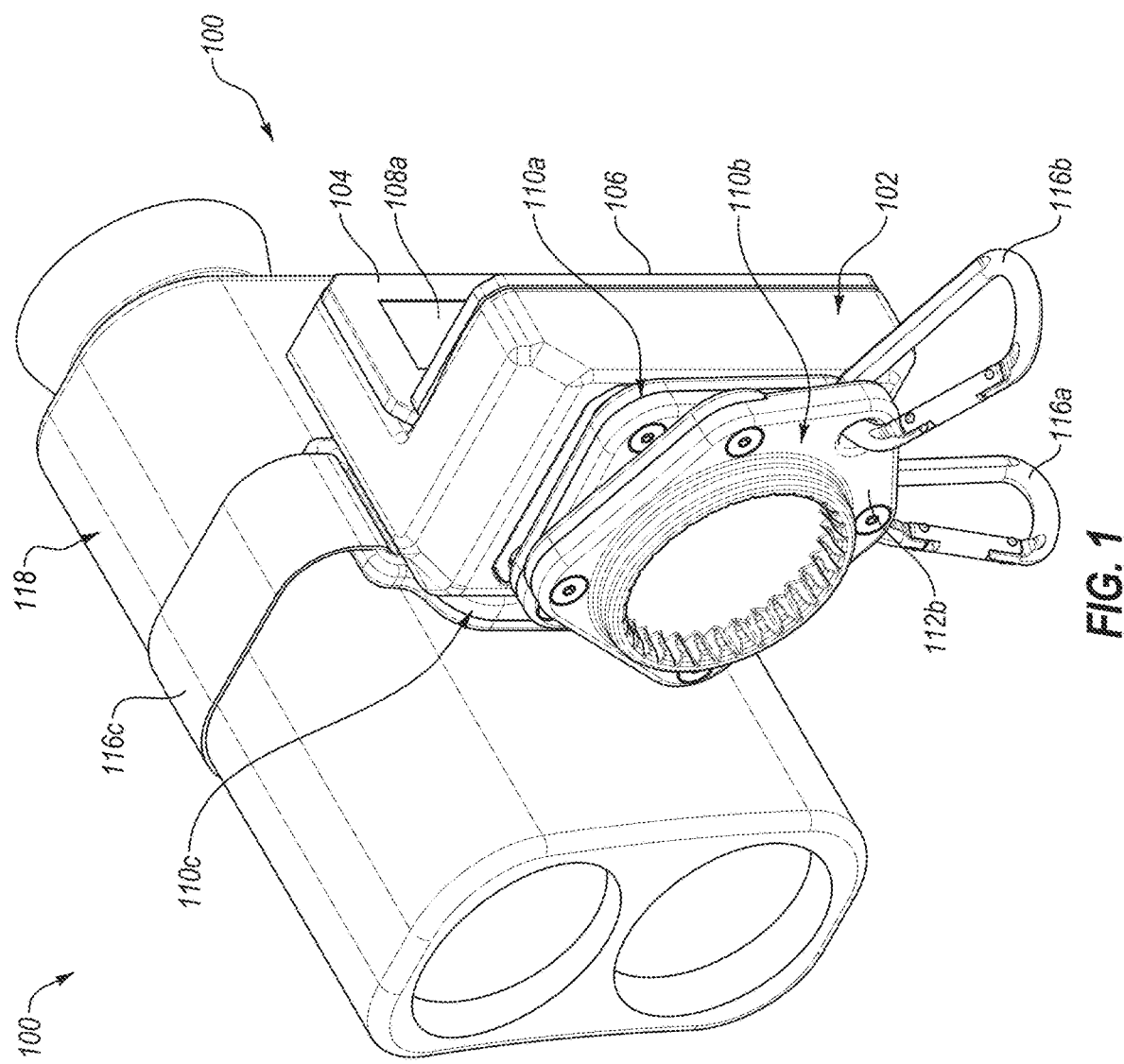
FIG. 1 is a front perspective view of an exemplary attachment system illustrating an exemplary base, exemplary connectors, and an exemplary accessory (e.g., a rangefinder) attached to the base by an exemplary connector.

The present disclosure is directed towards an attachment system, which may include various methods and apparatus, that may be used to attach one or more accessories to a structure such as a golf cart or golf bag. The present disclosure, however, is not limited to an attachment system that may be used to attach one or more accessories to a structure such as a golf cart or golf bag. It will be understood that, in light of the present disclosure, the attachment system disclosed herein may be successfully used in connection with other types of structures and devices, and these structures and devices may be movable or immovable.

Additionally, to assist in the description of the attachment system, words such as top, bottom, front, rear, right and left may be used to describe the accompanying figures. It will be appreciated, however, that the attachment system may be disposed in a variety of desired positions, including various angles, sideways, and even upside down. Further, the drawings may show the attachment system, along with various components, attachments, and accessories, to scale. The drawings, however, are not necessarily to scale and the attachment system, components, attachments, and/or accessories may have other suitable shapes, sizes, configurations, and arrangements. Additionally, in the figures, features with the same reference numbers may indicate similar features, and these features may have similar structures and/or functions.

Advantageously, the attachment system may allow one or more accessories to be attached to a structure such as a golf cart or golf bag. After reviewing this disclosure, one skilled in the art may appreciate that the attachment system may be used in connection with other structures or articles, such as other types of sporting equipment, vehicles, and the like. After reviewing this disclosure, one skilled in the art may also appreciate that the attachment system may allow different accessories to be used, different accessories to be combined in different orders or arrangements, one or more accessories to be used individually and/or in combination, and/or one or more accessories to be used interchangeably. Additionally, after reviewing this disclosure, one skilled in the art may appreciate that the attachment system may offer universal type of attachments that may be used in connection with various desired structures, accessories, and the like. Further, after reviewing this disclosure, one skilled in the art may appreciate that the attachment system may increase functionality by, for example, allowing one or more accessories to be readily accessible, disposed in a desired location, disposed in a desired order or sequence, used concurrently or independently, and the like. In addition, after reviewing this disclosure, one skilled in the art may appreciate that one or more parts and components of the attachment system may be used simultaneously, autonomously, and in any desired combination. After reviewing this disclosure, one skilled in the art may appreciate that the attachment system, and its various parts and components, may be successfully used in connection with a wide variety of applications and environments.

The attachment system may allow one or more accessories to be attached simultaneously to a structure such as a golf cart or golf bag. If desired, the attachment system may be used in connection with various types of accessories and the attachment system may include a universal type of connector to facilitate use with different accessories. For example, the attachment system may include one or more universal type connectors, and the connectors may increase the functionality of the attachment system.

As shown in the accompany figures and described herein, the attachment system is generally described in connection with sports related equipment, such as golf related accessories, and the attachment system is generally described as being attached to a structure such as a golf cart or golf bag. It will be appreciated that "golf cart" may refer to any suitable type of golf cart including motor driven (including gas-powered or electric), human-driven (including push carts and pull carts), semi-autonomous, autonomous, and the like. It will also be appreciated that "golf bag" may refer to any suitable type of golf bag including carry bags, carts bags, tour bags, travel bags, stand bags, and the like. Additionally, it will be appreciated that "accessory" may refer to any item, part, component, device, tool, equipment, gear, article, and the like that may be added, attached, connected, or disconnected from the attachment system. For example, golf related accessories may refer to towels, brushes, divot repair tools, head covers, gloves, ball markers, rangefinders, GPS devices, phones, cigar holders, and the like. It will be appreciated that golf related accessories may include other items such as sound equipment (e.g., portable speakers, Bluetooth® speakers), video recording equipment (e.g., cameras), lights, racks, supports for carrying equipment (e.g., golf clubs, umbrellas, rain gear), and the like. "Accessory" may also include other implements and devices, depending, for example, upon the intended use of the attachment system.

As shown in FIGS. 1-4, an exemplary attachment system 100 may include an exemplary base 102 and one or more exemplary connectors 110. The base 102 may be sized and configured to be attached to a surface or structure, such as a golf cart or golf bag, and the base may be sized and configured to be attached to the one or more connectors 110. The connectors 110 may allow one or more exemplary accessories 118 to be attached to the attachment system 100. For example, as shown in FIGS. 1-4, the attachment system 100 may allow the accessory 118, such as a rangefinder, to be attached to the base 102.

In some embodiments, the base 102 may include a first surface or side 104 with one or more magnets or magnetic structures 108a and a second surface or side 106 with one or more magnets or magnetic structures 108b. The magnets 108 may be sized and configured to magnetically attach the base 102 to a surface (e.g., a golf cart). In some embodiments, the magnets 108 may be neodymium magnets, ferrite/ceramic magnets, or any other suitable magnet for magnetically attaching the base 102 to a surface. In these and other embodiments, the magnets 108 may be magnetic plates (e.g., ferromagnetic plates), magnetic strips, magnetic tape, or any other suitable magnet for magnetically attaching the base 102 to a mounting surface.

The one or more magnets 108a on the first surface 104 and the one or more magnets 108b on the second surface 106 may be sized and configured so that the magnetic fields are at least partially aligned and/or complementary. This may facilitate, for example, secure attachment of the base 102 to the golf cart or golf bag. If desired, the one or more magnets 108a and/or 108b may be sized and configured to allow the magnetic fields to be aligned and/or positioned in a desired orientation. This may allow, for example, stronger magnetic fields to be created. This may also allow smaller and/or less powerful magnets to be used.

Additionally, the magnets 108 and/or magnetic structures of the base 102 may be sized and configured to work with the one or more connectors 110. In some embodiments, the connectors 110 may include one or more magnets and/or magnetic structures, and the base 102 may include one or more magnets and/or magnetic structures. Advantageously, the magnets and/or magnetic structures of the connectors 110 and base 102 may be sized and configured so that the corresponding magnetic fields are aligned and/or positioned in the desired orientation. This may allow the strength of the magnetic fields to be increased and/or decreased, and this may facilitate connection of the connectors 110 and/or base 102.

Figure 2:
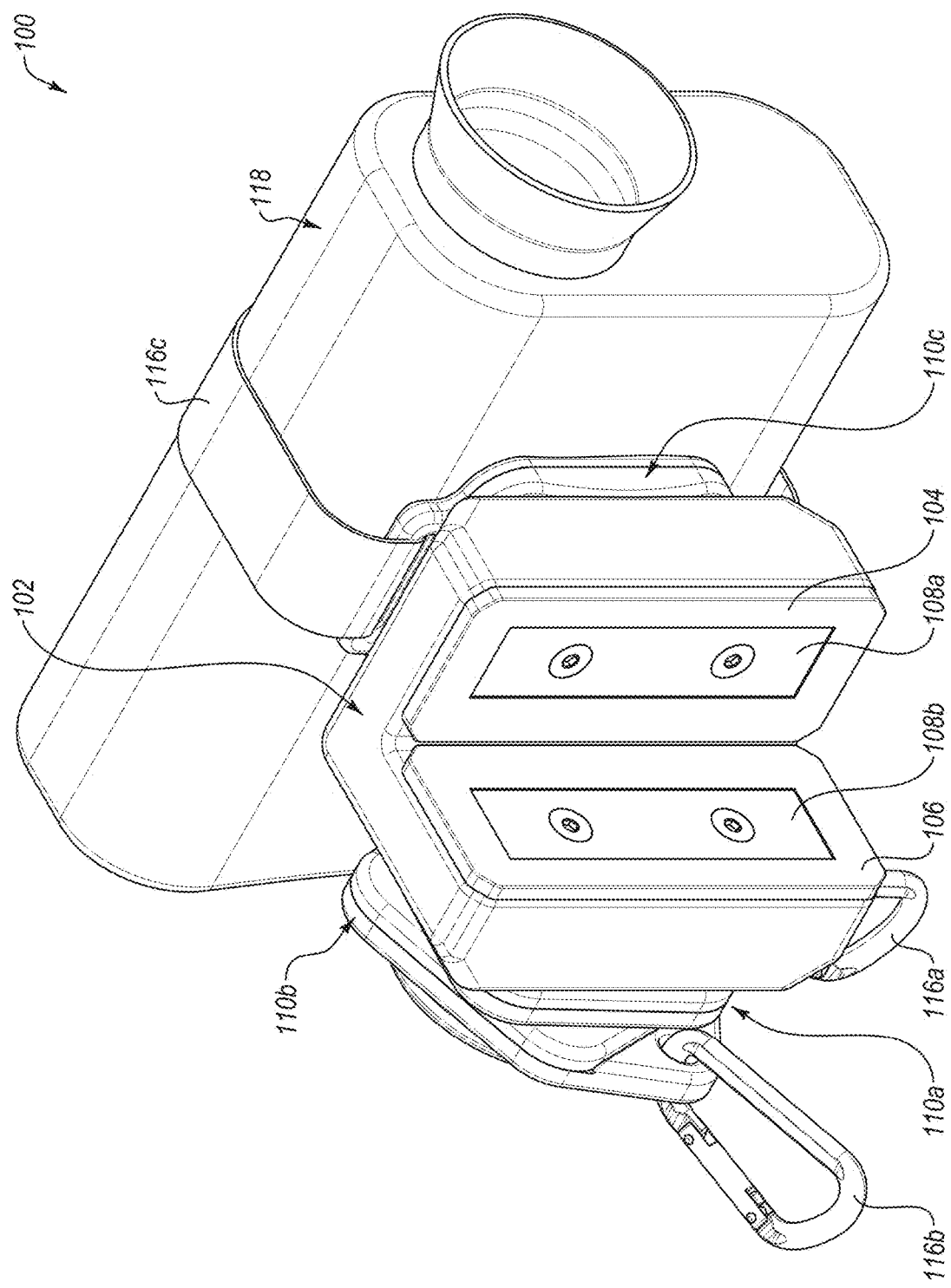
FIG. 2 is a rear perspective view of the exemplary attachment system shown in FIG. 1.

As shown in FIG. 2, the base 102 may include one or more magnets 108 and the magnets 108 may be attached to the base 102 by one or more fasteners. The magnets 108 may be at least partially surrounded by a border, and the border may provide cushioning, a friction surface, and/or the like. In some embodiments, the border may provide a gap, space, and/or cushioning between the base 102 and a mounting surface or structure, and the border may provide protection for the one or more magnets 108. If desired, an upper surface of the one or more magnets 108 may be disposed below an upper surface of the border, which may help prevent direct contact between the magnets 108 and the mounting surface. The magnets 108 may also be recessed, which may help prevent forces or impacts from being directly applied to the magnets. The border may be constructed from materials such as rubber, plastic, silicone, polyurethane, high density foam, and/or other similar materials, and the border may be configured to be at least partially disposed between the base 102 and a mounting surface. Alternatively, or additionally, the border may include properties that are mark resistant.

As shown in FIGS. 1-4, in some embodiments, the first surface 104 and the second surface 106 may be disposed at a substantially right angle or a substantially ninety-degree (90°) angle. As shown in the accompanying figures, the base 102 may be substantially L-shaped. The first surface 104 and the second surface 106 may also be disposed at less than a ninety-degree angle such that the first surface 104 and the second surface 106 form an acute angle. The first surface 104 and the second surface 106 may also be disposed at more than a ninety-degree angle such that the first surface 104 and the second surface 106 form an oblique angle. In some embodiments, the first surface 104 and the second surface 106 may be curved and an interface between the first surface 104 and the second surface 106 may be rounded such that the first surface 104 and the second surface 106 form a single integrated surface with one or more magnets 108.

In some embodiments, the portion of the base 102 including the first surface 104 and/or the second surface 106 may be configured to be releasably attached to a mounting surface. For example, the mounting surface may be a surface or portion of a vehicle (e.g., a golf cart, an ATV, a UTV, or other means of transport), sports-related equipment (e.g., a golf bag, push cart), and the like.

In some embodiments, the one or more magnets 108a of the first surface 104 may form a magnetic field that cooperates with a magnetic field from the one or more magnets 108b of the second surface 106. In these embodiments, the cooperation of the magnetic fields may create a cumulative magnetic field enhancing the magnetic fields such that the base 102 may have a more secure attachment to the mounting surface.

Figure 7:
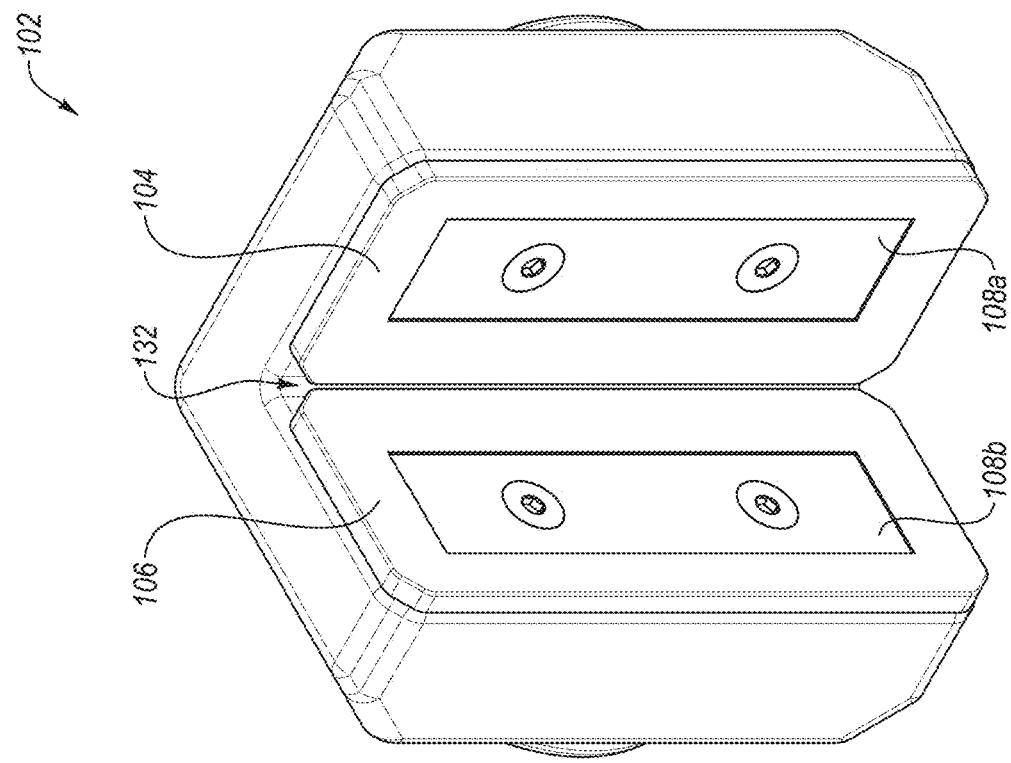
FIG. 7 is a front perspective view of an exemplary base.

The base 102 may include one or more base attachment portions 120, and the base attachment portions may be sized and configured to be attached to at least one of the one or more connectors 110. For example, the base attachment portions 120 may be sized and configured to be attached to one or more connectors, such as a first connector 110a, a second connector 110b, and/or a third connector 110c. In some embodiments, the base 102 may include multiple base attachment portions 120. For example, the base 102 may include a first base attachment portion 120a and a second base attachment portion 120b (such as shown in FIG. 7).

In some embodiments, the base attachment portions 120 may be sized and configured to be releasably attached to the accessory 118. For example, as shown in FIG. 1, the base attachment portions 120 may be releasably attached to the accessory 118, such as a rangefinder. In some embodiments, the base attachment portions 120 may include one or more magnets, and the one or more magnets may be sized and configured to allow one or more accessories 118 to be magnetically attached to the base 102. In some embodiments, these magnets may be similar to or the same as the magnets 108.

For example, if the base attachment portions 120 includes one or more magnets, a magnetic field may be created. The one or more magnets of the base attachment portions 120 may cooperate with the one or more magnets 108, which may create a cumulative and/or stronger magnetic field.

In some embodiments, the one or more connectors 110 may include a first side 112 and a second side 114. The first side 112 may include a first connector attachment or engagement portion 122 and the second side 114 may include a second connector attachment or engagement portion 124. In some embodiments, the connectors 110 may include a body or a central portion, and the first connector attachment portion 122 may be disposed on the first side 112 of the body and the second connector attachment portion 124 may be disposed on the second side 114 of the body. In some embodiments, the attachment system 100 may include multiple connectors 110. For example, the attachment system 100 may include the first connector 110a, the second connector 110b, and the third connector 110c.

In some embodiments, the connectors 110 may include a magnet or a magnetic structure, and the magnet may be at least partially disposed between the first connector attachment portion 122 and the second connector attachment portion 124. The magnet may be similar to the magnets 108 described previously. For example, the magnet may be a neodymium magnet. In some of these embodiments, the connectors 110 may be sized and configured to be magnetically attached to the base attachment portions 120. In some embodiments, a magnetic field of the base attachment portions 120 and a magnetic field of the connector 110 may cooperate, which may create a cumulative magnetic field.

In some embodiments, the connectors 110 may be sized and configured to be connected. For example, the first connector attachment portion 122 may be sized and configured to be connected or engaged with the second connector attachment portion 124 of an adjacent connector 110 when the connectors 110 are disposed in a stacked, aligned, and/or connected configuration. For example, and as shown in FIG. 1, the first connector 110a and the second connector 110b may be disposed in a stacked configuration on the base 102, and the first connector attachment portion 122a of the first connector 110a may be engaged with the second connector attachment portion 124b of the second connector 110b.

In some embodiments, each connector 110 of the one or more connectors 110 may be interchangeably connected to another connector 110 of the one or more connectors 110 and/or the base 102. For example, the first connector 110a may be connected to the second connector 110b and/or the third connector 110c. In these and other embodiments, each connector 110 of the one or more connectors 110 may be interchangeably connected to the base 102. For example, the first connector 110a, the second connector 110b, and/or the third connector 110c may all be interchangeably connected to the base attachment portions 120.

In some embodiments, the one or more of the connectors 110 and/or the base attachment portions 120 may have similar or corresponding features, constructions, attachment mechanisms, and the like, which may allow the connectors 110 to be connected and/or interchangeably connected to each other and/or may allow the connectors 110 to be connected and/or interchangeably connected to the base attachment portions 120. In addition, in some embodiments, the connectors 110 may be interchangeable and/or disposed in a stacked configuration. Further, in some embodiments, the connectors 110 may include at least a portion of a universal type of connector, which may allow the one or more connectors 110 to be disposed in various configurations and arrangements. For instance, the first connector attachment portion 122 and/or the second connector attachment portion 124 may be similar in shape and size and may have corresponding shapes and configurations as the base attachment portions 120.

For example, the first connector attachment portion 122 may include one or more protruding or outwardly extending portions and the second connector attachment portion 124 may include one or more corresponding indented or inwardly extending portions. As shown in FIGS. 1-4, the outwardly extending portions of the first connector attachment portion 122 may have a generally circular and/or ring-shaped configuration, and the second connector attachment portion 124 on the second side 114 of the connector 110 may have a corresponding generally circular and/or ring-shaped configuration that extends inwardly.

In some embodiments, the first connector attachment portion 122 and the second connector attachment portion 124 may have any other corresponding shapes, sizes, configurations, and arrangements, which may facilitate attachment of the connectors 110. For example, the first connector attachment portion 122 may have outwardly extending portions that may be geometrically shaped (e.g., triangular, square, rectangular, pentagonal, hexagonal, heptagonal, octagonal, or any other suitable geometric shape) and the second connector attachment portion 124 may have inwardly extending portions that may be shaped to correspond to the geometric shape of the first connector attachment portion 122. In another example, the first connector attachment portion 122 may have outwardly extending portions that may be non-geometrically shaped and the second connector attachment portion 124 may have inwardly extending portions that may be shaped to correspond to the shape of the first connector attachment portion 122. The corresponding outwardly and inwardly extending portions of the connectors 110 may also allow adjacent connectors 110 to be disposed in an aligned and/or stacked configuration. In some embodiments, the second connector attachment portion 124 may have an outwardly extending portion, and the first connector attachment portion 122 may have an inwardly extending portion.

In some embodiments, the base attachment portion 120 may include one or more engagement portions 128. The one or more engagement portions 128 may extend outwardly, and the second connector attachment portion 124 may include one or more engagement portions, which may extend inwardly. In some embodiments, the base attachment portions 120 and the first connector attachment portion 122 or the second connector attachment portion 124 may have corresponding structures. For example, as shown in FIGS. 1-4, the base attachment portions 120 may have an outwardly extending generally-ring shaped structure, which may correspond with the second connector attachment portion 124, which may have an inwardly extending generally-ring shaped structure. In another example, the base attachment portions 120 may have an inwardly extending generally ring-shaped structure, which may correspond with the first connector attachment portion 122, which may have an outwardly extending generally ring-shaped structure.

The engagement portions 128 of the base attachment portions 120 may be any suitable shape, size, or configuration to correspond and/or engage with the second connector attachment portion 124 or the first connector attachment portion 122. For example, the engagement portions 128 may be geometrically shaped (e.g., triangular, square, rectangular, pentagonal, hexagonal, heptagonal, octagonal, or any other suitable geometric shape) or non-geometrically shaped. In some embodiments, the shape of the engagement portions 128 may correspond to one or more portions of the second connector attachment portion 124 or one or more portions of the first connector attachment portion 122. In some embodiments, a portion of the first connector attachment portion 122 may correspond with the engagement portion 128 but not with the second connector attachment portion 124. In some embodiments, a portion of the second connector attachment portion 124 may correspond with the engagement portion 128 but not with the first connector attachment portion 122.

In some embodiments, the connectors 110 may include an accessory attachment mechanism 116, which may facilitate attachment of the connector 110 and an accessory 118. For example, the accessory attachment mechanism 116 may be a fastener such as a carabiner, a clamp, a D-ring, a line, a hook and loop fastener (e.g., Velcro®), a clip, a band, a strap, a snap button, a tether, an adhesive, a magnet, a combination of attachment mechanisms, or other suitable attachment mechanism. For example, the accessory attachment mechanism 116 may allow accessories 118 such as towels, brushes, divot repair tools, ball markers, phone cradles, head covers, gloves, rangefinders, GPS devices, phones, speakers, cameras, lights, pouches, and the like to be attached or connected to the connector 110. In some embodiments, each connector 110 may have the accessory attachment mechanism 116. For example, the first connector 110a may have a first accessory attachment mechanism 116a (e.g., a carabiner), the second connector 110b may have a second accessory attachment mechanism 116b (e.g., a carabiner), and the third connector 110c may have a third accessory attachment mechanism 116c (e.g., a strap).

In some embodiments, different connectors 110 may have different accessory attachment mechanisms 116 depending, for example, on the accessory to be attached. For example, as shown in FIGS. 1-4 the accessory 118, such as a rangefinder, may be attached to the third connector 110c via an accessory attachment mechanism 116c, which may be a strap. In another example, as shown in FIGS. 1-4, the accessory 118, such as a towel, may be attached to the first connector 110a via an accessory attachment mechanism 116a, which may be a carabiner. In some embodiments, the connectors 110 may include multiple accessory attachment mechanisms 116 to allow multiple accessories 118 to be attached.

In an example operation of the attachment system 100, the base 102 may be magnetically attached to a mounting surface via the one or more magnets 108a on the first surface 104 and/or the one or more magnets 108b on the second surface 106. For example, the one or more magnets 108a may magnetically attach the first surface 104 to one side of a golf cart roll cage and the one or more magnets 108b may magnetically attach the second surface 106 to another side of a golf cart roll cage. The accessory 118 (e.g., a rangefinder) may be attached to the third connector 110c via the third accessory attachment mechanism 116c, which may be a strap. The accessory 118 may be magnetically attached to the second base attachment portion 120b via the third connector 110c. In some embodiments, the third connector 110c may have a magnet disposed between the first side 112c of the third connector 110c and the second side 114c of the third connector 110c, the second base attachment portion 120b may include a magnet, and/or the first surface 104 of the base 102 may include one or more magnets 108a, all or any of which may contribute to the magnetic attachment of the third connector 110c and/or the accessory 118 to the base 102. The first connector 110a may be magnetically attached to the first base attachment portion 120a, and the second connector 110b may be magnetically attached to the first connector 110b. Thus, the first connector 110a and the second connector 110b may be disposed in a stacked configuration. In some embodiments, the first connector 110a and/or the second connector 110b may have a magnet disposed between the first sides (112a and 112b, respectively) of the connectors 110 and the second sides (114a and 114b, respectively), the first base attachment portion 120a may include a magnet, and/or the second surface 106 of the base 102 may include one or more magnets 108b, all or any of which may contribute to the magnetic attachment of the first connectors 110a, the second connector 110b, and/or the accessories 118 to the base 102.

The attachment system 100 may allow for multiple accessories to be easily accessed and/or conveniently located during an activity. For example, during an activity such as golf, an accessory 118, such as a rangefinder, may be attached to the base 102 by a connector 110. The accessory 118, such as the rangefinder, may be attached to the connector 110 by the accessory attachment mechanism 116, such as a strap (e.g., as shown in FIG. 1, by the third accessory attachment mechanism 116c). The accessory 118, such as a towel, may be secured to one of the connectors 110 by the accessory attachment mechanism 116, such as a carabiner (e.g., as shown in FIG. 1, the first accessory attachment mechanism 116a). The accessory 118, such as a ball marker, may be secured to one of the connectors 110. For example, the ball marker may be magnetically connected to the first side 112 and/or the second side 114 of the connector 110. As a result, the users may access multiple accessories 118 simultaneously without having to search for the accessories 118 in a golf bag or elsewhere.

Figure 6:
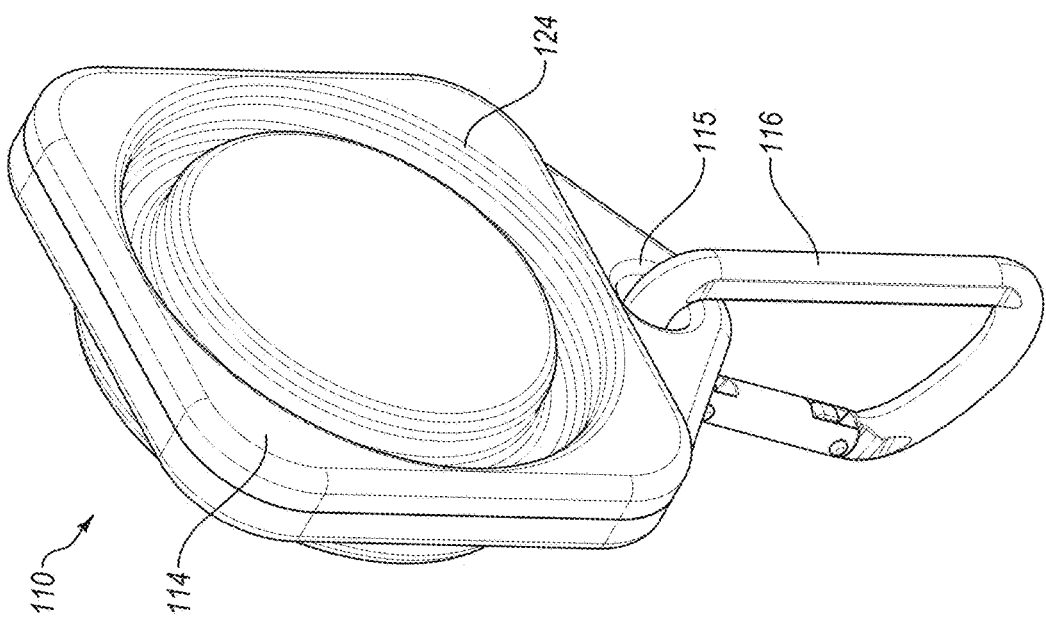
FIG. 6 is a rear perspective view of the exemplary connector shown in FIG. 5.
Figure 5:
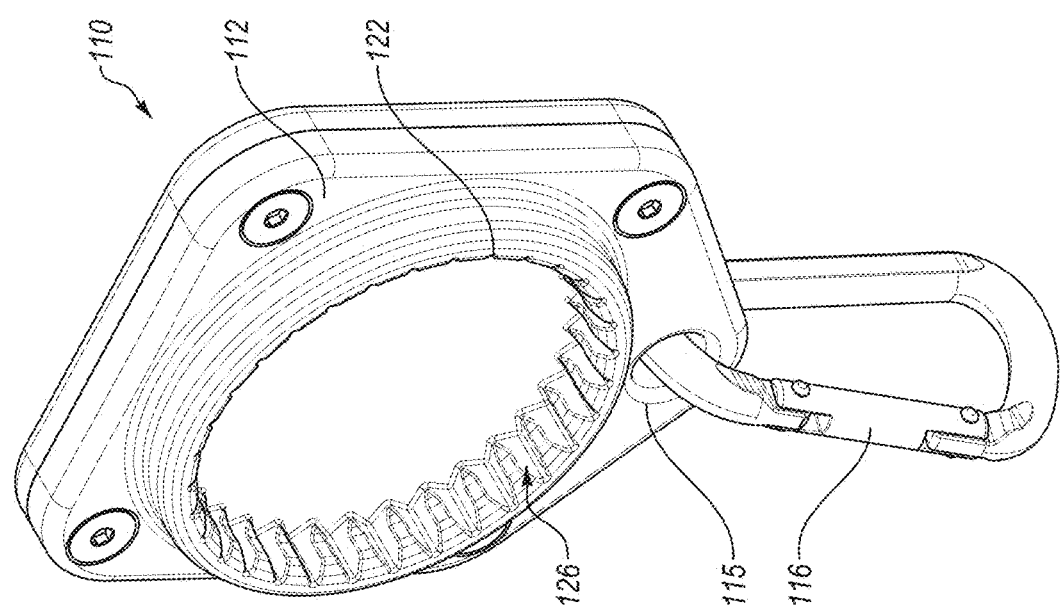
FIG. 5 is a front perspective view of an exemplary connector.

As seen in FIGS. 5 and 6, the first side 112 of the connector 110 may include the first connector attachment portion 122 and the second side 114 of the connector may include the second connector attachment portion 124. In some embodiments, the connector 110 may include one or more accessory attachment mechanisms 116. In some of these embodiments, the accessory attachment mechanism 116 may be attached to the connector 110 at an attachment point 115.

Figure 3:
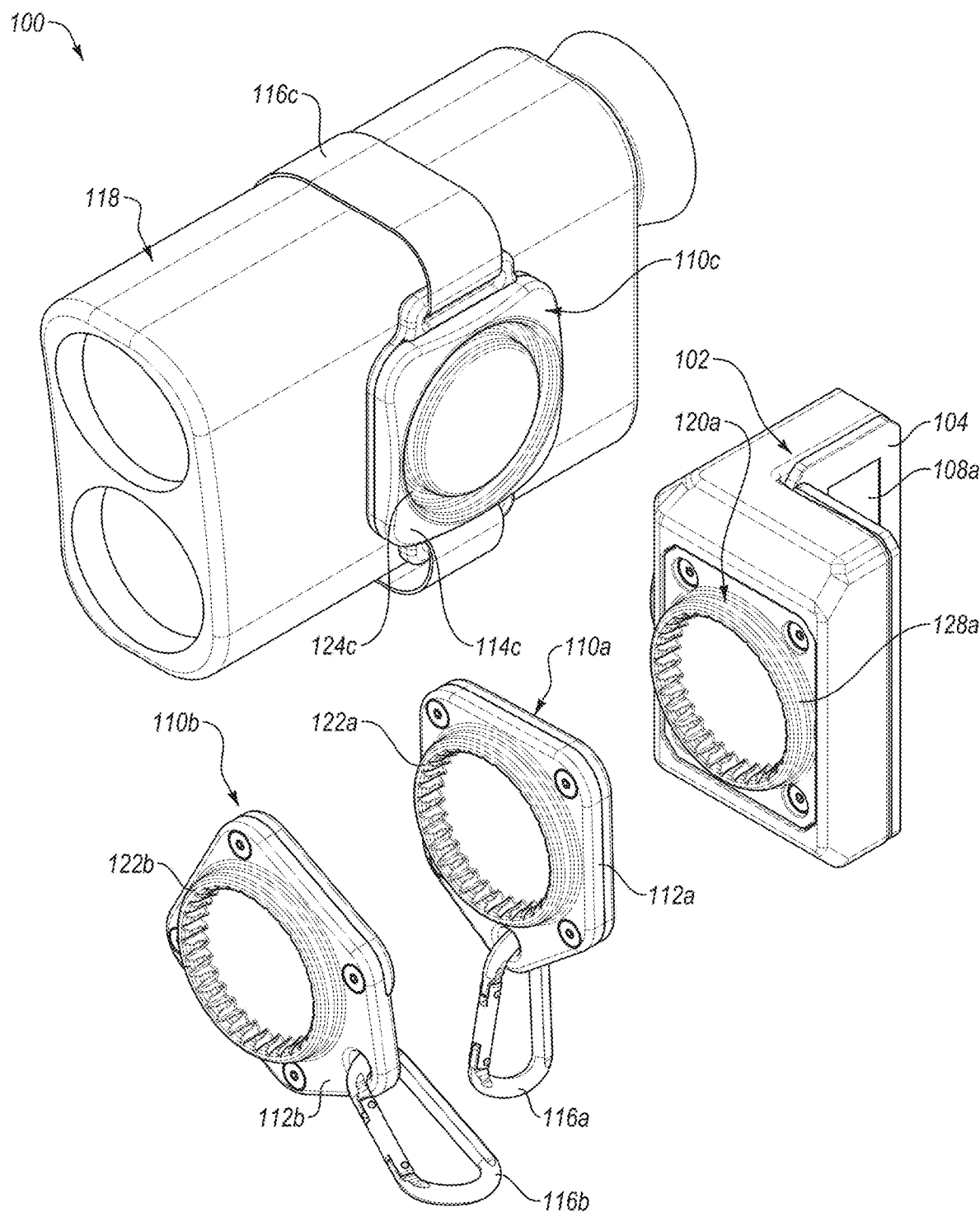
FIG. 3 is a front exploded view of the exemplary attachment system shown in FIG. 1.

As illustrated in FIGS. 1, 3, and 5, the connectors 110 may include one or more engaging portions 126, such as inwardly and/or outwardly extending protrusions. In some embodiments, the engaging portions 126 may be protrusions, teeth, splines, or other structures, and these structures may be sized and configured to prevent or impede rotation of the connector 110. In some embodiments, the engaging portions 126 may be sized and configured to engage one or more structures, such as corresponding engaging portions. For example, the engaging portions 126 on one connector 110 may be sized and configured to engage engaging portions on another connector 110, the base 102, the base attachment portions 120, and/or the accessory 118. For example, the first side 112a of the first connector 110a may include engaging portions 126 on an interior portion of a outwardly extending generally-ring shaped structure and the second side 114b of the second connector 110b may include engaging portions 126 on an interior portion of a corresponding inwardly extending generally ring-shaped structure, which may engage the engaging portions 126 of the first connector 110a, and that may prevent or impede rotation of the connector. In some embodiments, the engaging portions 126 may not engage or contact other engaging portions, such as other splines, which may facilitate rotation of the connector 110, the base 102, and/or the accessory 118. For example, in some embodiments, it may be desired to allow the connector 110 to rotate relative to another connector 110, the base 102, and/or accessory 118. On the other hand, in some embodiments, it may be desired for the connector 110 to remain in a generally fixed, non-rotatable position. One skilled in the art may appreciate, after reviewing this disclosure, that the engaging portions 126 or other features may be sized and configured to allow or prevent rotation as desired.

As shown in FIGS. 1, 3, and 5, the first connector attachment portion 122 of the connector 110 may have an outwardly extending, ring-shaped configuration, and the first connector attachment portion 122 may include the one or more engaging portions 126. The engaging portions 126 may be disposed on the inner surface of the outwardly extending portions and, in some embodiments, may be sized and configured to prevent or impede rotation. For example, the first connector attachment portion 122 may include one or more engaging portions 126 that may be sized and configured to engage a surface or structures, such as one or more corresponding or opposing engaging portions of the second connector attachment portion 124, and the engagement portions may prevent or impede rotation. In some embodiments, the first connector attachment portion 122 may have a corresponding size, shape, configuration, and/or arrangement to the base attachment portions 120 and/or the second connector attachment portions 124.

Figure 4:
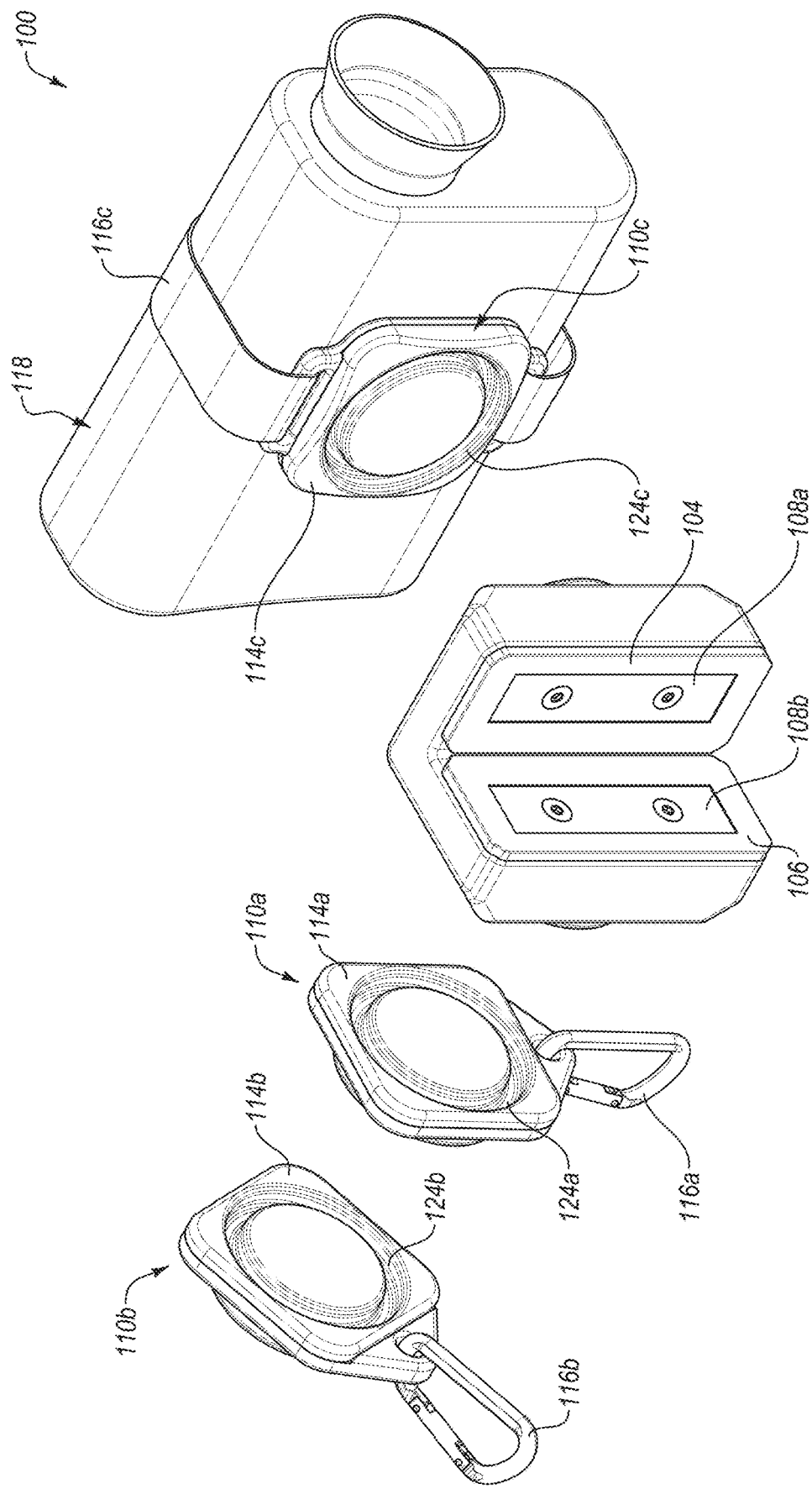
FIG. 4 is a rear exploded view of the exemplary attachment system shown in FIG. 1.

As shown in FIGS. 3, 4 and 6, for example, the second connector attachment portion 124 of the connector 110 may have an inwardly extending, ring-shaped configuration. The first connector attachment or engagement portion 122 of the connector 110 and the second connector attachment portion 124 of the connector 110 may have corresponding or complementary shapes to facilitate attachment, which may facilitate connection of one or more connectors 110, allow the connectors 110 to be aligned, and/or permit the connectors 110 to be disposed in a stacked configuration. In some embodiments, the second connector attachment portion 124 may have a corresponding shape to the base attachment portions 120 and/or the first connector attachment portion 122.

As shown in the accompanying figures, the connectors 110 may have different shapes, sizes, configurations, and/or arrangements depending, for example, upon the intended use of the connector 110 and/or attachment system 100. For example, the connector 110 may include the attachment point 115, such as an opening or aperture, and the attachment point 115 may be sized and configured to allow the accessory 118 to be attached to the connector 110. In some embodiments, the attachment point 115 may be sized and configured to be attached to the accessory attachment mechanism 116. For example, as illustrated in FIGS. 5-6, the attachment point 115 may be an opening sized and configured to allow the accessory attachment mechanism 116 (e.g., a carabiner) to be attached to the connector 110.

In some embodiments, the connector 110 may have an exterior configuration with five-sides, or a portion of the connector 110 may extend outwardly. It will be appreciated that the connector 110 may have other configurations including, for example, circular, three-sided, four-sided, six-sided, seven-sided, eight-sided, etc., or other suitable exterior configurations. In some embodiments, the connector 110 may not include the attachment point 115 and, if desired, the connectors 110 may include other types of accessory attachment mechanisms 116 or structures. For instance, the connectors 110 may include an accessory attachment mechanism 116 disposed on one side of the connector 110 and another accessory attachment mechanism 116 disposed on another side of the connector 110. After reviewing this disclosure, one skilled in the art may appreciate that the connectors 110 may have various shapes, sizes, configurations, and/or arrangements depending, for example, upon the intended use of the connector 110. After reviewing this disclosure, one skilled in the art may also appreciate that the connectors 110 may be attached using other suitable types of fasteners such as mechanical devices, adhesives, and the like.

The connectors 110 and/or accessories 118 may include one or more magnets and/or magnetic fields to facilitate attachment of the connectors 110, the accessories 118, and/or the base 102. For example, the second side 114 of the exemplary connector 110 may be sized and configured to be connected to the base attachment portion 120. The one or more magnetic fields or magnetic structures may allow the connector 110 to be magnetically connected to the base 102, to other connectors 110, and/or to one or more accessories 118.

One or more of the connectors 110, which may also be referred to as tiles, may have generally the same size, shape, configuration, and/or arrangement, which may allow the tiles 110 to be interchangeable. This may also allow the tiles 110 to be disposed in various orders, groupings, and/or layouts. For instance, a first tile 110a may be connected to a first accessory, such as a towel, a second tile 110b may be connected to a second accessory, such as a divot repair tool, and a third tile 110c may be connected to a third accessory, such as a ball marker. The tiles 110 may allow the accessories 118 to be disposed in any desired order or sequence, the tiles 110 may allow the accessories 118 to be connected in any desired configuration or arrangement, and the tiles 110 may allow one or more accessories 118 to be connected to the base 102.

Figure 8:
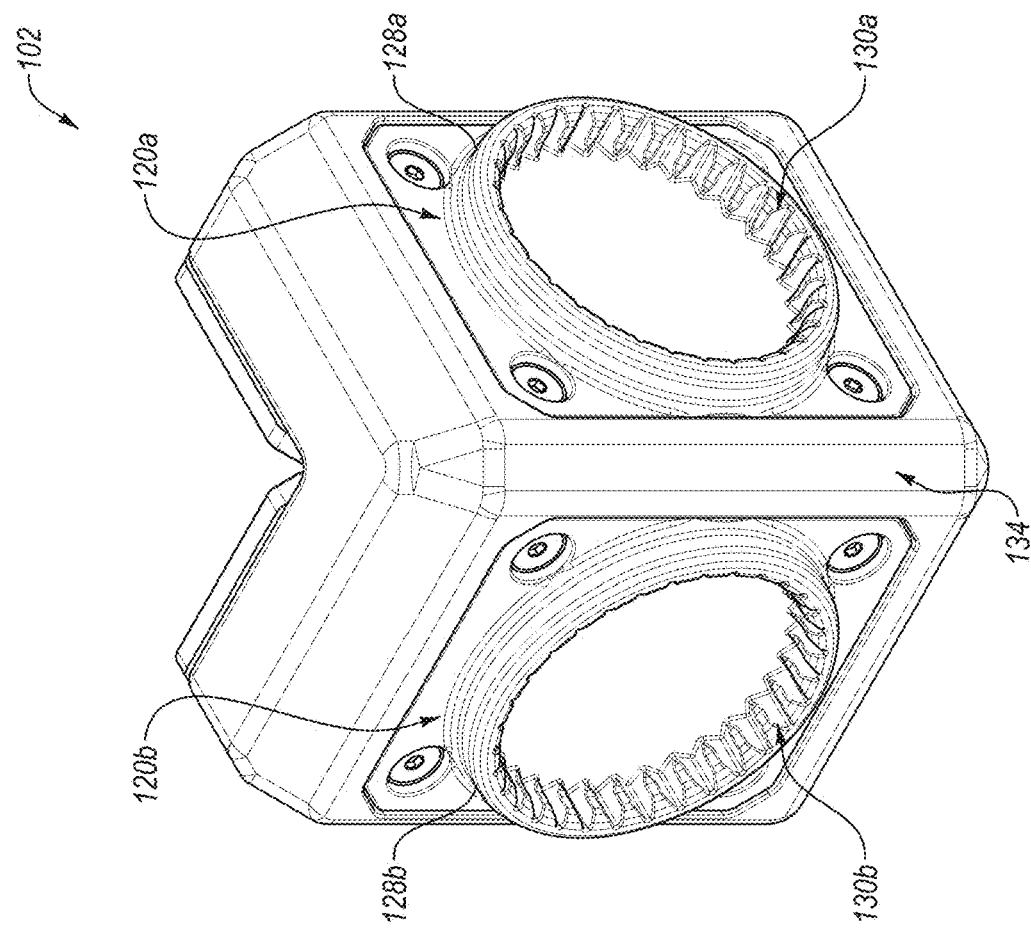
FIG. 8 is a rear perspective view of the exemplary base shown in FIG. 7.

As shown in FIGS. 7 and 8, the base 102 may have a first base portion 132 and a second base portion 134. The first base portion 132 may be sized and configured to be releasably attached to a surface or a structure, such as a mounting surface. For example, the first base portion 132 may include the first surface or side 104 and the second surface or side 106. The first base portion 132 may include one or more magnets, such as the one or more magnets 108a and the one or more magnets 108b. In some embodiments, the one or more magnets 108a may be disposed at a substantially right angle relative to the one or more magnets 108b. In some embodiments, the first base portion 132 may be substantially L-shaped. The second base portion 134 may include one or more base attachment portions 120. In some embodiments, the base attachment portions 120 may be sized and configured to be releasably attached to one or more accessories 118. In some embodiments, the second base portion 134 may include multiple base attachment portions 120. For example, as shown in FIG. 7, the second base portion 134 may include the first base attachment portion 120a and the second base attachment portion 120b.

In some embodiments, the base 102 may include one or more base attachment portions 120, which may facilitate attachment of the one or more connectors 110 to the base 102. The base attachment portions 120 may include one or more engagement portions 128. For example, as shown in FIG. 7, the first base attachment portion 120a may include a first engagement portion 128a, which may be an outwardly extending and/or generally ring-shaped structure, and the second base attachment portion 120b may include a second engagement portion 128b, which may be an outwardly extending and/or generally ring-shaped structure.

In some embodiments, the one or more base attachment portions 120 may include one or more engaging portions 130, such as protrusions. For example, the first base attachment portion 120a may include the engaging portions 130a and the second base attachment portion 120b may include the engaging portions 130b. In some embodiments, the engaging portions 130 may be protrusions, teeth, splines, or other structures and these structures may be sized and configured to prevent or impede rotation of the connector 110 relative to the base attachment portions 120. The engaging portions 130 on the base attachment portions 120 may be sized and configured to engage one or more structures, such as corresponding engaging portions. For instance, corresponding engaging portions may be disposed on the one or more connectors 110 and/or the accessory 118, which may prevent unintended rotation of the connector 110, the base 102, and/or the accessory 118. For example, the first base attachment portion 120a may include the engaging portions 130 on an interior portion of a outwardly extending generally-ring shaped structure, and the second side 114a of the first connector 110a may include engaging portions on an interior portion of an inwardly extending, generally ring-shaped structure, which may engage the engaging portions of the first base attachment portion 120a. In some embodiments, the engaging portions 130 may not engage or contact other engaging portions, such as other protrusions or splines, which may facilitate rotation of the connector 110, the base 102, and/or the accessory 118. For example, in some embodiments, it may be desired to allow the connector 110 to rotate relative to the base 102 and/or the base attachment portions 120. On the other hand, in some embodiments, it may be desired for the connector 110 to remain in a generally fixed, non-rotatable position. One skilled in the art may appreciate, after reviewing this disclosure, that the engaging portions 130 or other features may be sized and configured to allow or prevent rotation as desired.

In some embodiments, the first base portion 132 may include one or more magnets 108, and the first base portion may be magnetically attached to a mounting surface. In these and other embodiments, the first base portion 132 may be releasably attached to surface or structure such as a golf cart. In some embodiments, the second base portion 134 may include one or more magnets (e.g., which may be part of the first base attachment portion 120a and/or the second base attachment portion 120b), and the one or more magnets may be sized and configured to allow one or more accessories 118 to be magnetically attached to the base 102.

The first base portion 132 may be magnetically connected to a mounting surface, and the second base portion 134 may be magnetically connected to two or more connectors 110 via, for example, the base attachment portions 120. In some embodiments, the magnetic fields of the first base portion 132 and the second base portion 134 may be aligned and/or configured to cooperate and/or work together to create a cumulative magnetic field. In some embodiments, the magnetic fields of the first base portion 132 and/or the second base portion 134 may be aligned and/or configured to cooperate and/or work together with the tiles 110, particularly if the tiles 110 include magnets and/or magnetic structures.

In some embodiments, the one or more magnets 108a on the first surface 104 and/or the one or more magnets 108b on the second surface 106 may be sized and configured to work with the base attachment portions 120 and/or the one or more connectors 110 that may be connected to the base 102. For instance, if the base 102 includes a first base attachment portion 120a and the first base attachment portion 120a includes one or more magnets and/or magnetic portions, the first base attachment portion 120a may be sized and configured to work with the one or more magnets 108b. Similarly, if the base 102 includes a second base attachment portion 120b and the second base attachment portion 120b includes one or more magnets and/or magnetic portions, the second base attachment portion 120b may be sized and configured to work with the one or more magnets 108a.

In an example operation, the base 102 may be attached to a mounting surface. In some embodiments, the mounting surface may be on a vehicle (e.g., a golf cart, a UTV, an ATV, or other vehicles) or sporting goods related equipment (e.g., a push cart or a golf bag). One or more accessories 118 may be attached to the base 102 at the base attachment portions 120 via the one or more connectors 110 or otherwise. After reviewing this disclosure, one skilled in the art may appreciate that the base 102 may have various shapes, sizes, configurations, and/or arrangements depending, for example, upon the intended use of the attachment system 100.

After reviewing this disclosure, one skilled in the art may recognize that modifications, additions, or omissions may be made to the attachment system 100 shown in FIGS. 1-4, the one or more connectors 110 shown in FIGS. 1-6, and/or the base 102 shown in FIGS. 1-4 and 7-8 without departing from the scope of the present disclosure. For example, while the attachment system 100 is described as being attached to golf-related mounting surfaces and golf related accessories being attached to the base 102, it will be appreciated that the attachment system 100 may be attached to any suitable mounting surface and any suitable accessories 118 may be attached. In some embodiments, multiple accessories 118 may be attached and/or the accessories 118 may be directly attached to the base 102.

In some embodiments, the connectors 110 may be omitted, and the connector attachment portions 122 and/or 124 may be integrated into the accessories 118. For example, the accessories 118 may include one or more magnets, and the magnets may be a unitary part of the accessories.

One skilled in the art, after reviewing this disclosure, may also recognize that the attachment system 100 may have other suitable shapes, sizes, configurations, and/or arrangements. For example, the first base portion 132 of the base 102 may include three surfaces or sides such that the first base portion 132 has a substantially U-shaped configuration. In these and other embodiments, the base 102 may include three or more base attachment portions 120.

Figure 10:
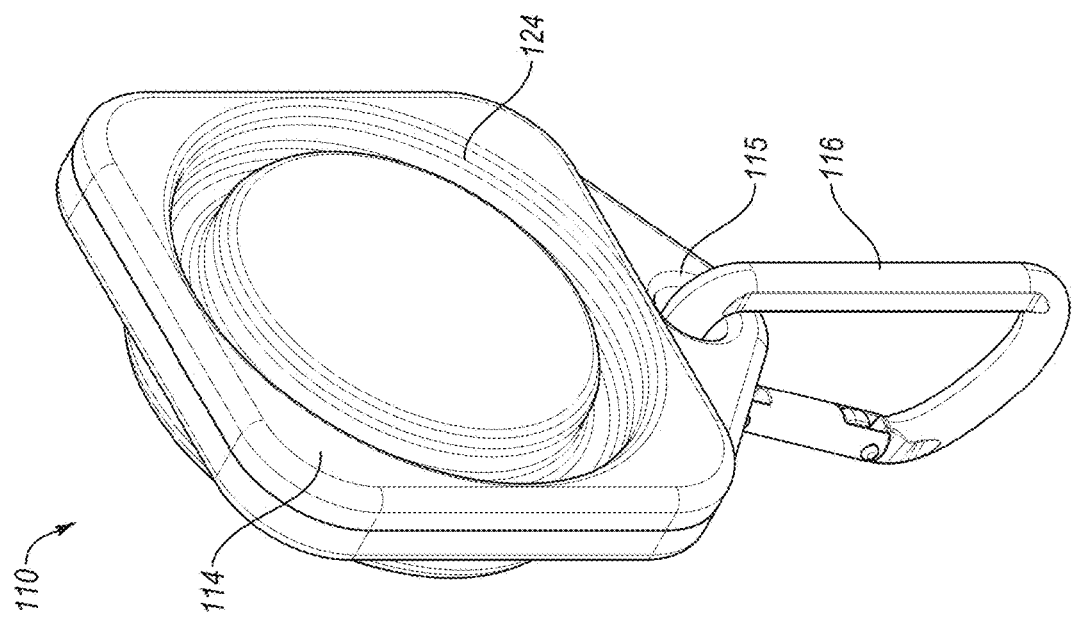
FIG. 10 is a rear perspective view of the exemplary connector shown in FIG. 9.
Figure 9:
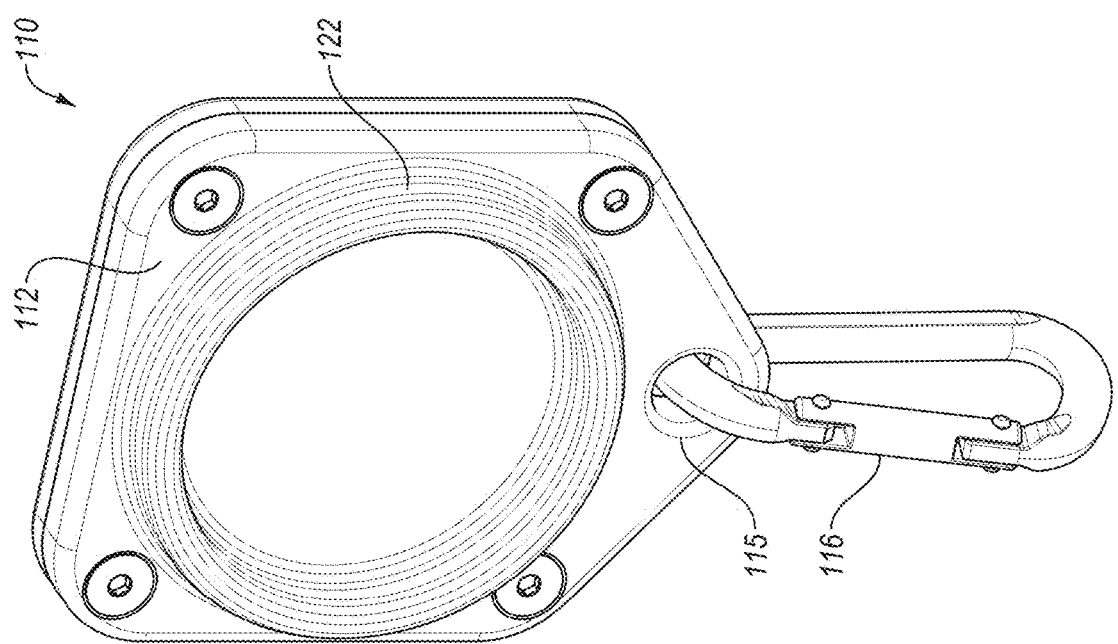
FIG. 9 is a front perspective view of another exemplary connector.

In another example, and as shown in FIGS. 9 and 10, the connector 110 may not include the engaging portions 126 on the interior surface of the first connector attachment portion 122. In these and other embodiments, the first connector attachment portion 122 of one connector 110 may correspond to the second connector attachment portion 124 of another connector 110 and the connector 110 may rotate relative to each other. Furthermore, while the accessory attachment mechanisms 116 and the attachment point 115 are shown in FIGS. 9 and 10, it will be understood that these, and other parts and components, such as the engaging portions 130, are not required and may be omitted.

Figure 11:
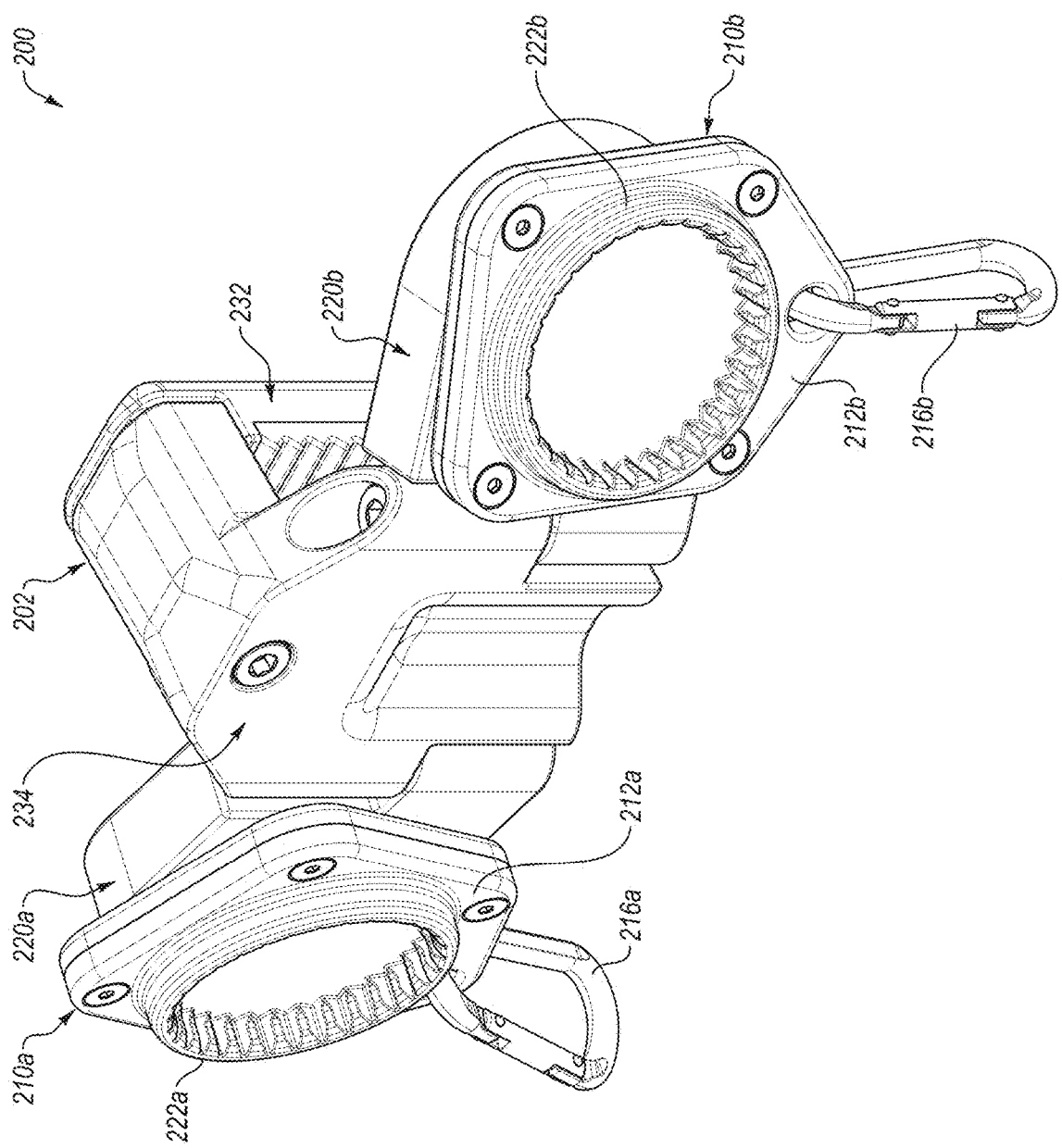
FIG. 11 is a front perspective view of another exemplary attachment system illustrating an exemplary base and exemplary connectors, illustrating the base in an exemplary configuration.
Figure 12:
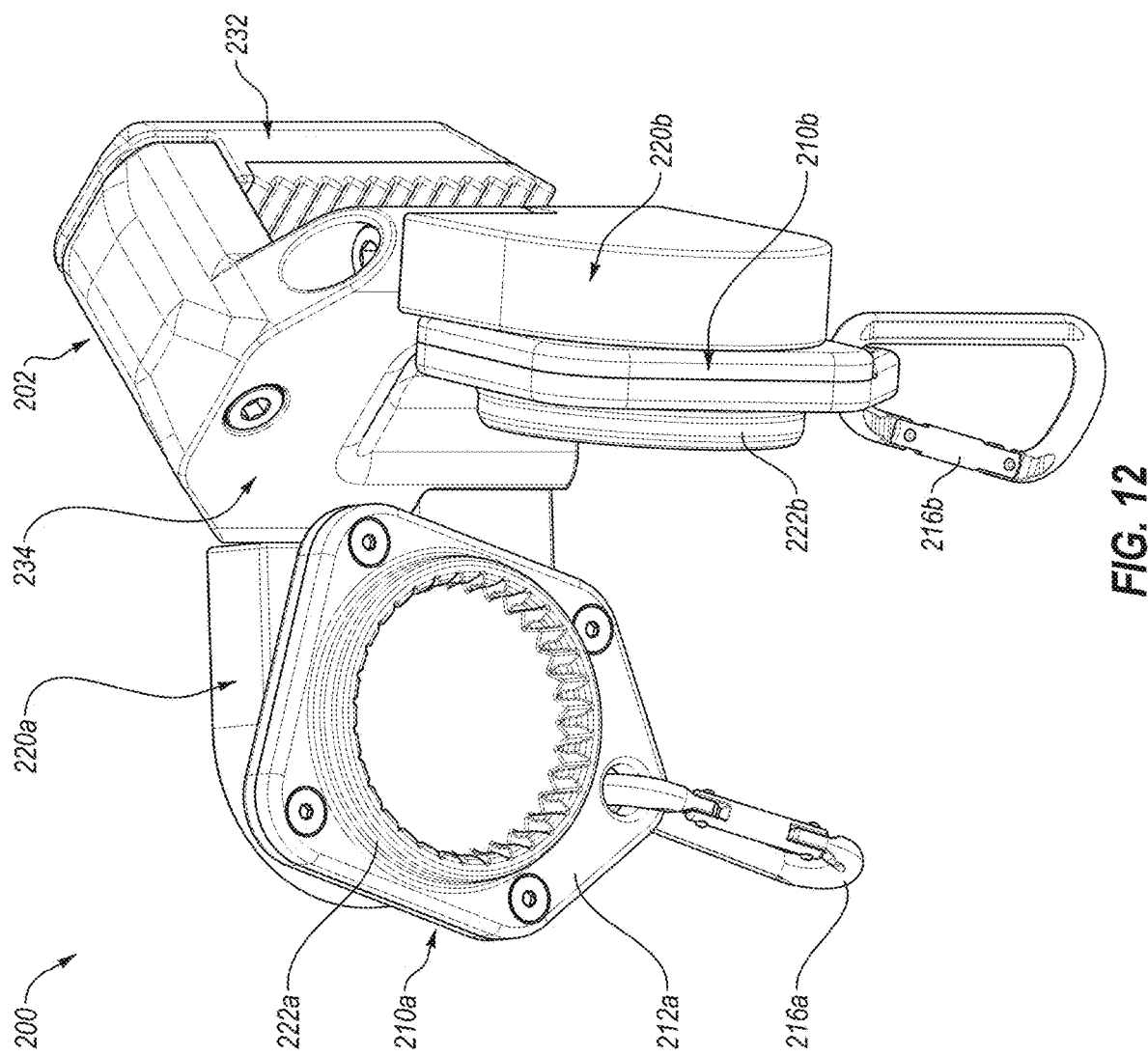
FIG. 12 is another front perspective view of the exemplary attachment system shown in FIG. 11, illustrating the exemplary base in another exemplary configuration.

FIGS. 11 and 12 illustrate another exemplary attachment system 200 in various exemplary configurations. The attachment system 200 may include a base 202, and the base 202 may include a first base portion 232 and a second base portion 234. The first base portion 232 may be configured to be releasably attached to a mounting surface (e.g., a golf bag or golf cart). The second base portion 234 may include two or more base attachment portions 220, which may be sized and configured to be releasably attached to an accessory. For example, the second base portion 234 may include a first base attachment portion 220a and a second base attachment portion 220b. The base attachment portions 220 may be sized and configured to allow one or more connectors 210 and/or accessories to be attached to the base 202.

Figure 13:
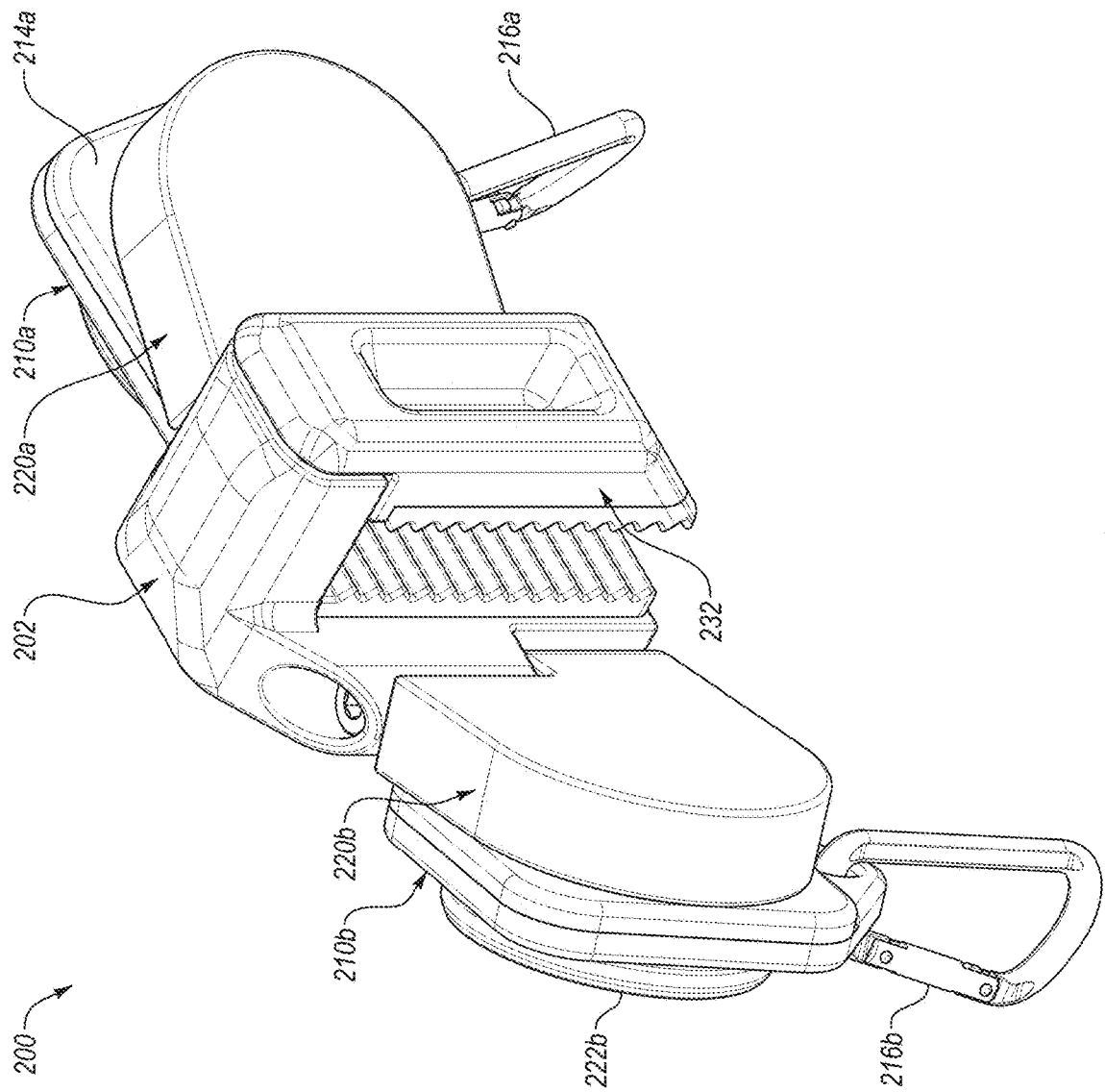
FIG. 13 is a rear perspective view of the exemplary attachment system shown in FIG. 11.

In some embodiments, at least a portion of the base attachment portions 220 may be movable, which may allow the base 202 to at least partially conform to the shape and/or configuration of the mounting surface such as a golf bag. For example, the base attachment portions 220 may be flexible, resilient, secured in any desired configuration, and the like. As illustrated in FIGS. 11-13, the base attachment portions 220 may be connected to the base 202, and the second base portion 234 may include one or more hinges, which may allow the base attachment portions 220 to be adjusted relative to the base 202. For example, as illustrated in FIG. 11, the base attachment portions 220 may be at least substantially aligned with a face of the second base portion 234. As illustrated in FIG. 12, the base attachment portions 220 may be rotated about the hinges, which may allow the base attachment portions 220 to be moved towards one another. In some configurations, the base attachment portions 220 may be moved away from one another or only one of the base attachment portions 220 may be moved. In some embodiments, the base attachment portions 220 may move independently from one another such that one or the other may be moved in either direction about the hinge.

While the connection between the base attachment portions 220 and the base 202 is described and illustrated in the figures as a hinge, it will be appreciated that a ball and socket joint, a swivel joint, rotary bearings, or any other connection that may allow for movement of the base attachment portions 220 relative to the base 202 may be utilized in embodiments where movement of the base attachment portions 220 is desired. Furthermore, while the base attachment portions 220 are shown as being movable relative to the base 202, in some embodiments, the base attachment portions 220 may be fixed relative to the base 202.

Additionally, the attachment system 200 may be at least partially similar or the same as other attachment systems described in this disclosure. Furthermore, the base 202, the first base portion 232, the second base portion 234, and the base attachment portions 220 may be similar to similar components and features described in this disclosure. For example, the base 202, the first base portion 232, the second base portion 234, and/or the base attachment portions 220 may be at least partially the same as or similar to the base 102, the first base portion 132, the second base portion 134 and/or the base attachment portions 120, respectively.

In some embodiments, one or more connectors 210 may be attached to the base attachment portions 220. For example, a first connector 210a may be attached to the first base attachment portion 220a and the second connector 210b may be attached to the second base attachment portion 220b. The connectors 210 may also include an accessory attachment mechanism 216, which may be similar to the accessory attachment mechanisms described throughout the disclosure. The connectors 210 may be at least partially the same as or similar to the connectors described throughout the disclosure.

As illustrated in FIGS. 11-13, the first base portion 232 may include a clamp or other feature that may be sized and configured to allow the base 202 to be attached to a mounting surface or structure. The clamp may be adjustable in size and the clamp may include portions that are flexible and/or compressible, which may facilitate attachment of the clamp to, for example, a golf bag. The clamp may also be sized and configured to allow the base 202 to be attached to various golf bags and/or different portions of a golf bag. The clamp may be secured in a desired position by a fastener such as a screw or a locking pin. In some embodiments, the base 202 may be mechanically fastened to the mounting surface such as a golf bag and a fastener, such as a screw, may be used to secure the base 202 to the mounting surface. After reviewing this disclosure, one skilled in the art may appreciate that the base 202 may be attached to other suitable structures, and the base 202 may be attached using other suitable mechanisms. In addition, after reviewing this disclosure, one skilled in the art may appreciate that the base 202 may include any suitable number of base attachment portions 220, connectors 210, and the like depending, for example, upon the intended use of the base 202 and/or attachment system 200.

Modifications, additions, or omissions may be made to the attachment system 200 of FIGS. 11-13, without departing from the scope of the present disclosure. For example, while the attachment system 200 is described as attached to golf-related mounting surfaces and golf related accessories being attached to the base 202, it will be appreciated that the attachment system 200 may be attached to any suitable mounting surface and any suitable accessories 218 may be attached. In some embodiments, multiple accessories 218 may be attached and/or the accessories 218 may be directly attached to the base 202. Furthermore, the base 202, the connectors 210, and/or the accessories 218 may be similar to similar components and features described in this disclosure.

Figure 14:
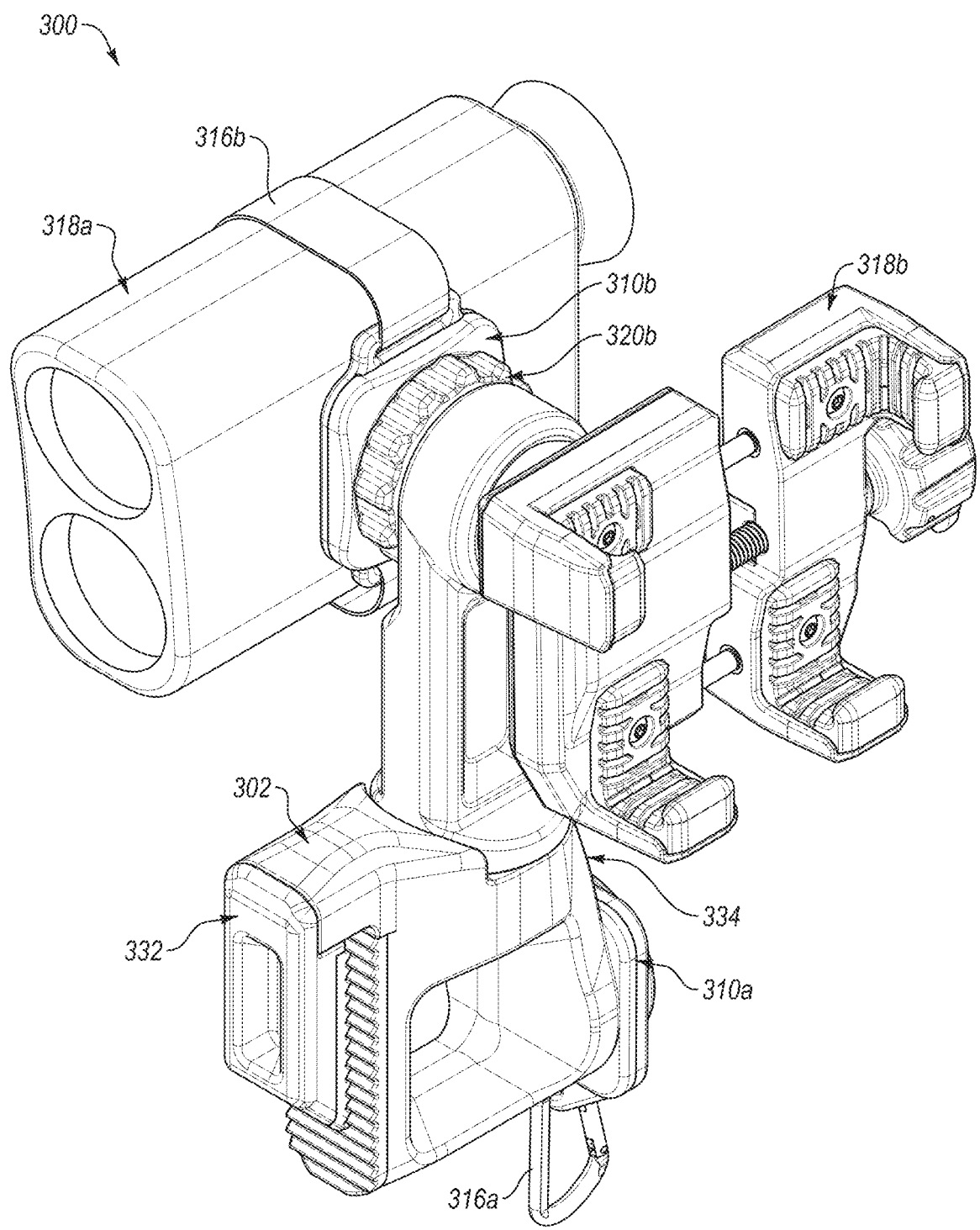
FIG. 14 is a front perspective view of another exemplary attachment system illustrating an exemplary base, exemplary connectors, and an exemplary accessory (e.g., a rangefinder) attached to the base by one of the exemplary connectors.
Figure 15:
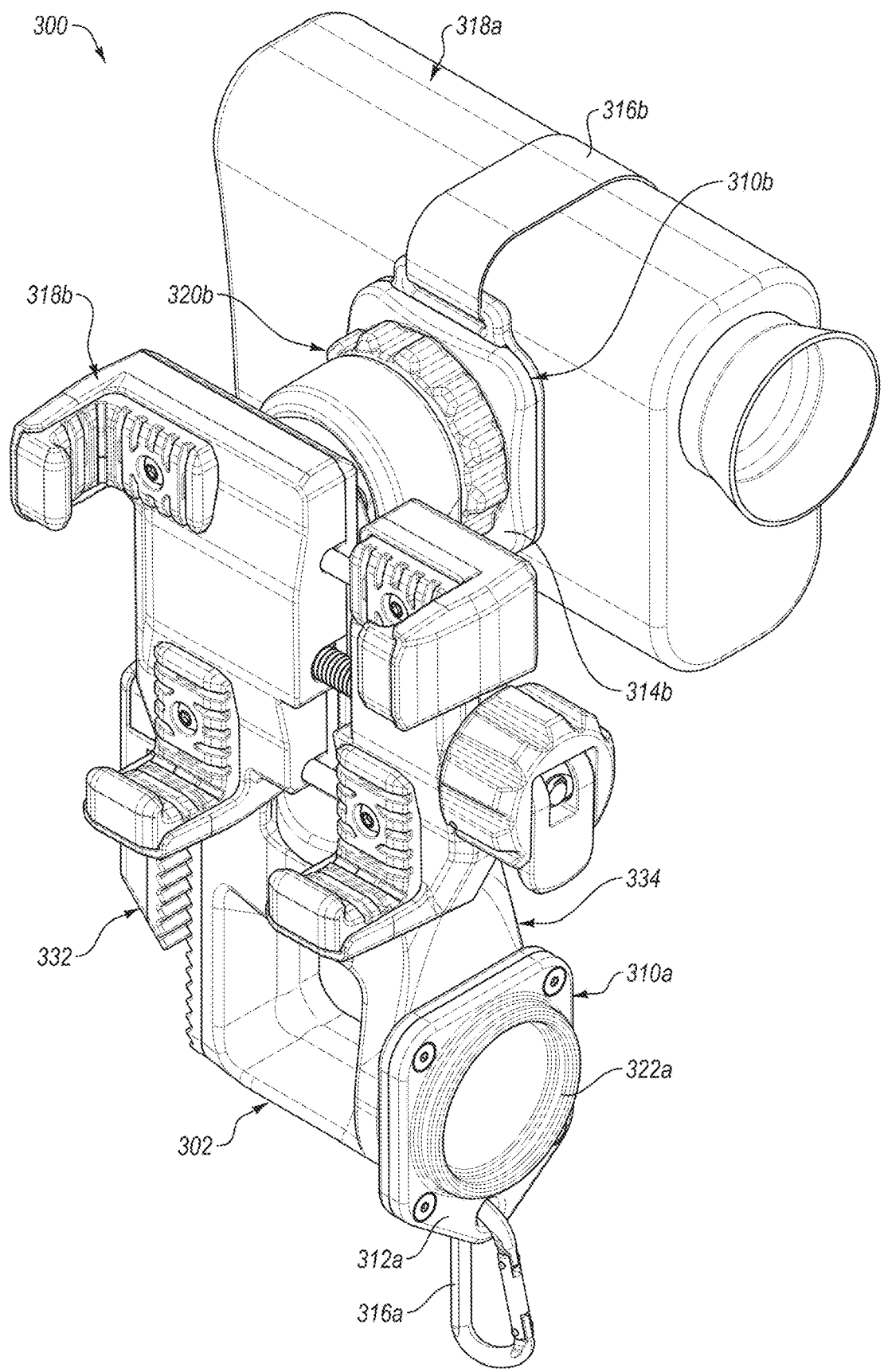
FIG. 15 is a rear perspective view of the exemplary attachment system shown in FIG. 14.
Figure 16:
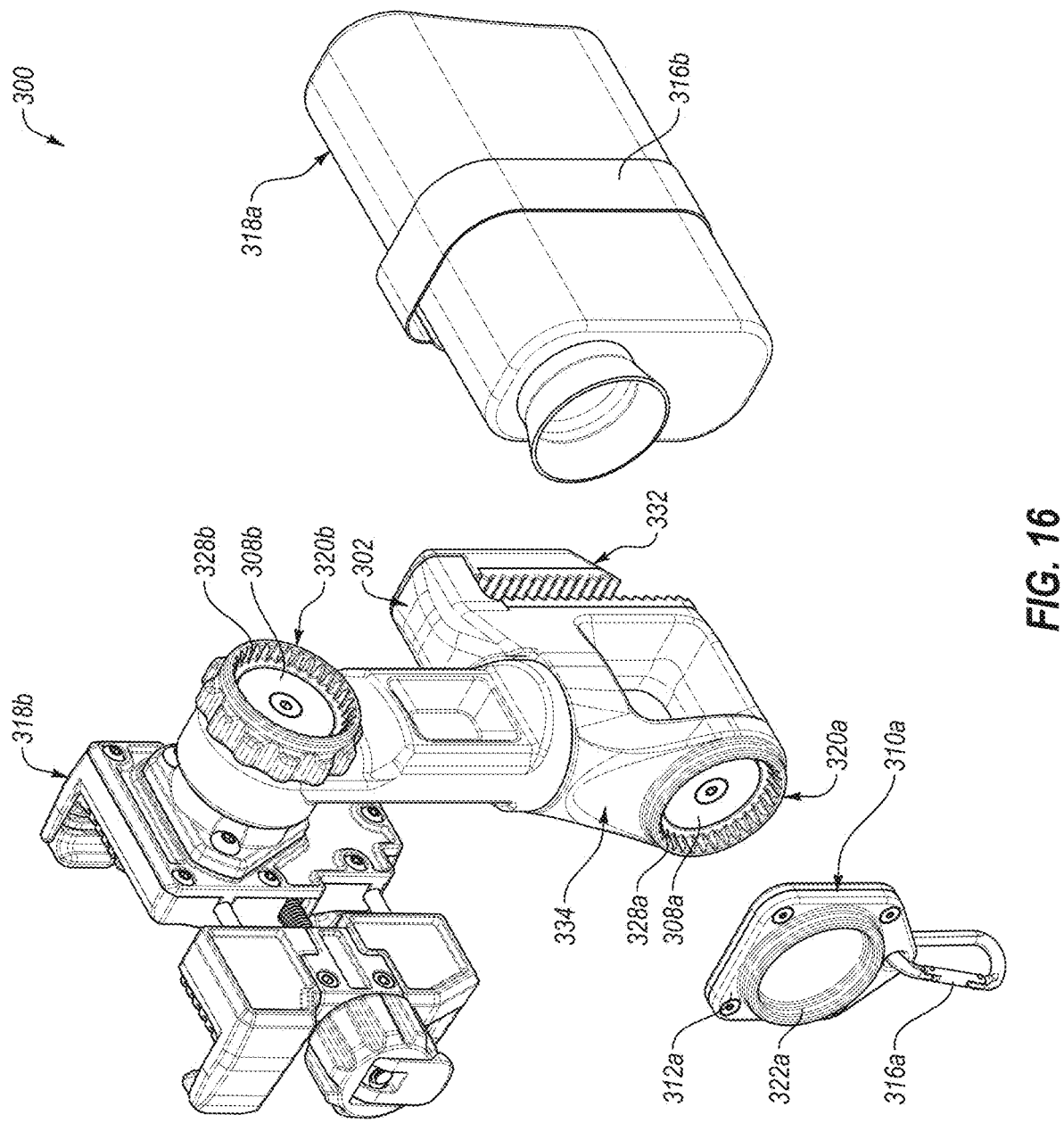
FIG. 16 is an exploded view of the exemplary attachment system shown in FIG. 14.

FIGS. 14, 15, and 16 illustrate another exemplary attachment system 300. The attachment system 300 may be at least partially similar or the same as other attachment systems described in this disclosure.

The exemplary attachment system 300 may include a base 302 and the base 302 may include a first base portion 332 and a second base portion 334. In some embodiments, the base 302 may be sized and configured to be attached to a golf bag. In some embodiments, the base 302 may include one or more base attachment portions 320. The base 302, the first base portion 332, the second base portion 334, and the base attachment portions 320 may be similar to similar components and features described in this disclosure.

The first base portion 332 may be sized and configured to be releasably attached to the mounting surface. For example, as shown in FIGS. 14-16, the first base portion 332 may include a clamp that may attach the base 302 to the mounting surface such as a golf bag. The clamp may be similar to the clamp described with reference to FIGS. 11-13. The second base portion 334 may include the one or more base attachment portions 320, which may be attached to one or more connectors 310 and/or accessories 318. For example, the second base portion 334 may include a first base attachment portion 320*a* and a second base attachment portion 320*b*.

In some embodiments, the base attachment portions 320 may include an engagement portion 328. For example, the first base attachment portion 320*a* may include a first engagement portion 328*a* and the second base attachment portion 320*b* may include a second engagement portion 328*b*. The base attachment portions 320 may be sized and configured to be attached to one or more connectors 310 and/or one or more accessories 318. For example, the engagement portions 328 may be configured to engage a first connector attachment portion 322 of the one or more connectors 310 or a second connector attachment portion (not shown) of the one or more connectors 310, such as the second connector attachment portion 124 described with reference to FIGS. 1-6. In some embodiments, such as shown in FIG. 16, the engagement portions 328 may include one or more protrusions (such as the engaging portions 130 described with reference to FIGS. 1-6) disposed on an inner surface of the engagement portions 328.

In some embodiments, different base attachment portions 320 may be disposed at different locations on the base 302. For example, as shown in FIGS. 14-16, the first base attachment portion 320*a* may be disposed at a lower end of the second base portion 334 and the second base attachment portion 320*b* may be disposed at an upper end of the second base portion 334. Furthermore, in some embodiments, the base attachment portions 320 may be disposed on opposite sides of the base 302.

In some embodiments, the base attachment portions 320 may include one or more magnets 308. For example, as shown in FIG. 16, the first base attachment portion 320*a* may include one or more magnets 308*a* and the second base attachment portion 320*b* may include one or more magnets 308*b*. The magnets 308 may facilitate attachment of the base attachment portions 320, the connectors 310, and/or the accessories 318. The magnets 308 may be at least partially similar to or the same as the magnets 108 described with reference to FIGS. 1-4.

In some embodiments, one or more connectors 310 may be attached to the base attachment portions 320. For example, as shown in FIG. 16, the one or more connectors 310 may be attached to the base attachment portions 320 via the one or more magnets 308, which may be included in the base attachment portions 320. In these and other embodiments, the connectors 310 may include one or more magnets, which may facilitate attachment of the connectors 310 to the base 302 and/or the base attachment portions 320. The connectors 310 may be at least partially similar to and/or have the same or similar components as connectors 310 described in this disclosure. For example, the connectors 310 may include a first side 312 having the first connector attachment portion 322 and the connectors 310 may include an accessory attachment mechanism 316 (e.g., a strap 316*b* or a carabiner 316*a*), any of which may be at least partially similar to or the same as those features described in this disclosure.

In some embodiments, the connectors 310, or a portion of the connectors 310, may be attached to the accessories 318. In some embodiments, the connector 310 or a portion of the connector 310 may be integrally formed as part of the accessory 318 such as a single unit or unitary structure.

In some embodiments, the base 302 may include additional base attachment portions 320, which may allow additional connectors 310 and/or accessories 318 to be attached. After reviewing this disclosure, one skilled in the art may appreciate that any suitable number of connectors 310 and/or accessories 318 may be connected, and these connectors 310 and/or accessories 318 may be disposed in various suitable configurations and arrangements.

In some embodiments, a first accessory 318*a* (e.g., a rangefinder) may be attached to one side of the base 302 and a second accessory 318*b* (e.g., a phone or electronic device holder) may be attached to the other side of the base 302. In some embodiments, the accessories 318 may be directly attached to the base 302 and/or the accessories may be attached to the base 302 by connectors 310. For example, as shown in FIG. 14-16, the first accessory 318*a* may be attached to the base 302 via a second connector 310*b*, and the second accessory 318*b* (e.g., a phone holder) may be directly attached to the base 302.

After reviewing this disclosure, one skilled in the art may appreciate that any suitable number of connectors 310 and/or accessories 318 may be connected, and these connectors 310 and/or accessories 318 may be disposed in various suitable configurations and arrangements. Furthermore, modifications, additions, or omissions may be made to the attachment system 300 of FIGS. 14-16, without departing from the scope of the present disclosure. For example, while the attachment system 300 is described as being attached to golf-related mounting surfaces and golf related accessories being attached to the base 302, it will be appreciated that the attachment system 300 may be attached to any suitable mounting surface and any suitable accessories 318 may be attached. In some embodiments, multiple accessories 318 may be attached and/or the accessories 318 may be directly attached to the base 302. Furthermore, the base 302, the connectors 310, and/or the accessories 318 may be similar to similar components and features described in this disclosure.

Figure 17:
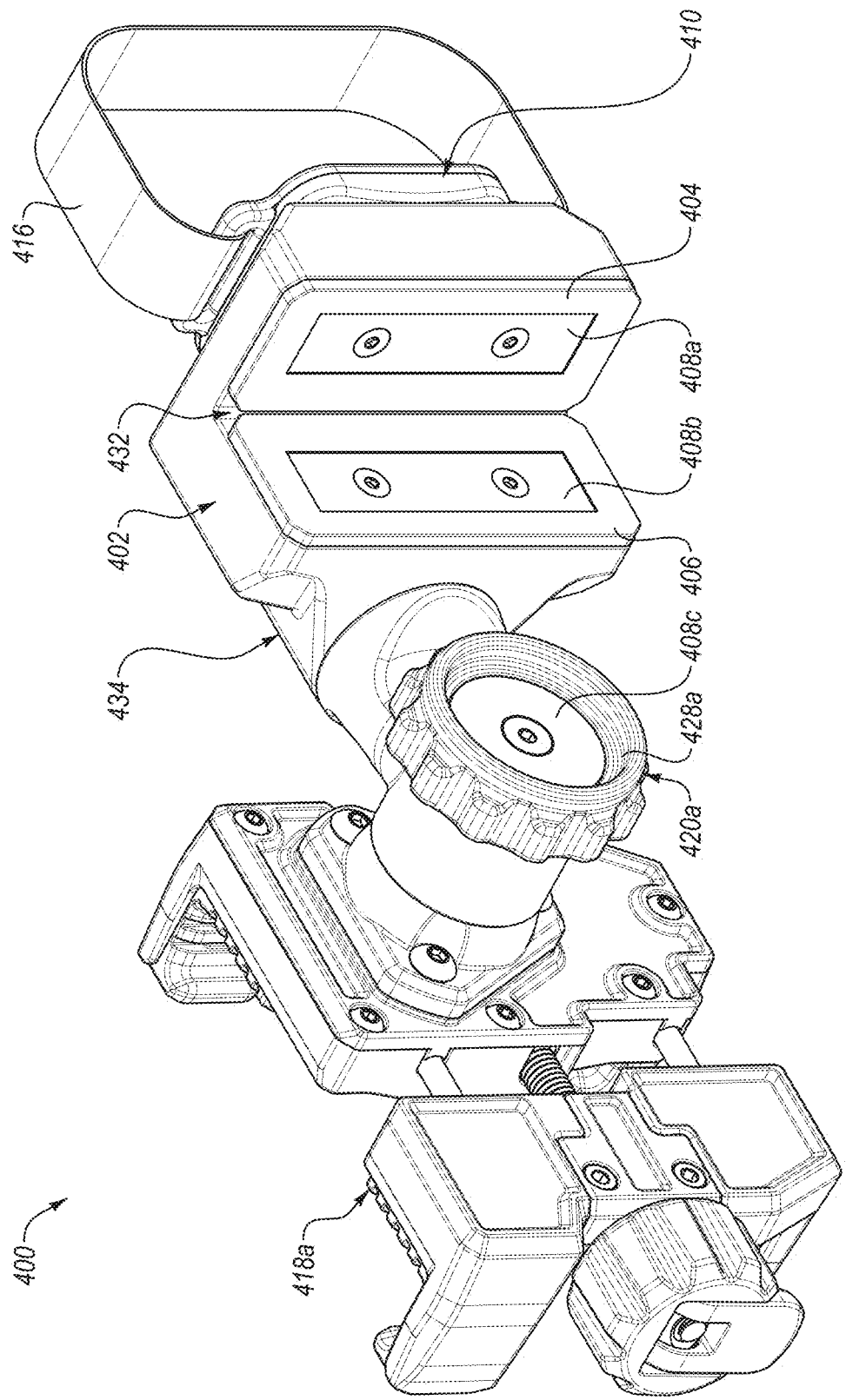
FIG. 17 is a rear perspective view of another exemplary attachment system including an exemplary base and an exemplary connector.
Figure 18:
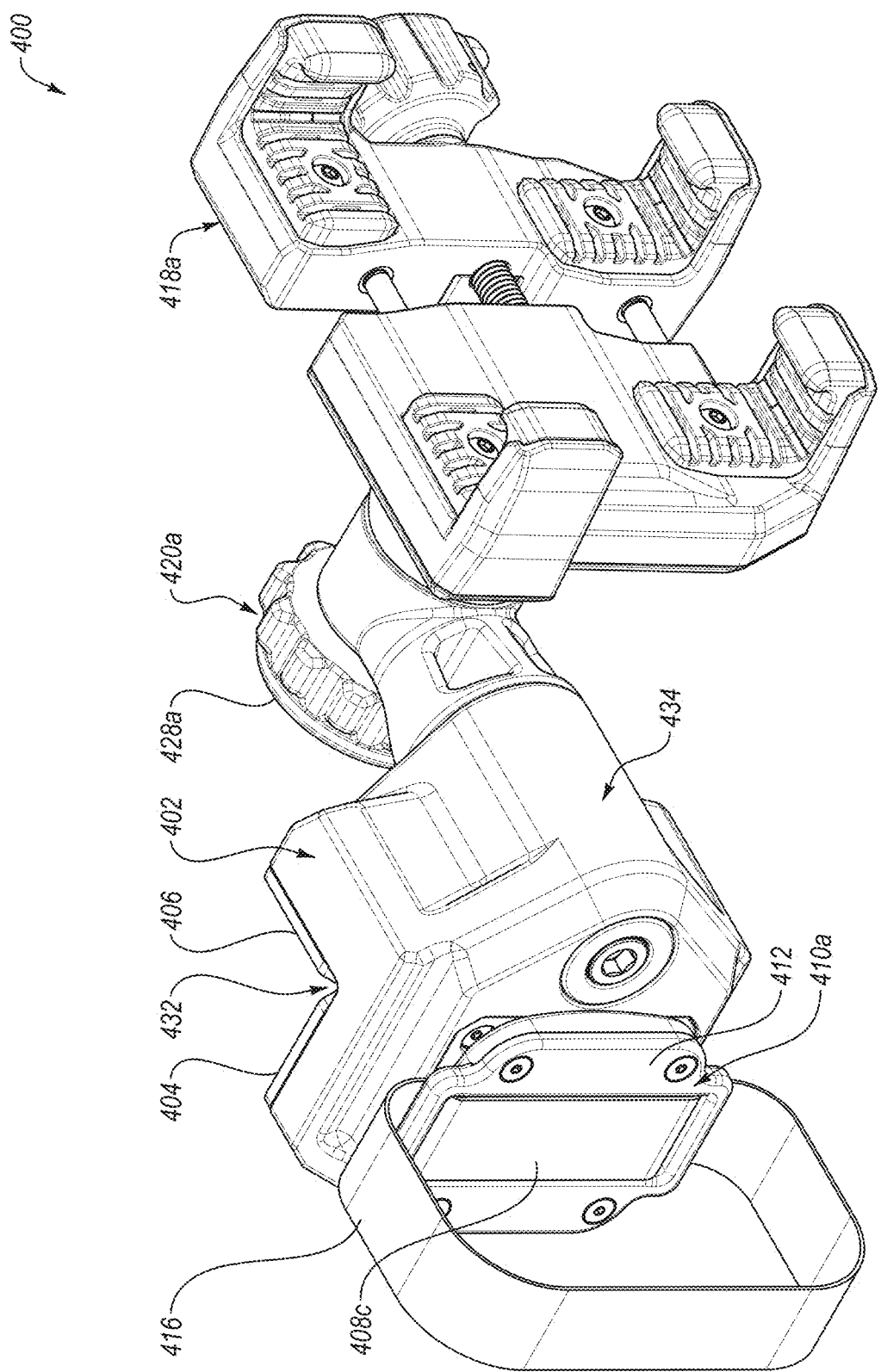
FIG. 18 is a front perspective view of the exemplary attachment system shown in FIG. 17.

FIG. 17 and FIG. 18 illustrate another exemplary attachment system 400. The attachment system 400 may be at least partially similar or the same as and/or have the same or similar components as other attachment systems described in this disclosure. For example, the attachment system 400 may include a base 402, one or more connectors 410, and one or more accessories 418.

As shown in FIG. 17, the base 402 may include a first base portion 432 and a second base portion 434. The first base portion 432 may be sized and configured to be releasably attached to a mounting surface. For example, the first base portion 432 may include a first side 404 and a second side 406. The first side 404 may include one or more magnets 408a and the second side 406 may include one or more magnets 408b. Thus, the first base portion 432 may be magnetically and/or releasably attached to the mounting surface, such as a golf cart.

In some of these embodiments, the one or more magnets 408a and/or the one or more magnets 408b may be at least partially disposed within a border having a high friction surface. The border may be similar to or the same as the border described with reference to FIGS. 1-4. As shown in FIG. 17, the one or more magnets 408a may be disposed at a substantially right angle relative to the one or more magnets 408b. In these embodiments, the first base portion 432 may be substantially L-shaped.

The second base portion 434 may include one or more base attachment portions 420. For example, the second base portion 434 may include a first base attachment portion 420a and a second base attachment portion (not shown), and one or more connectors 410 may be attached to the attachment system 400. In some embodiments, the base attachment portions 420 may include an engagement portion 428. In some embodiments, the connector 410 may have a corresponding connector attachment portion that engages the engagement portion 428. In some embodiments, the second base portion 434 may include one or more magnets and the magnets may be sized and configured to allow one or more accessories 418 to be mounted to the base 402. For example, the first base attachment portion 420a may include one or more magnets 408c, which may allow one or more accessories 418 to be attached to the base 402, and the second base attachment portion may include one or more magnets, which may allow one or more accessories 418 (e.g., a rangefinder) to be attached to the base 402.

In some embodiments, a magnetic field of the one or more magnets of the second base portion 434 may cooperate with a magnetic field of the one or more magnets 408 of the first base portion 432 to create a cumulative magnetic field. For example, the one or more magnets 408a may cooperate with the one or more magnets in the second base attachment portion to create a cumulative magnetic field.

In some embodiments, the connector 410 may include a magnet, and the connector 410 may be magnetically attached to one of the base attachment portions 420 of the base 402. In some of these embodiments, a magnetic field of one the one or more magnets 408 of the first base portion 432 may cooperate with a magnetic field of the connector 410 to create a cumulative magnetic field. For example, the one or more magnets 408a may cooperate with one or more magnets in the connector 410 to create a cumulative magnetic field.

Modifications, additions, or omissions may be made to the attachment system 400 of FIGS. 17-18, without departing from the scope of the present disclosure. For example, while the attachment system 400 is described as being attached to golf-related mounting surfaces and golf related accessories being attached to the base 402, it will be appreciated that the attachment system 400 may be attached to any suitable mounting surface and any suitable accessories 418 may be attached. Furthermore, the base 402, the connectors 410, and/or the accessories 418 may be similar to similar features and components described in this disclosure.

Figure 19:
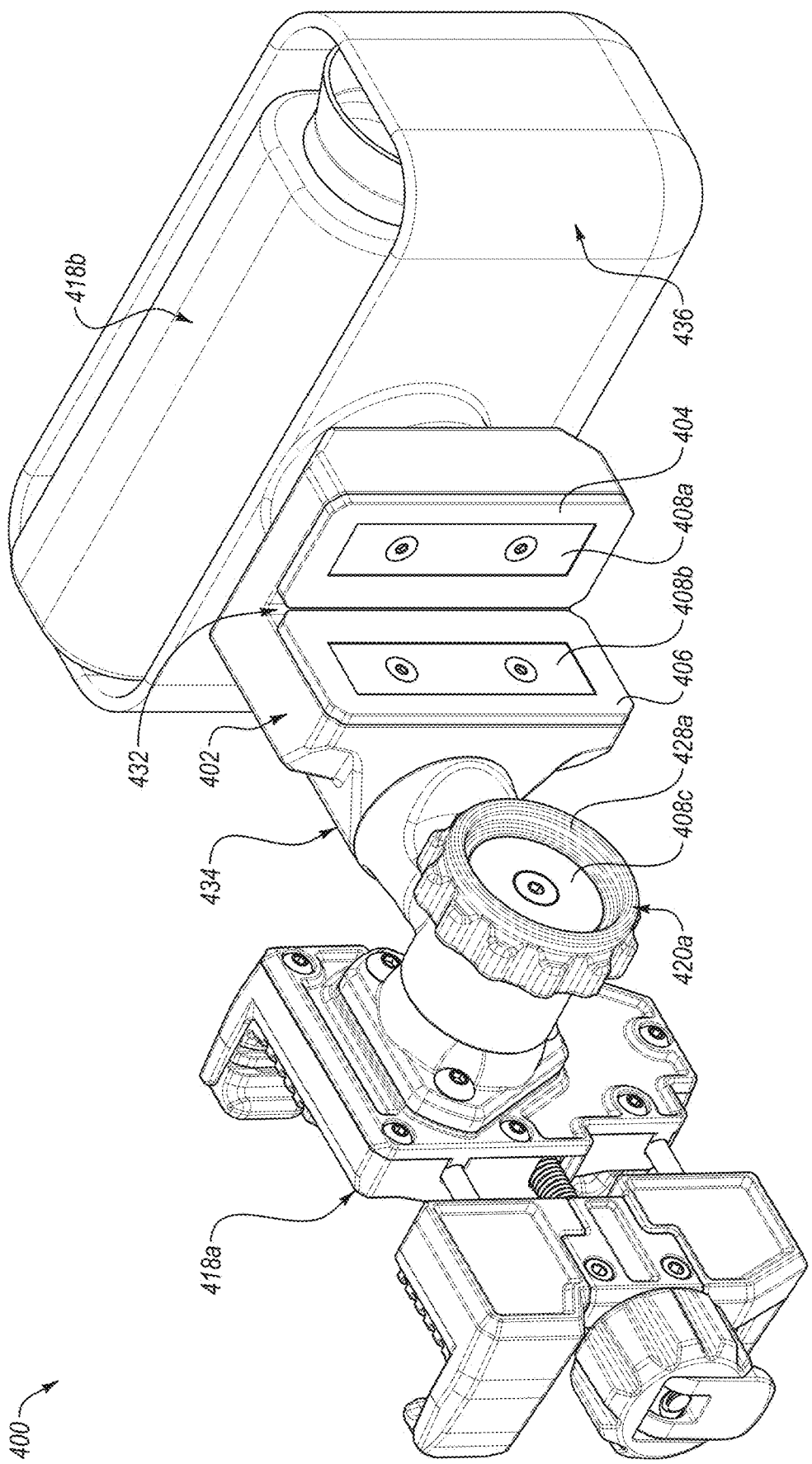
FIG. 19 is a rear perspective view of another exemplary attachment system including an exemplary base, an exemplary receiving portion, and an exemplary accessory (e.g., a rangefinder) attached to the base by the exemplary receiving portion.
Figure 20:
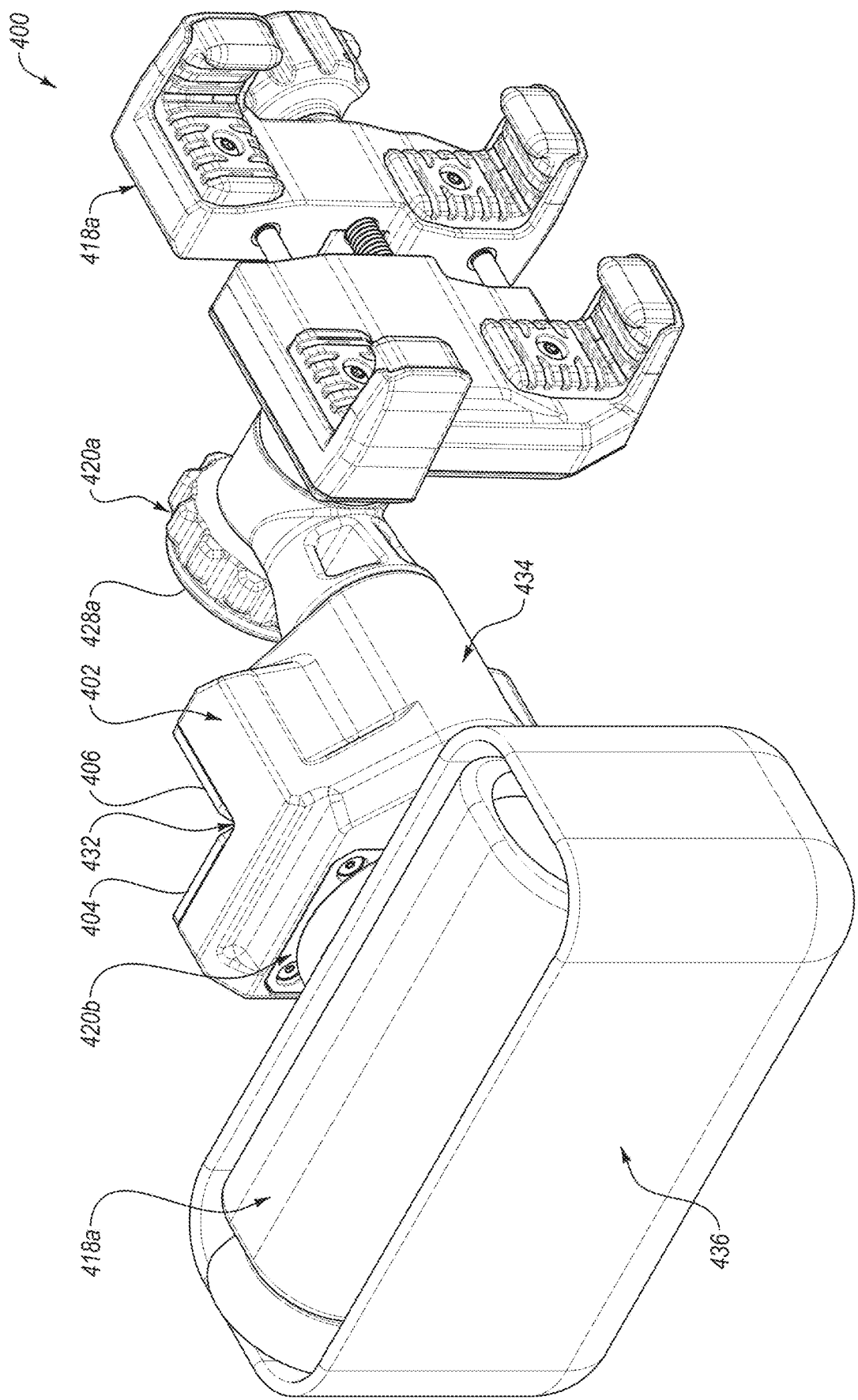
FIG. 20 is a front perspective view of the exemplary attachment system shown in FIG. 19.

In some embodiments, multiple accessories 418 may be connected and disconnected from the attachment system 400, and/or the accessories 418 may be directly attached to the base 402. For example, as illustrated in FIGS. 19 and 20, the attachment system 400 may include a first accessory 418a, which may be a phone holder and the first accessory may be attached directly to the base 402, and the attachment system 400 may include a second accessory 418b, which may be a rangefinder.

After reviewing this disclosure, one skilled in the art may appreciate that the connectors 410 may allow other structures and/or devices to be connected. As an example, FIG. 19 and FIG. 20 illustrate the attachment system 400 with a receiving portion 436 attached to the base 402. The receiving portion 436 may be a pouch, a container, a bag, a pack, and/or a sleeve, and the receiving portion may be sized and configured to receive an accessory, such as the second accessory 418b (e.g., a pouch for a rangefinder). In some embodiments, the receiving portion 436 may be magnetically attached to the base 402 via the connector 410 or the receiving portion 436 may be directly attached to the base 402. In some embodiments, the receiving portion 436 may be integrated with the connector 410 such that the receiving portion and the connector 410 are one unit.

Figure 21:
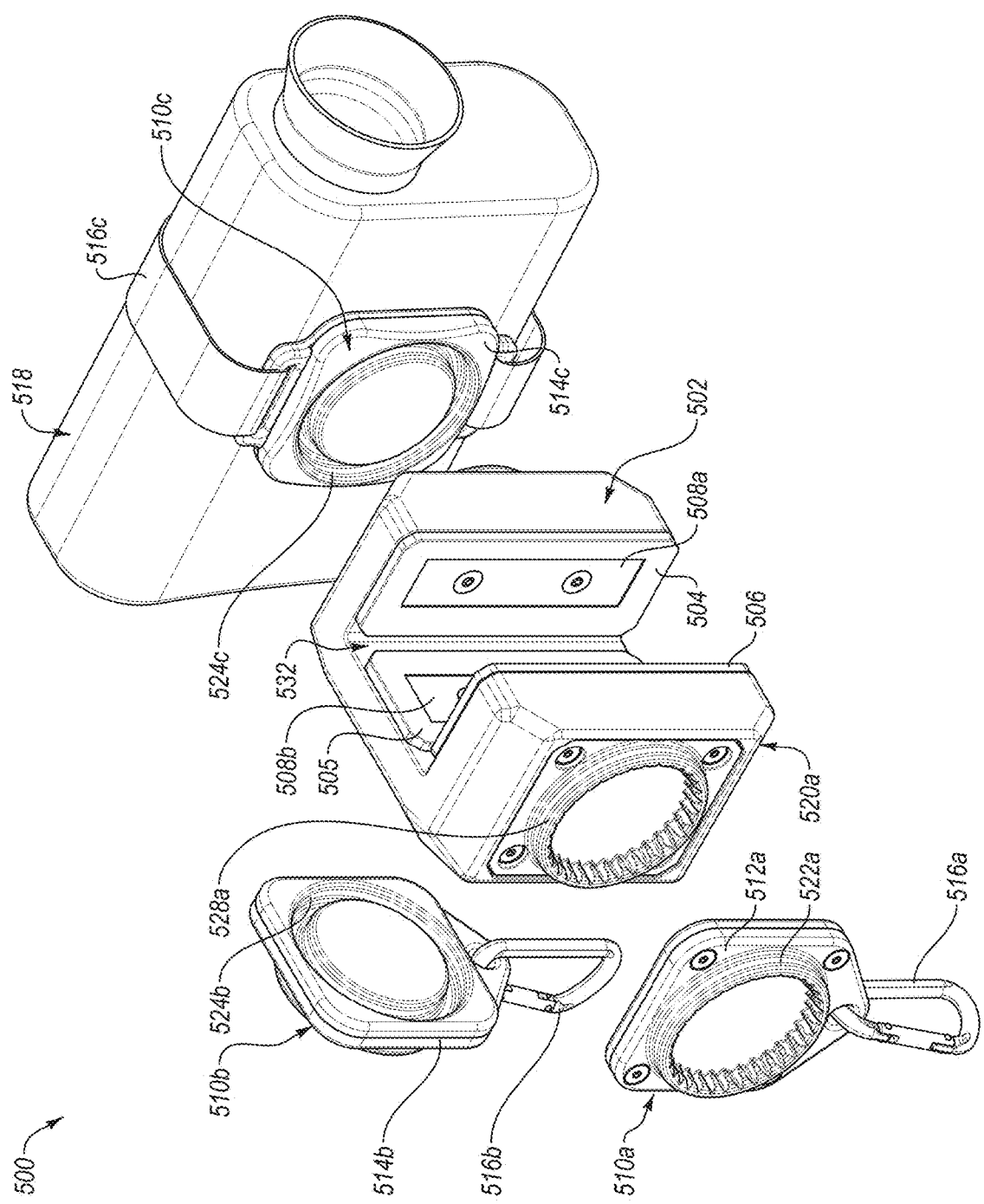
FIG. 21 is a rear exploded view of another exemplary attachment system including an exemplary base, exemplary connectors, and an exemplary accessory (e.g., a rangefinder) attached to the base by an exemplary connector.
Figure 22:
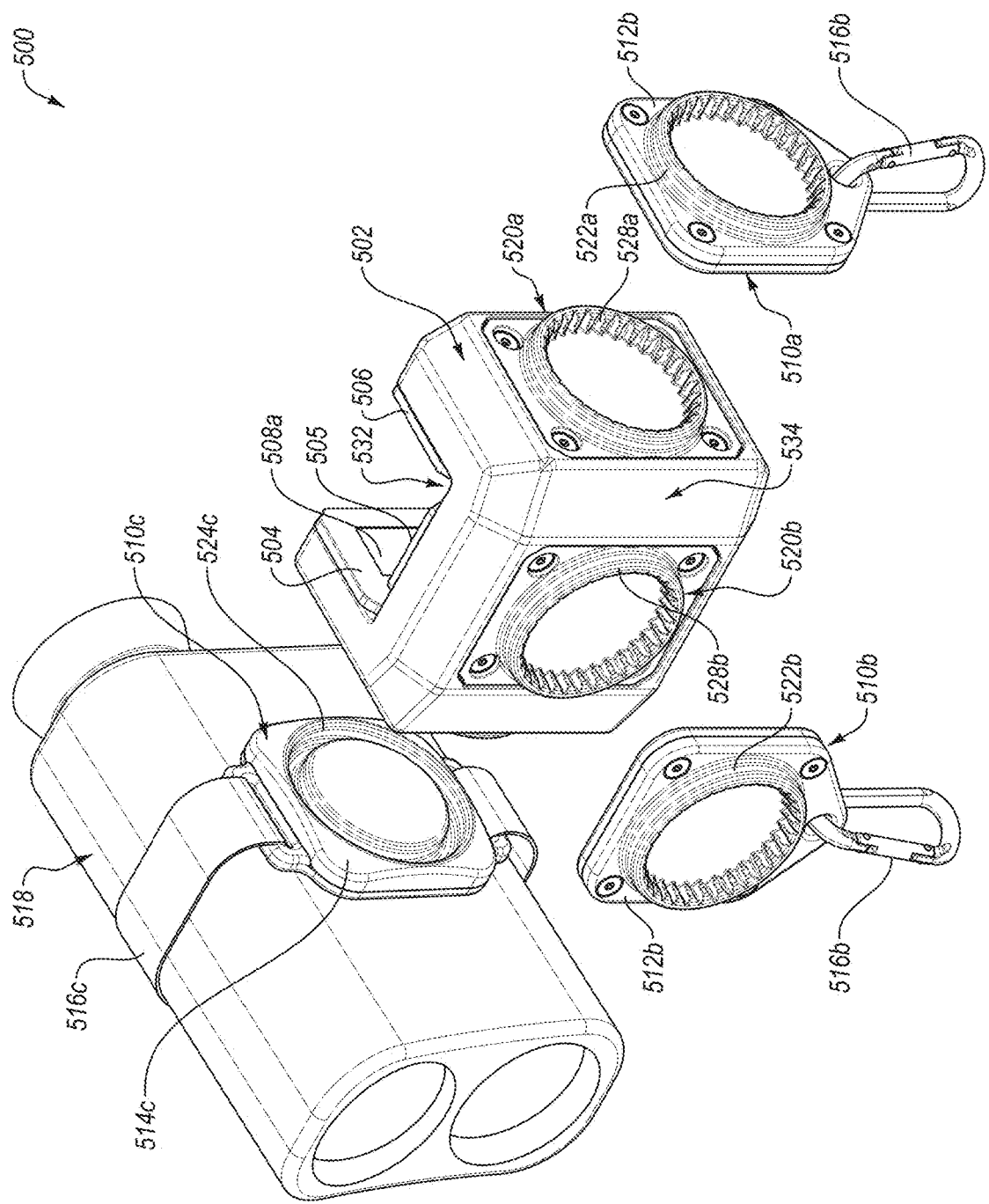
FIG. 22 is a front exploded view of the exemplary attachment system shown in FIG. 21.

FIGS. 21 and 22 illustrate another exemplary attachment system 500, and the attachment system may include an exemplary base 502, exemplary connectors 510, and an exemplary accessory 518 (e.g., a rangefinder) attached to the base 502 by an exemplary connector 510. The attachment system 500 may be at least partially similar or the same as other attachment systems, components, and features described in this disclosure. For example, the attachment system 500 may include the base 502, one or more connectors 510, and the accessory 518.

As shown in FIG. 21, the base 502 may have a first base portion 532 with a first side 504, a second side 505, and a third side 506. Each of the sides may include one or more magnets 508. For example, the first side 504 may include one or more magnets 508a, the second side 505 may include one or more magnets 508b, and the third side 506 may include one or more magnets (not shown). In some of these embodiments, the first side 504 and the third side 506 may disposed at a substantially right angle or a substantially ninety-degree (90°) angle relative to the second side 505 such that the first base portion 532 may have an at least substantially U-shaped configuration. In some embodiments, the one or more magnets 508a and the one or more magnets of the third side 506 may be disposed at a substantially right angle or a substantially ninety-degree (90°) angle relative to the one or more magnets 508b. The magnets 508 may allow the first base portion 532 to be releasably attached to a mounting surface such as a surface on a golf cart.

As shown in FIG. 22, the base 502 may have one or more base attachment portions 520, which may be attached to one or more connectors 510. For example, a first connector 510a may be attached to a first base attachment portion 520a, a second connector 510b may be attached to a second base attachment portion 520b, and a third connector 510c may be attached to a third base attachment portion (not shown). Accessories such as the accessory 518 may be attached to the base 502 via the connectors 510 or otherwise. Thus, in this exemplary embodiment, three or more accessories 518 may be attached to the base 502.

The base attachment portions 520 may be similar to similar components and features described in this disclosure. For example, as shown in FIG. 22, the base attachment portions 520 may each include an engagement portion 528, which may also have engaging portions on an inner portion of the engagement portion 528. Additionally, each of the connectors 510 may be similar to similar components and features described in this disclosure. For example, as shown in FIG. 22, the connectors 510 may include a first side 512 with a first connector attachment portion 522, a second side 514 with a second connector attachment portion 524, and an accessory attachment mechanism 516.

Modifications, additions, or omissions may be made to the attachment system 500 of FIGS. 21-22, without departing from the scope of the present disclosure. For example, while the attachment system 500 is described as being attached to golf-related mounting surfaces and golf related accessories being attached to the base 502, it will be appreciated that the attachment system 500 may be attached to any suitable mounting surface and any suitable accessories 518 may be attached. In some embodiments, multiple accessories 518 may be attached and/or the accessories 518 may be directly attached to the base 502. Furthermore, the base 502, the connectors 510, and/or the accessories 518 may be similar to the components and features described in this disclosure.

Figure 24:
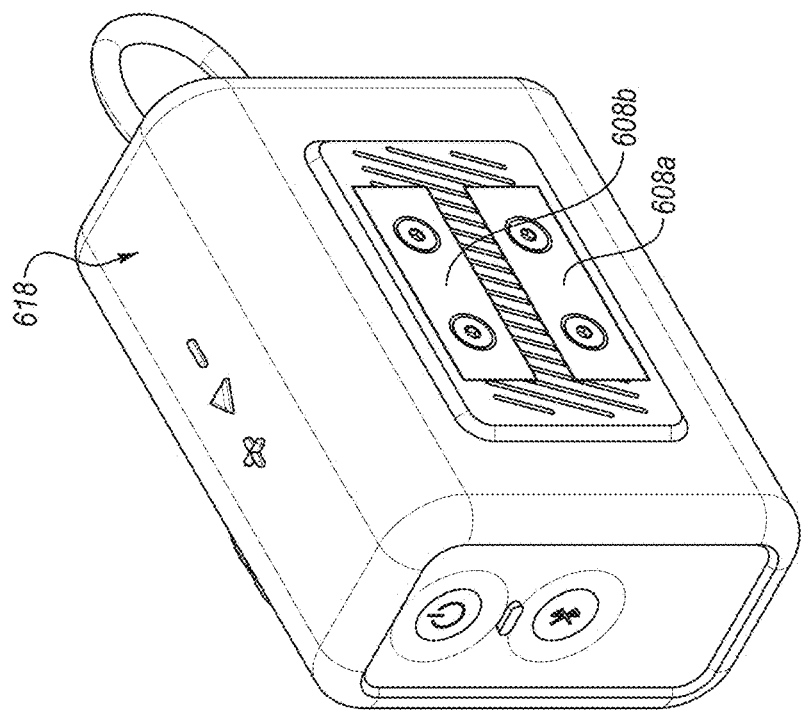
FIG. 24 is another upper perspective view of the exemplary accessory shown in FIG. 23.
Figure 23:
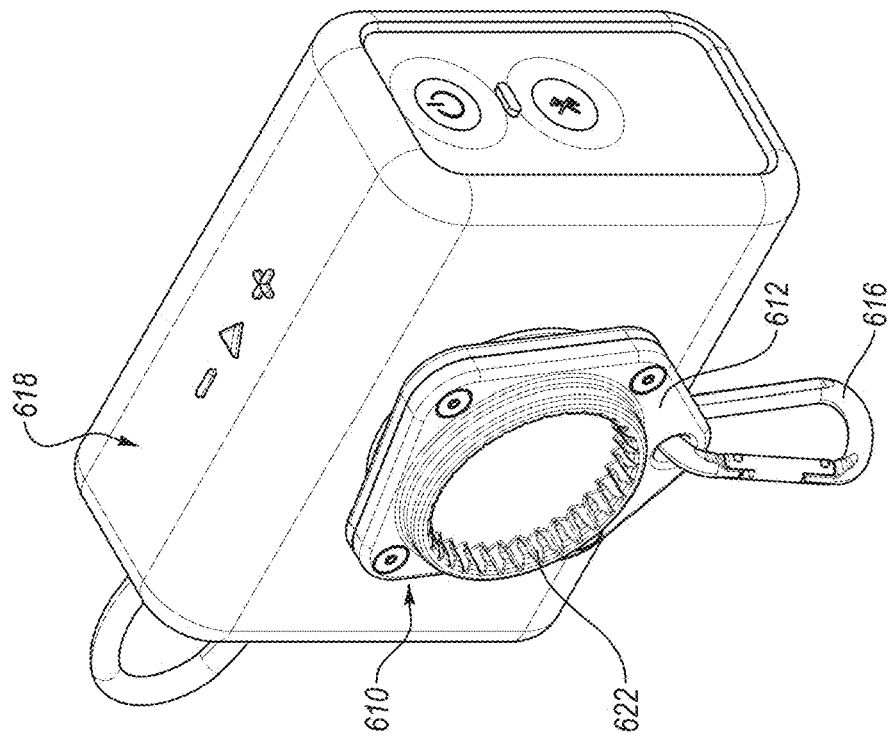
FIG. 23 is an upper perspective view of an exemplary connector attached to an exemplary accessory (e.g., a rangefinder)

FIGS. 23 and 24 illustrate an exemplary connector 610 attached to an exemplary accessory 618 (e.g., a rangefinder). FIGS. 23 and 24 illustrate that a portion of any of the attachment systems described in this disclosure may be attached to and/or be integrally formed with the accessory 618 such as a rangefinder. For example, the accessory 618 may include one or more magnets 608a and 608b, which may allow the accessory 618 to be attached to a base and/or a mounting surface. In some embodiments, the accessory 618 may also include a base attachment portion (not shown) and a connector 610 may be attached to the base attachment portion.

Thus, in some embodiments, the accessory 618 may function as an accessory (e.g., a rangefinder) and one or more accessories 618 and/or connectors 610 may be attached to the accessory 618. Furthermore, the accessory 618 may be attached to a base and/or other suitable portions of the attachment system. In this exemplary embodiment, the accessory 618 may include one or more attachment portions, which may allow the accessory 618 to be attached to other connectors, bases, and/or accessories. The accessory 618 may also include one or more magnets, which may allow the accessory 618 to be attached to other connectors, bases, and/or accessories. This may allow, for example, one side of the accessory 618 to be attached to a base and/or a connector, and the other side of the accessory 618 to be attached to a mounting surface or structure.

The connector 610 may be similar to other connectors described in this disclosure. For example, the connector 610 may include a first side 612 having a first connector attachment portion 622 and an accessory attachment mechanism 616.

Modifications, additions, or omissions may be made to the accessory 618 shown in FIGS. 23-24, without departing from the scope of the present disclosure. For example, the one or more magnets 608a and/or the one or more magnets 608b may be omitted. Furthermore, the base attachment portion may not be included in the accessory 618. Additionally, the connector 610 is shown as attached to the accessory 618, however, in some embodiments, the connector 610 may be integral with the accessory 618 such that the accessory 618 and the connector 610 are one unit.

Figure 25:
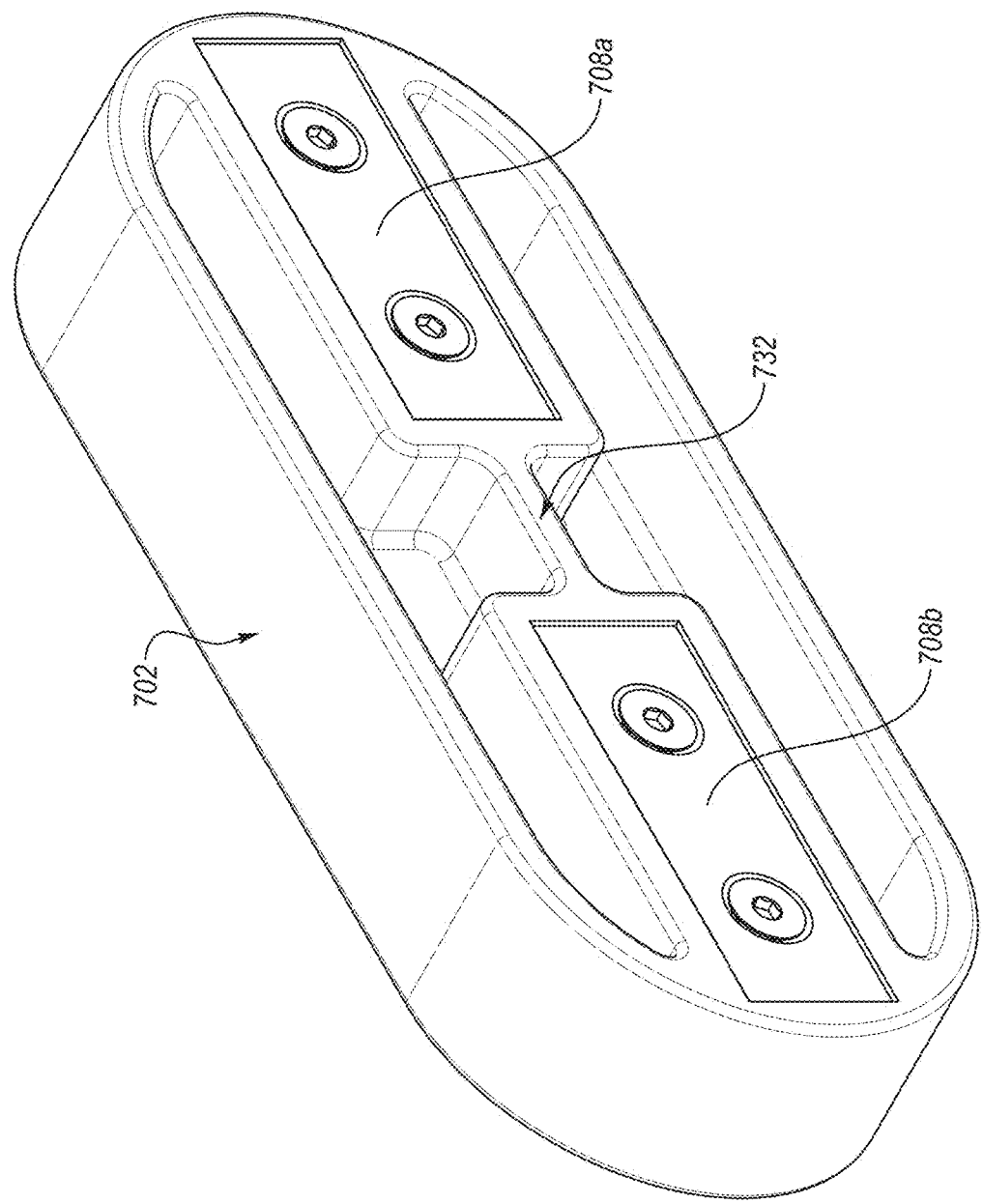
FIG. 25 is a rear perspective view of an exemplary base.
Figure 26:
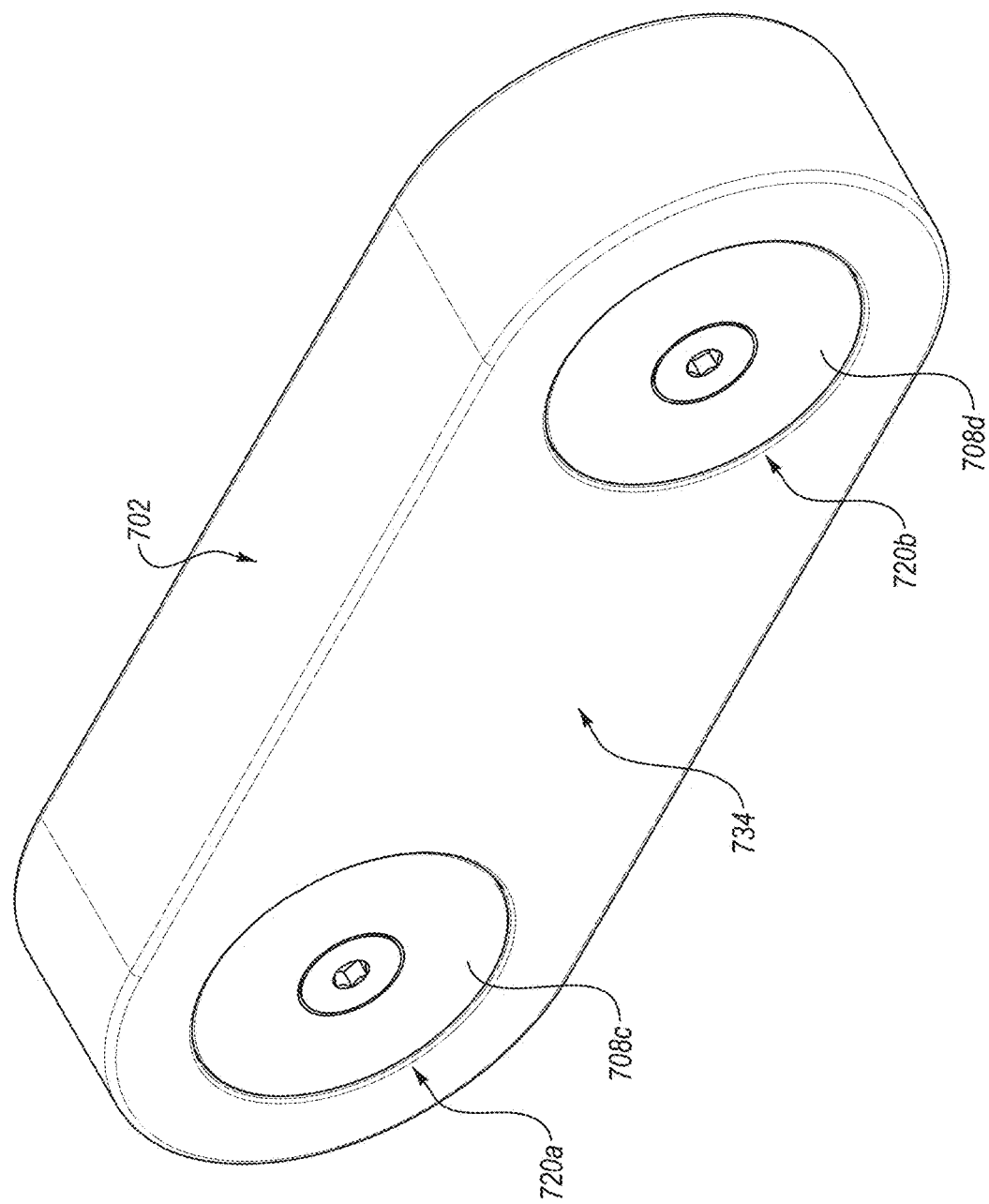
FIG. 26 is a front perspective view of the exemplary base shown in FIG. 25.

FIGS. 25 and 26 illustrate an exemplary base 702. The base 702 may include a first base portion 732 and a second base portion 734. The first base portion 732 may be a rear portion of the base 702 and the second base portion 734 may be a front portion of the base 702.

As shown in FIG. 25, the first base portion 732 may include a first magnetic structure 708a and a second magnetic structure 708b. The first magnetic structure 708a and the second magnetic structure 708b may be spaced apart by a distance. The first magnetic structure 708a and the second magnetic structure 708b may be sized and configured to allow the base 702 to be magnetically attached to a support surface or a mounting surface. In some embodiments, the first magnetic structure 708a and the second magnetic structure 708b of the first base portion 732 may be or include one or more magnets. The magnetic structures 708 may be at least partially similar to or the same as the magnets and/or magnetic structures described in this disclosure.

Figure 30:
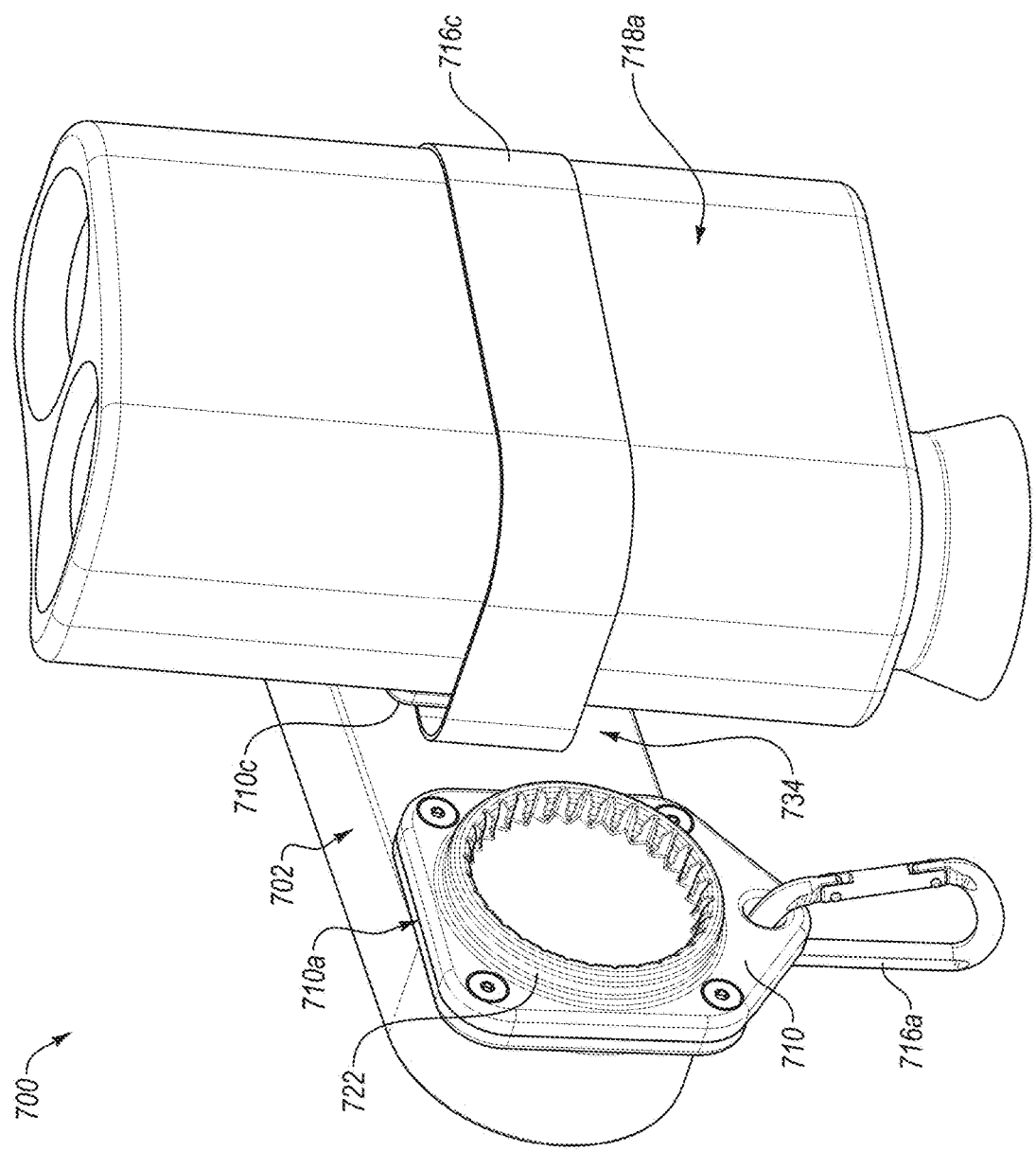
FIG. 30 is a front perspective view the exemplary attachment system shown in FIG. 27 including an exemplary accessory (e.g., a rangefinder) attached to the base.
Figure 31:
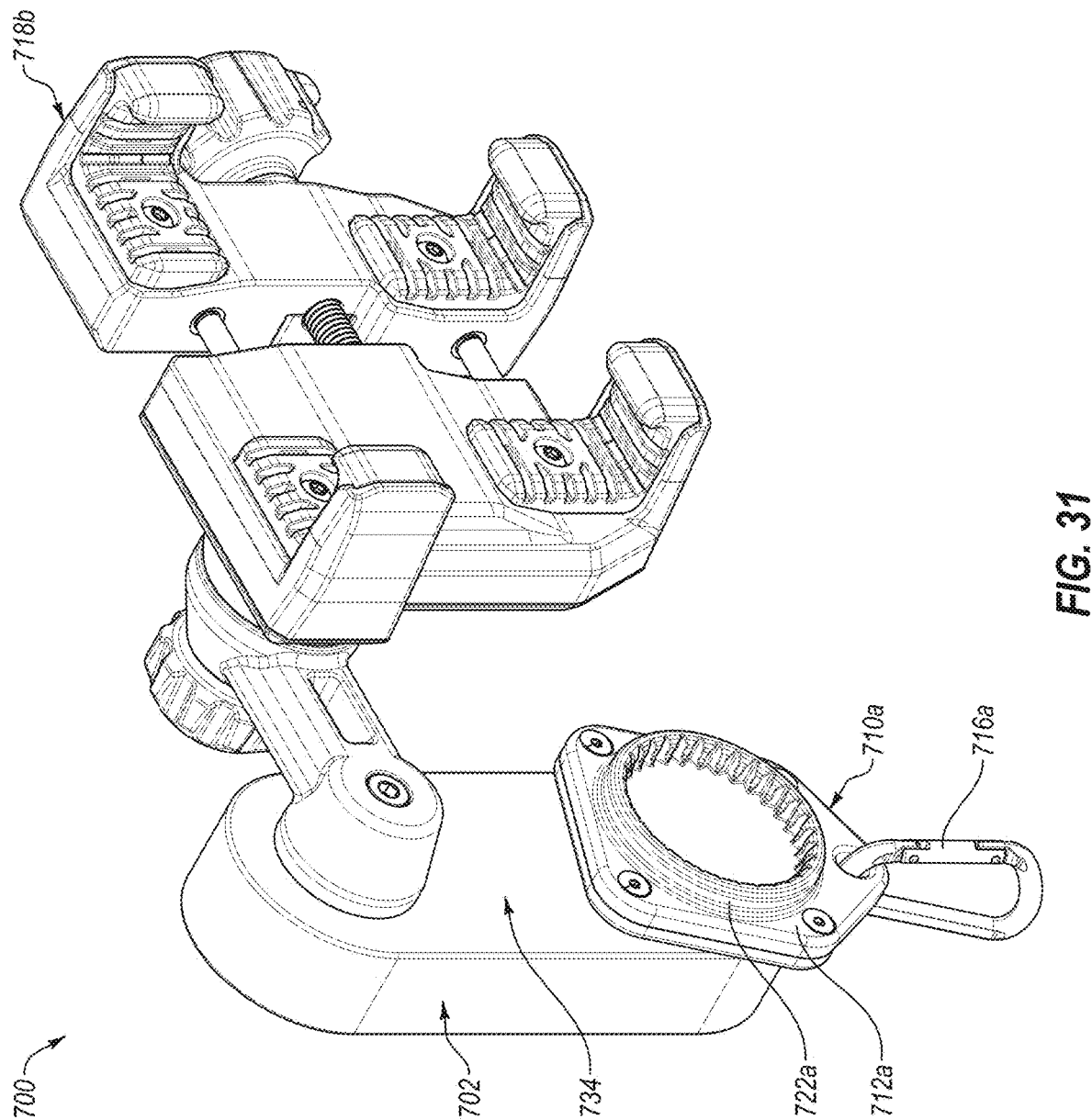
FIG. 31 is a front perspective view of an exemplary attachment system including an exemplary base, an exemplary connector, and an exemplary accessory (e.g., a phone holder) attached to the base.
Figure 32:
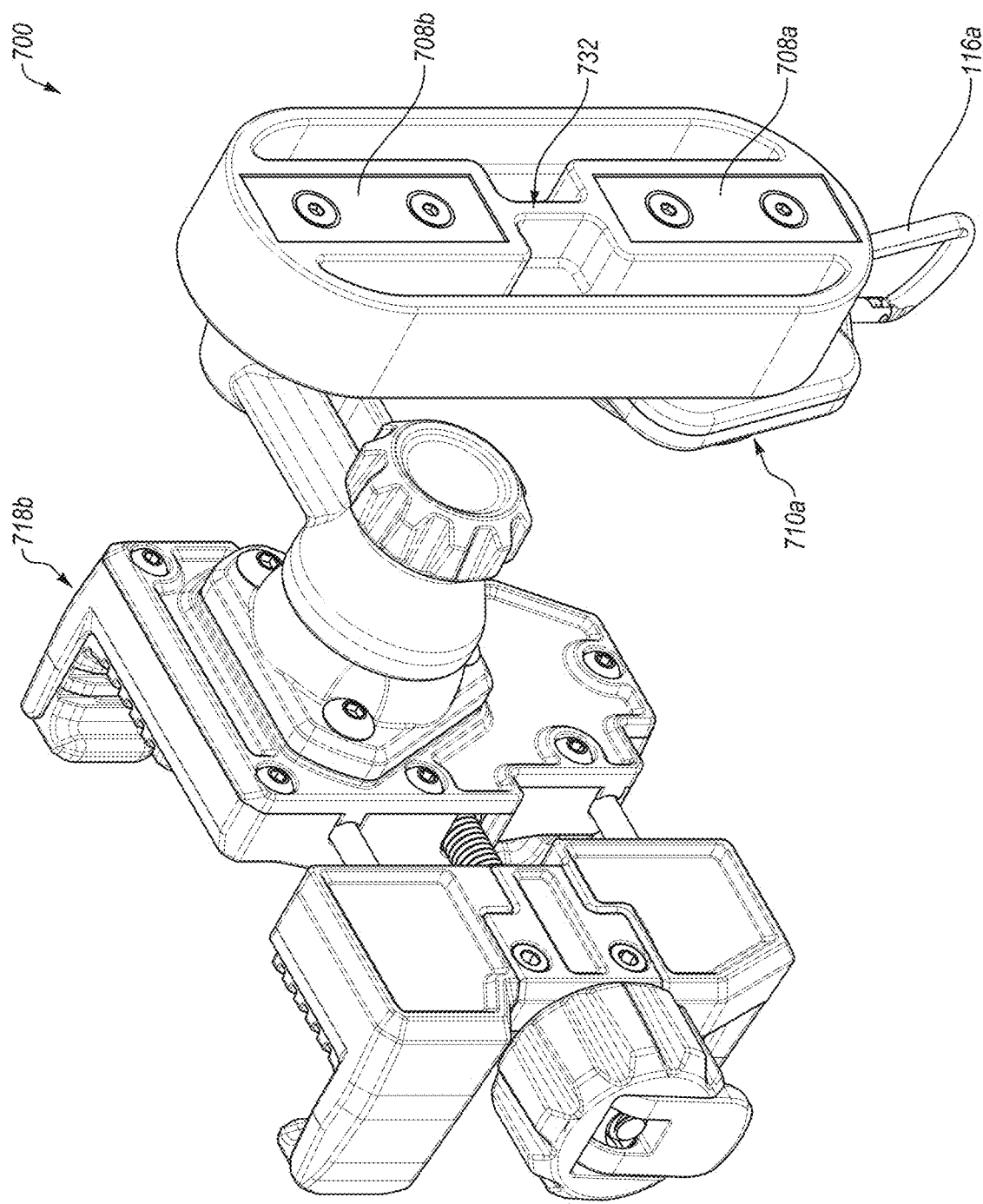
FIG. 32 is a rear perspective view of the exemplary attachment system shown in FIG. 31.

As shown in FIG. 26, the second base portion 734 may include a first base attachment portion 720a and a second base attachment portion 720b. The first base attachment portion 720a and the second base attachment portion 720b may be spaced apart by a distance. The base attachment portions 720 may be sized and configured to allow one or more connectors 710 (such as shown in FIGS. 27-32) to be attached to the base 702 and/or one or more accessories 718 (such as shown in FIGS. 30-32) to be attached to the base 702.

In some embodiments, the base attachment portions 720 may include one or more magnetic structures 708. For example, the first base attachment portion 720a may include a first magnetic structure 708c and the second base attachment portion 720b may include a second magnetic structure 708d. In some embodiments, the first magnetic structure 708c of the first base attachment portion 720a and the second magnetic structure 708d of the second base attachment portion 720b may include one or more magnets. The magnetic structures 708c and 708d may be at least partially similar to or the same as the magnets and/or magnetic structures described in this disclosure.

Figure 27:
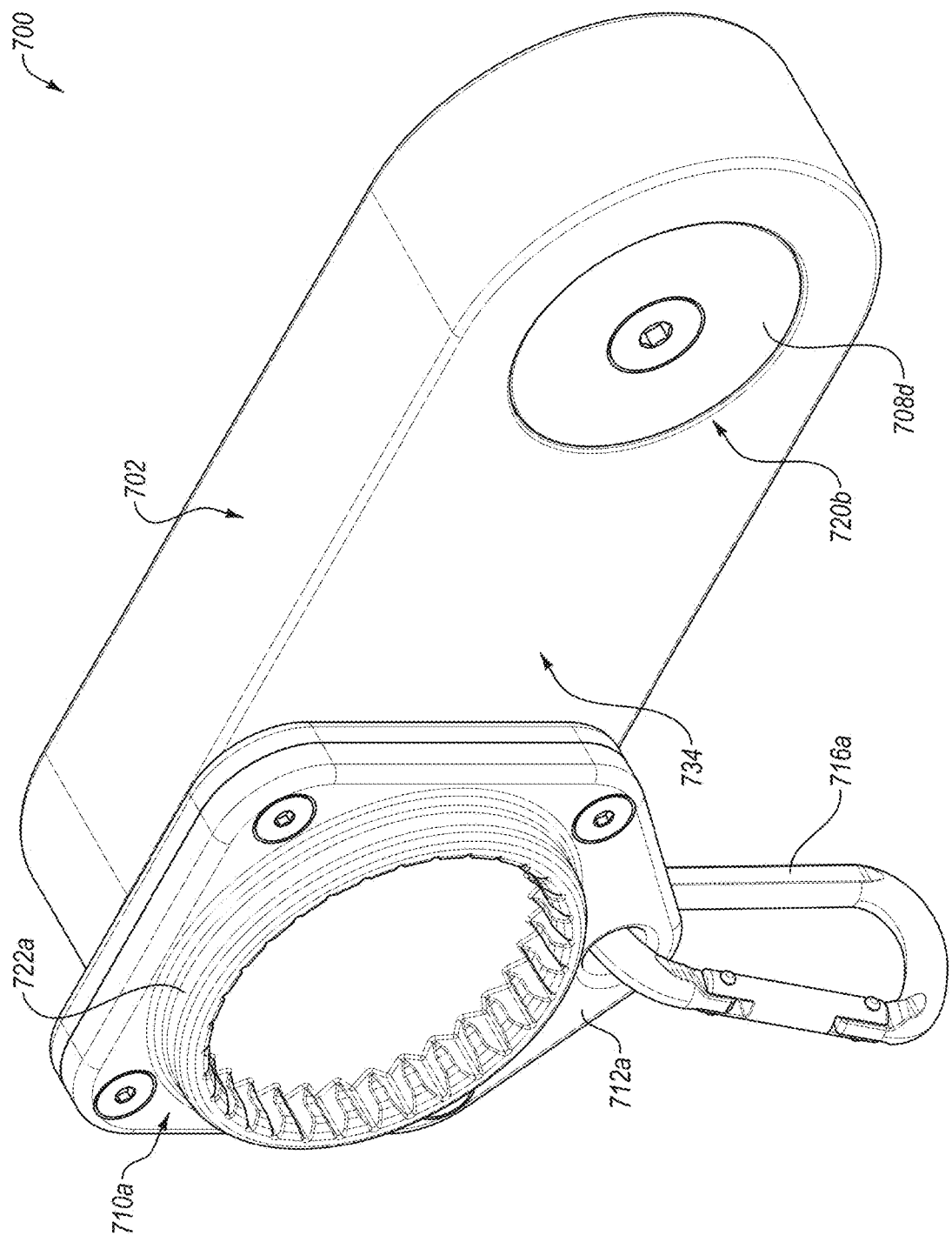
FIG. 27 is a front perspective view of an exemplary attachment system including the exemplary base shown in FIG. 26 and an exemplary connector attached to the base.

In some embodiments, a magnetic field of one or more of the magnetic structures 708 of the first base portion 732 may cooperate with a magnetic field of one or more of the base attachment portions 720. For example, the magnetic structure 708a of the first base portion 732 may cooperate with the magnetic structure 708c of the first base attachment portion 720a. In another example, the magnetic structure 708b may cooperate with the magnetic structure 708d of the second base attachment portion 720b. As shown in FIG. 27, the first connector 710a may be magnetically attached to the first base attachment portion 720a.

Figure 28:
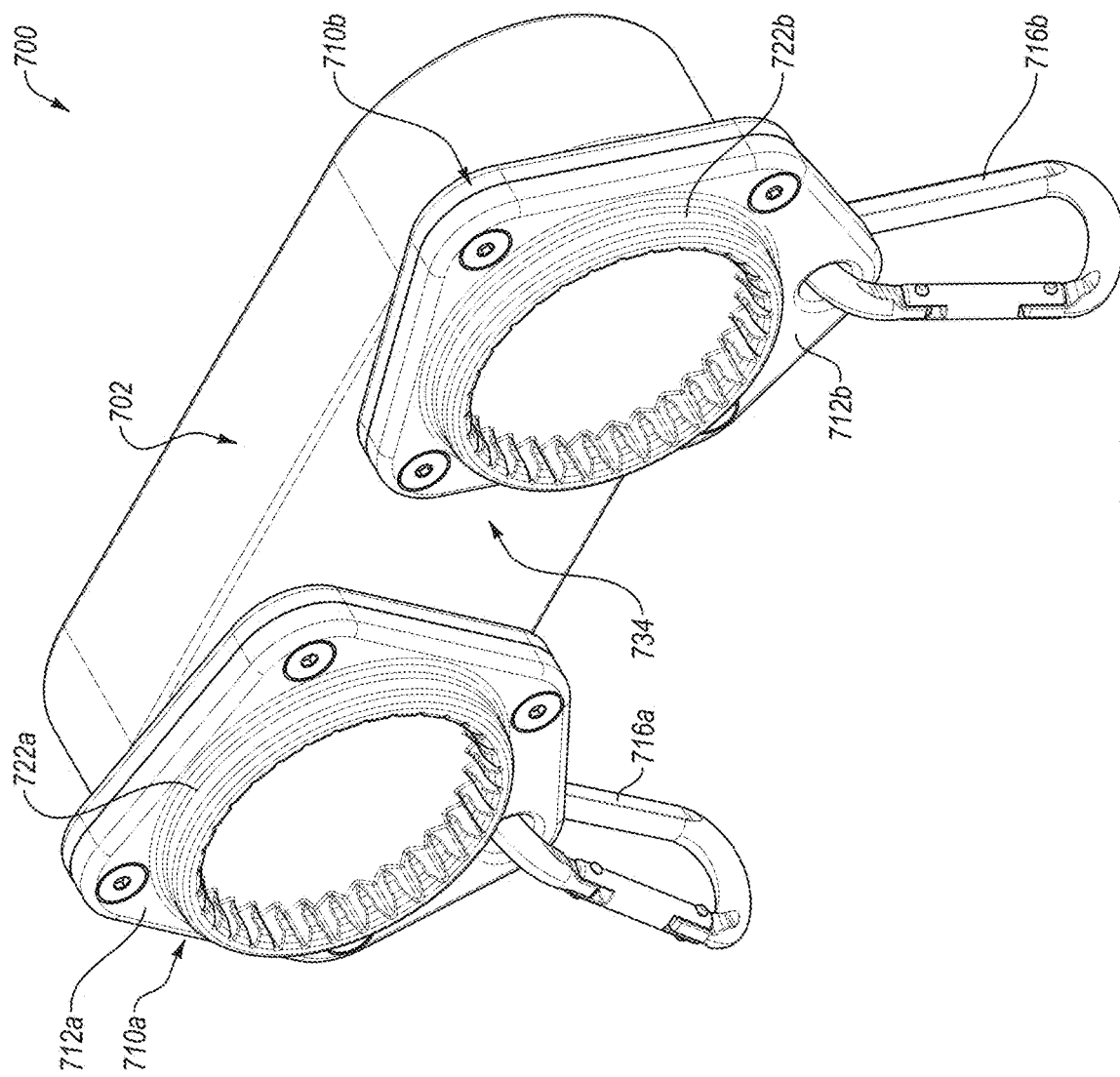
FIG. 28 is a front perspective view of an exemplary attachment system including the exemplary base shown in FIG. 26 and two exemplary connectors attached to the base.
Figure 29:
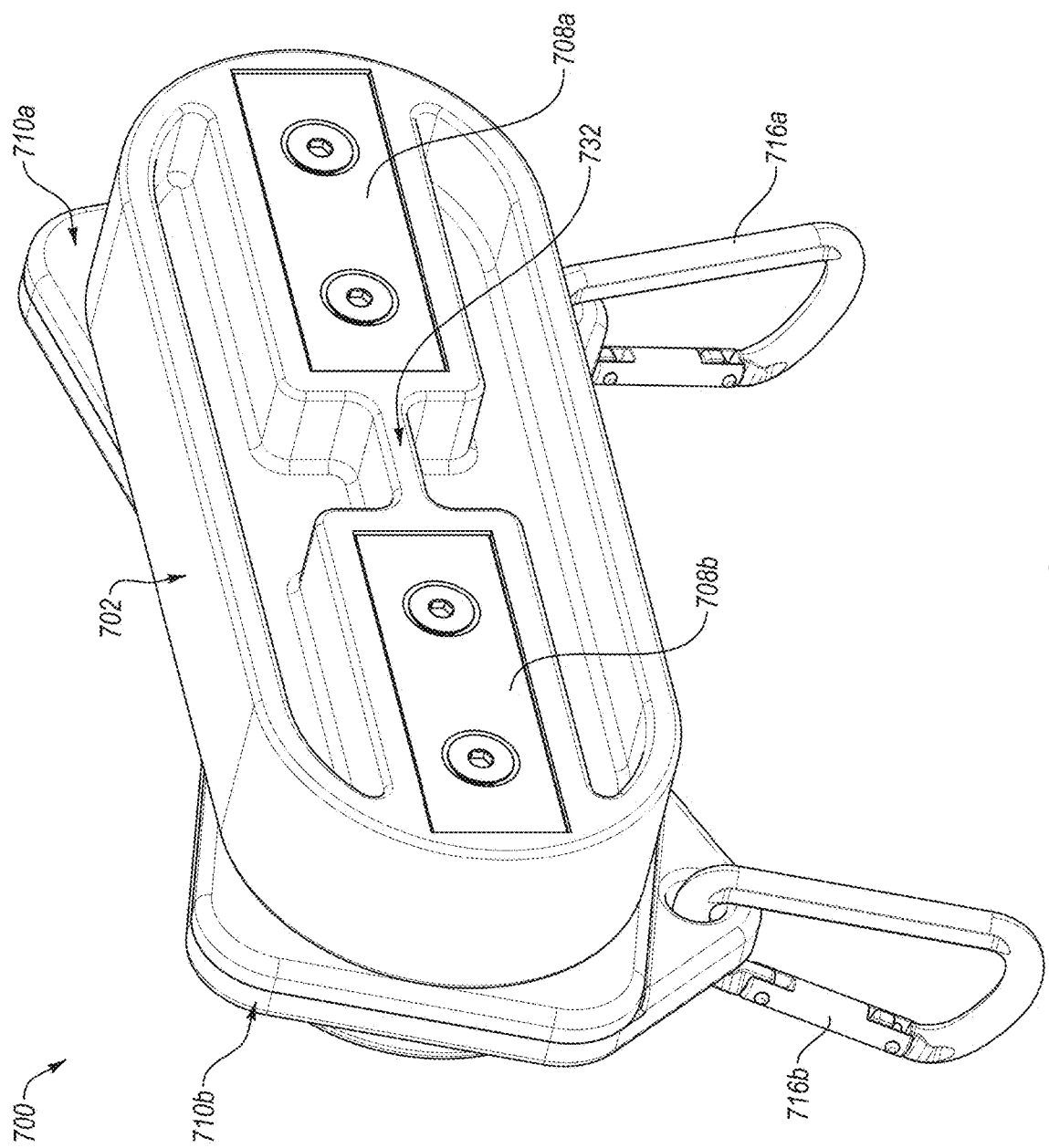
FIG. 29 is a rear perspective view of the exemplary attachment system shown in FIG. 28.

Additionally, as shown in FIGS. 28 and 29, a second connector 710b may be attached to the second base attachment portion 720b. The connectors 710 may be at least partially similar to and/or have the same or similar components as connectors described in this disclosure. For example, the connectors 710 may have first side 712 with a first connector attachment portion 722 and an accessory attachment mechanism 716.

In some embodiments, the connectors 710 may include one or more magnetic structures. For example, the connectors 710 may have a magnetic structure disposed between the first side 712 of the connector 710 and a second side of the connector 710. In some embodiments, the first connector 710a may be connected to the first base attachment portion 720a and a magnetic field of the first connector 710a may cooperate with the magnetic field of one or more of the magnetic structures 708 of the first base portion 732 and/or the magnetic field of the first base attachment portion 720a. For example, the magnetic field of the first connector 710a may cooperate with the magnetic field of the magnetic structure 708a of the first base portion 732 and/or the magnetic field of the magnetic structure 708c of the first base attachment portion 720a. In some embodiments, the second connector 710b may be connected to the second base attachment portion 720b and a magnetic field of the second connector 710b may cooperate with the magnetic field of the one or more of the magnetic structures 708 of the first base portion 732 and/or the magnetic field of the second base attachment portion 720b. For example, the magnetic field of the second connector 710b may cooperate with the magnetic field of the magnetic structure 708b of the first base portion 732 and/or the magnetic field of the magnetic structure 708d of the second base attachment portion 720b. One skilled in the art may appreciate, after reviewing this disclosure, that one or more magnets and/or magnetic fields may be positioned and/or arranged to cooperate or work with or against other magnets and/or magnetic fields.

Modifications, additions, or omissions may be made to the attachment system 700 shown in FIGS. 27-28 and/or the base 702 of the attachment system 700 without departing from the scope of the present disclosure. For example, while the attachment system 700 is described as being attached to golf-related mounting surfaces and golf related accessories being attached to the base 702, it will be appreciated that the attachment system 700 may be attached to any suitable mounting surface and any suitable accessories 718 may be attached.

As shown in the accompanying figures, the connectors 710 may include one or more accessory attachment mechanisms 716. For example, the accessory attachment mechanism 716 may be one or more exemplary carabiners. It may be appreciated that the connectors 710 may also have different accessory attachment mechanisms 716. For example, the second connector 710b may be replaced with a third connector 710c and the third connector may have a different accessory retention mechanism 716c, which may be a strap configured to be attached to an accessory, such as a rangefinder. As shown in FIG. 30, an accessory 718a (e.g., a rangefinder) may be attached to the third connector 710c.

In some embodiments, the accessory 718 may be attached directly to the base 702. For instance, the accessory 718 may be directly attached to the base attachment portions 720. For example, as shown in FIGS. 31 and 32, the accessory 718b (e.g., a phone holder) may be directly attached to the second base attachment portion 720b. In some embodiments, multiple accessories 718 may be attached to the base 702 directly and/or via one or more of the connectors 710. For example, the accessory 718a (e.g., a rangefinder) may be attached to the first base attachment portion 720a and the accessory 718b (e.g., a phone holder) may be directly attached to the second base attachment portion 720b. Furthermore, the base 702, the connectors 710, and/or the accessories 718 may be similar to similar components and features described in this disclosure.

Figure 33:
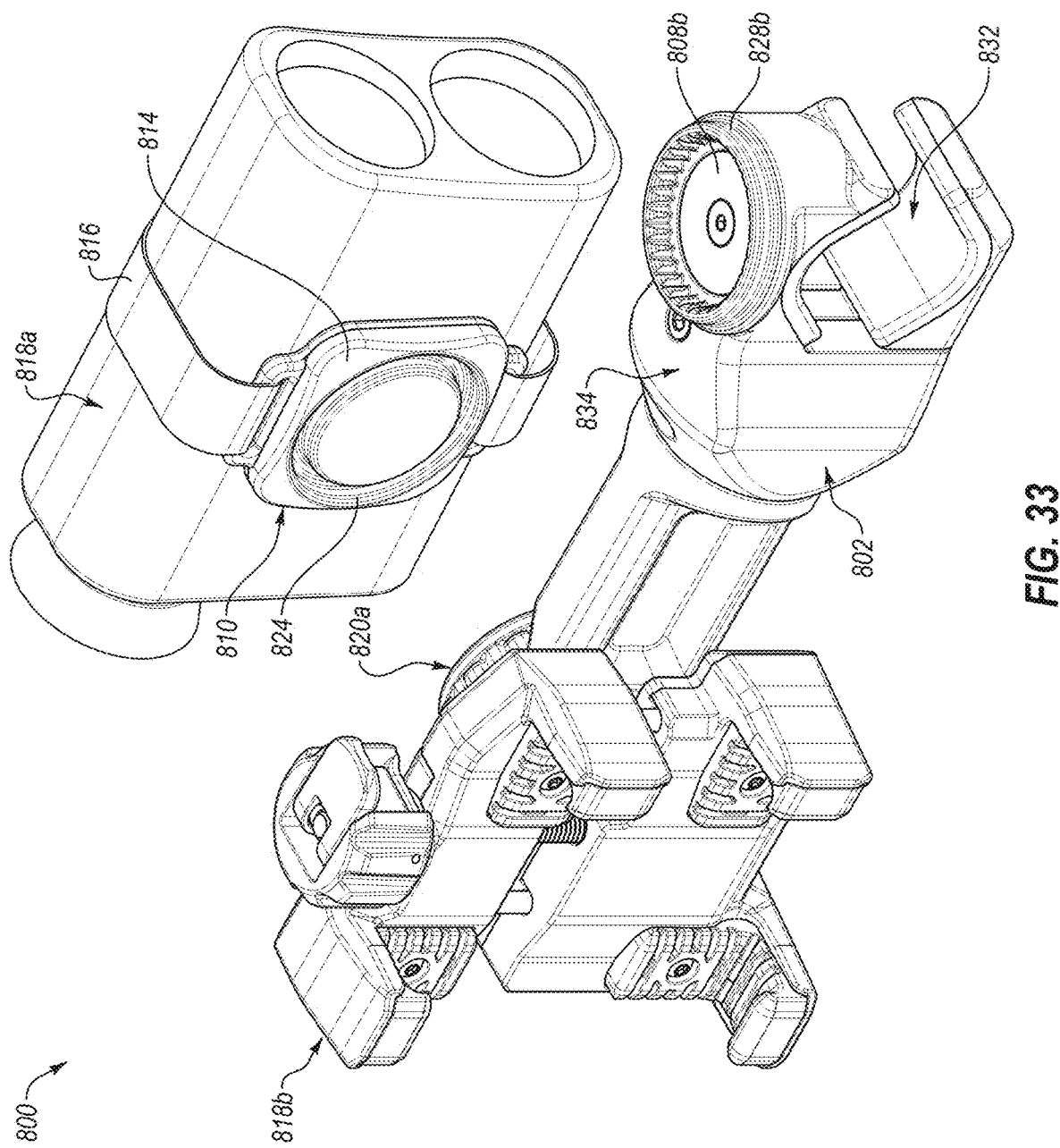
FIG. 33 is a front perspective view of another exemplary attachment system, illustrating an exemplary base, an exemplary connector, and exemplary accessories (e.g., a rangefinder and a phone holder)
Figure 34:
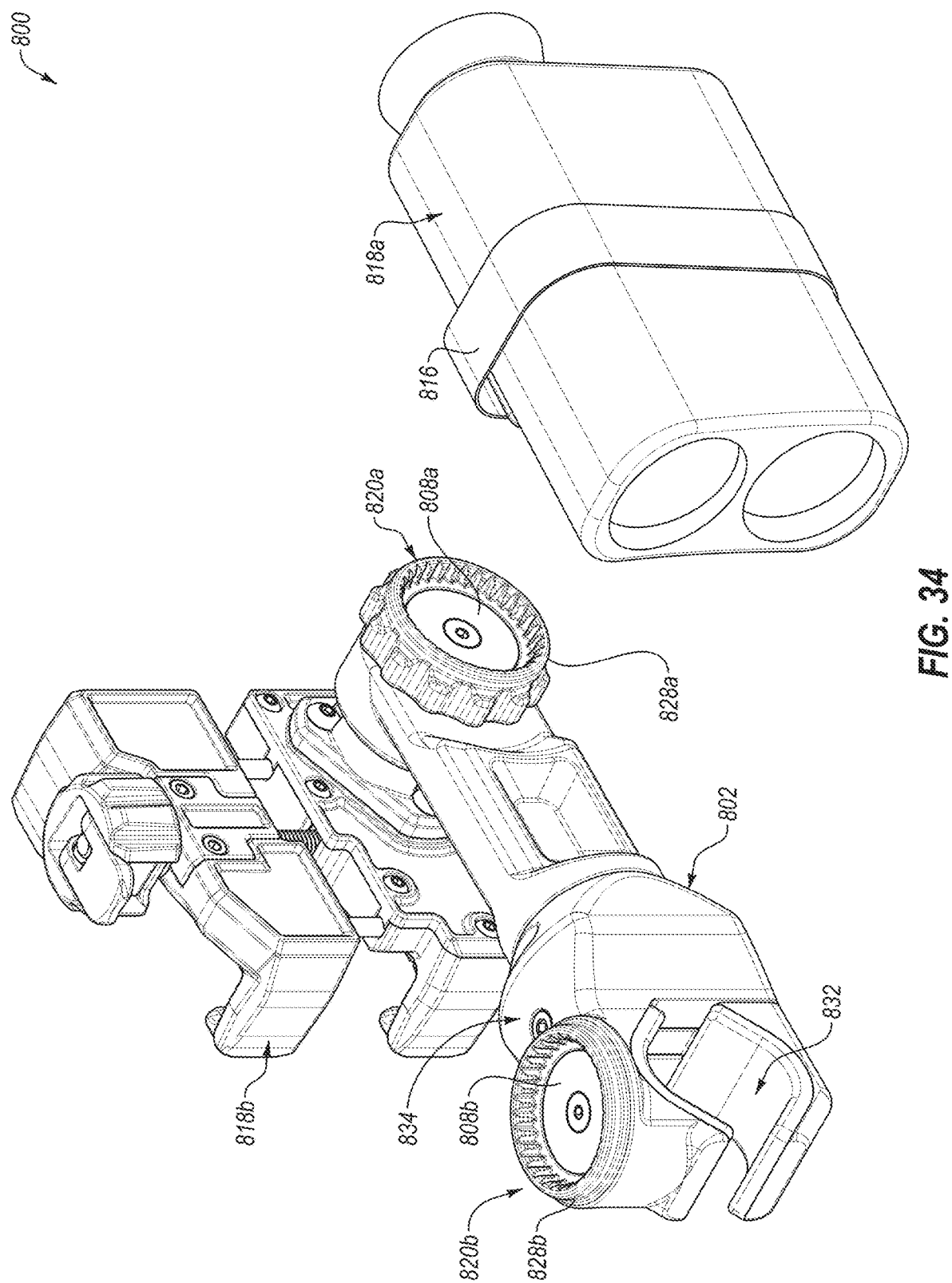
FIG. 34 is a rear perspective view of the exemplary attachment system shown in FIG. 33.

FIG. 33 and FIG. 34 illustrate another exemplary attachment system 800 and the attachment system may include an exemplary base 802, an exemplary connector 810, and exemplary accessories 818 (e.g., a rangefinder and a phone holder). The attachment system 800 may be at least partially similar or the same as other attachment systems, features, and components described in this disclosure. For example, the attachment system 800 may include the base 802, one or more connectors 810, and one or more accessories 818.

As shown in FIGS. 33-34, the base 802 may include a first base portion 832 and a second base portion 834. The first base portion 832 may be sized and configured to be releasably attached to a mounting surface. The second base portion 834 may include one or more base attachment portions 820. For example, the second base portion 834 may include a first base attachment portion 820a and a second base attachment portion 820b.

In some embodiments, such as illustrated in FIGS. 33-34, the first base portion 832 may include a clamp, which may allow the first base portion 832 to be releasably attached to a mounting surface. In some embodiments, the clamp may be a compression clamp that may be configured to attach the base 802 to a mounting surface such as a golf push cart.

In these and other embodiments, the clamp may be sized and configured to allow the base 802 to be coupled to other mounting surfaces or structures like a golf cart or a golf bag. In some embodiments, the clamp may be adjustable in size and the clamp may include portions that are flexible and/or compressible, which may facilitate attachment of the clamp to a mounting surface such as a roll bar on a golf cart or a pushcart. In some embodiments, the clamp may be secured in a desired position by a fastener such as a screw or a locking pin.

In an example operation, the user may push the clamp against the mounting surface such that the mounting surface enters the clamp. The interior surface of the clamp may press against the mounting surface such that the clamp may couple the base 802 to the mounting surface.

The base attachment portions 820 may include an engagement portion 828 and one or more magnets 808, which may facilitate attachment of one or more connectors 810 and/or one or more accessories 818 to the base 802. For example, the connector 810 may be connected to a first accessory 818a, such as a rangefinder, via an accessory attachment mechanism 816, such as a strap, and the connector 810 may be magnetically attached to the first base attachment portion 820a. The connector 810 may include a second connector attachment portion 824 (e.g., an inwardly extending generally ring-shaped portion) on a second side 814 of the connector 810, which may engage the engagement portion 828a (e.g., an outwardly extending generally ring-shaped portion) of the first base attachment portion 820a. Furthermore, the connector 810 may include one or more magnets, which may cooperate with the magnet 808a of the first base attachment portion 820a to magnetically attach the connector 810 to the first base attachment portion 820a.

In some embodiments, a second accessory 818b (e.g., a phone holder) may be directly attached to the base 802. In some embodiments, the second accessory 818b may be attached to the second base attachment portion 820b. In some embodiments, the second accessory 818b may be attached to the base 802 and a third accessory (not shown) and/or a second connector (not shown) may be attached to the second base attachment portion 820b.

In some embodiments, the base attachment portions 820 may be generally disposed in the same plane. In some embodiments, the base attachment portions 820 may be generally disposed in different planes. In some embodiments, the base attachment portions 820 may be disposed at different ends of the base 802 and/or on different sides of the base 802. In some embodiments, the base attachment portions 820 may be on the same ends of the base 802 and/or on same sides of the base 802.

In some embodiments, such as illustrated in FIG. 34, the base attachment portions 820 may face different directions. For example, the first base attachment portion 820a may face a first direction and the second base attachment portion 820b may face a second direction. For example, the second direction may be offset from the first direction (e.g., plus or minus about 30 degrees, about 60 degrees, about 90 degrees, about 120 degrees, about 150 degrees, or about 180 degrees from the first direction). In these exemplary embodiments, the offset of the base attachment portions 820 may be configured based on the particular accessories being utilized. In some embodiments, the user may adjust the position and/or orientation of the base attachment portions 820.

Modifications, additions, or omissions may be made to the attachment system 800 of FIGS. 33-34 without departing from the scope of the present disclosure. For example, while the attachment system 800 is described as being attached to golf-related mounting surfaces and golf related accessories being attached to the base 802, it will be appreciated that the attachment system 800 may be attached to any suitable mounting surface and any suitable accessories 818 may be attached. Furthermore, the base 802, the connectors 810, and/or the accessories 818 may be similar to the components and features described in this disclosure.

Figure 35:
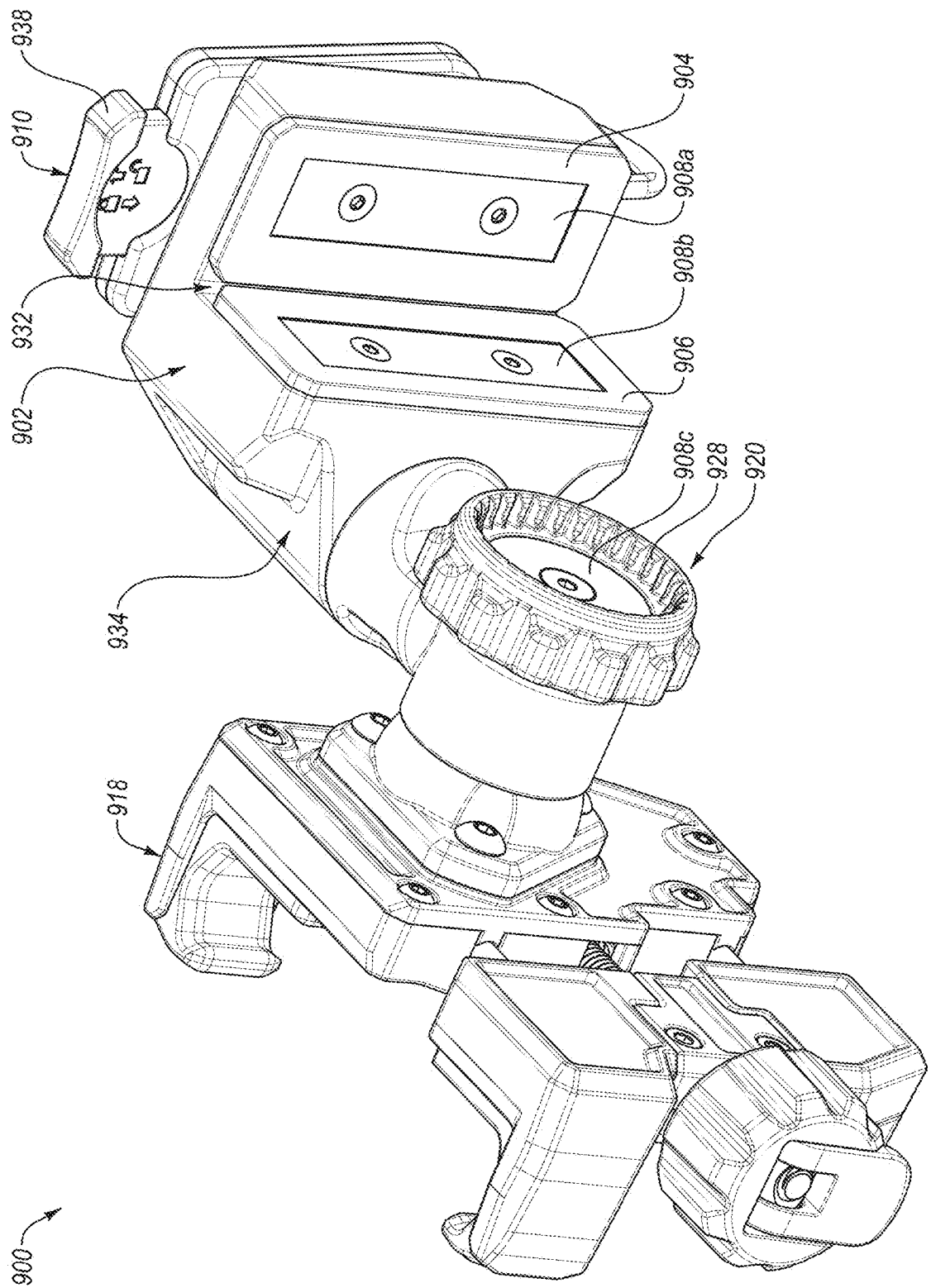
FIG. 35 is a rear perspective view of an exemplary attachment system, illustrating an exemplary base, an exemplary connector, and exemplary accessory (e.g., a phone holder)
Figure 36:
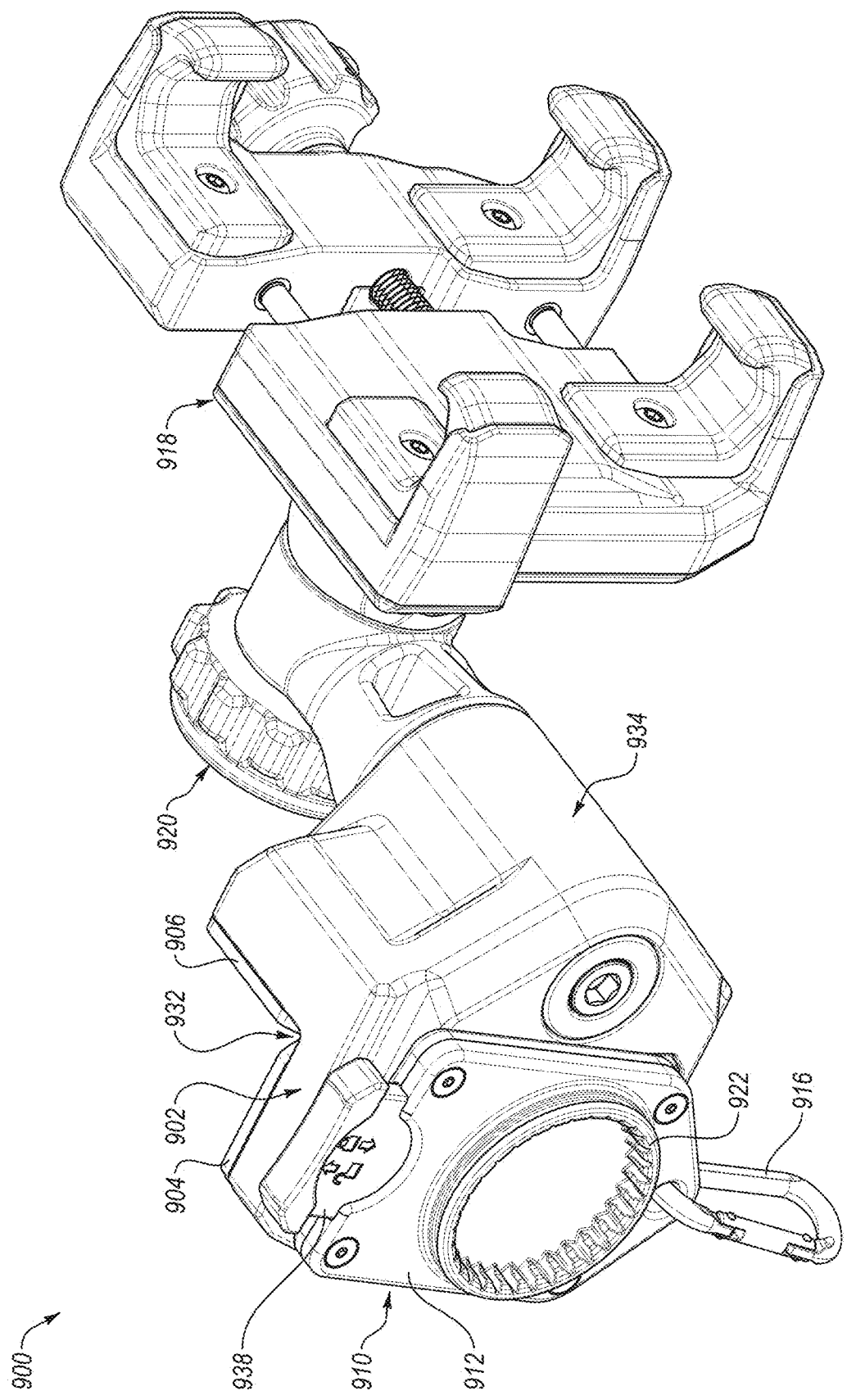
FIG. 36 is a front perspective view of the exemplary attachment system shown in FIG. 35.

FIG. 35 and FIG. 36 illustrate another exemplary attachment system 900, illustrating an exemplary base 902, an exemplary connector 910, and an exemplary accessory 918 (e.g., a phone holder). The attachment system 900 may be at least partially similar or the same as other attachment systems, components, and features described in this disclosure. For example, the attachment system 900 may include the base 902, one or more connectors 910, and one or more accessories 918.

The base 902 may include a first base portion 932 and a second base portion 934. The first base portion 932 may be sized and configured to be releasably attached to a mounting surface, such as a golf cart. For example, the first base portion 932 may include a first side 904 with one or more magnets 908a, which may magnetically attach the base 902 to a first surface or portion of a golf cart, and the first base portion 932 may include a second side 906 with one or more magnets 908b, which may magnetically attach the base 902 to a second surface or portion of a golf cart.

In some embodiments, the base 902 and/or the second base portion 934 may include one or more base attachment portions 920, which may be sized and configured to be releasably attached to one or more accessories 918 and/or one or more connectors 910. In some embodiments, the accessories 918 may be attached to the base 902 directly at the base attachment portions 920 or otherwise, and/or the accessories 918 may be attached to the base 902 via the one or more connectors 910. As shown in FIG. 35, in some embodiments, the base attachment portions 920 may include an engagement portion 928 and/or one or more magnets 908c, which may facilitate attachment of the one or more accessories 918 and/or the one or more connectors 910.

As shown in FIGS. 35-39, the attachment system 900 may include one or more connectors 910. The connectors 910 may include a first side 912 with a first connector attachment portion 922 and a second side 914 with a second connector attachment portion 924. The first connector attachment portion 922 and/or the second connector attachment portion 924 may be sized and configured to engage the base attachment portions 920 and/or one or more other connectors 910. In some embodiments, the first connector attachment portion 922 and/or the second connector attachment portion 924 may include one or more engaging portions 926. In some embodiments, the engaging portions 926 may be protrusions, teeth, splines, or other structures, and these structures may be sized and configured to prevent or impede rotation of the connector 910. For example, the first connector attachment portion 922 may be outwardly extending and generally-ring shaped with engaging portions 926a along the inner surface, and the second connector attachment portion 924 may be an inwardly extending generally ring-shape with corresponding engaging portions 926b along the inner surface. The engaging portions 926 may engage the engagement portion 928 and/or the engaging portions 926 of the other connectors 910 such that rotation of the connector 910 is prevented and/or inhibited.

In some embodiments, the connectors 910 may include an attachment point 915, which may be a hole or an aperture. In these and other embodiments, the connectors 910 may include an accessory attachment mechanism 916 (e.g., a carabiner). In some embodiments, the accessory attachment mechanism 916 may be attached to the connector 910 at the attachment point 915.

Figure 38:
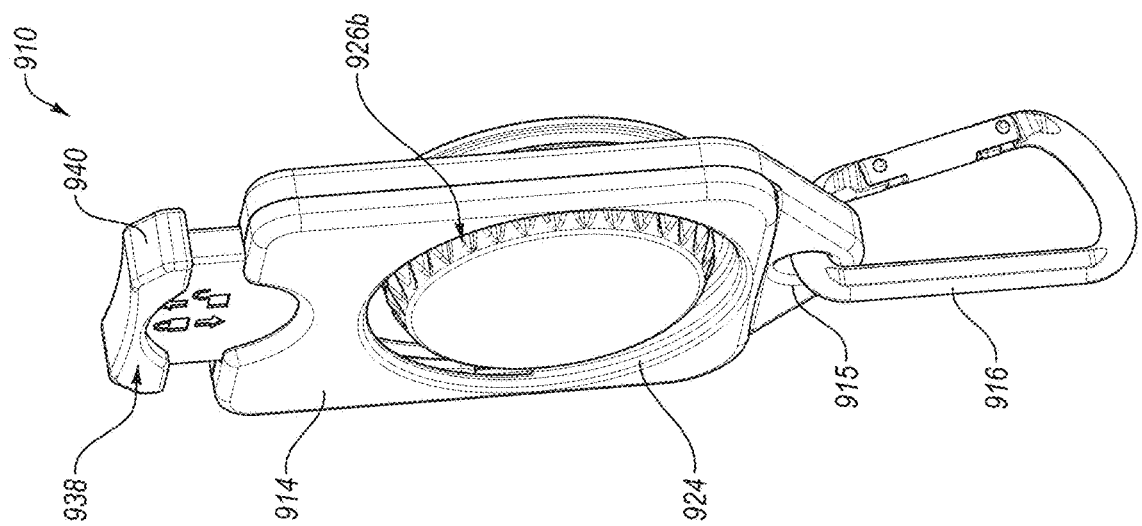
FIG. 38 is a rear perspective view of the exemplary connector shown in FIG. 37.
Figure 37:
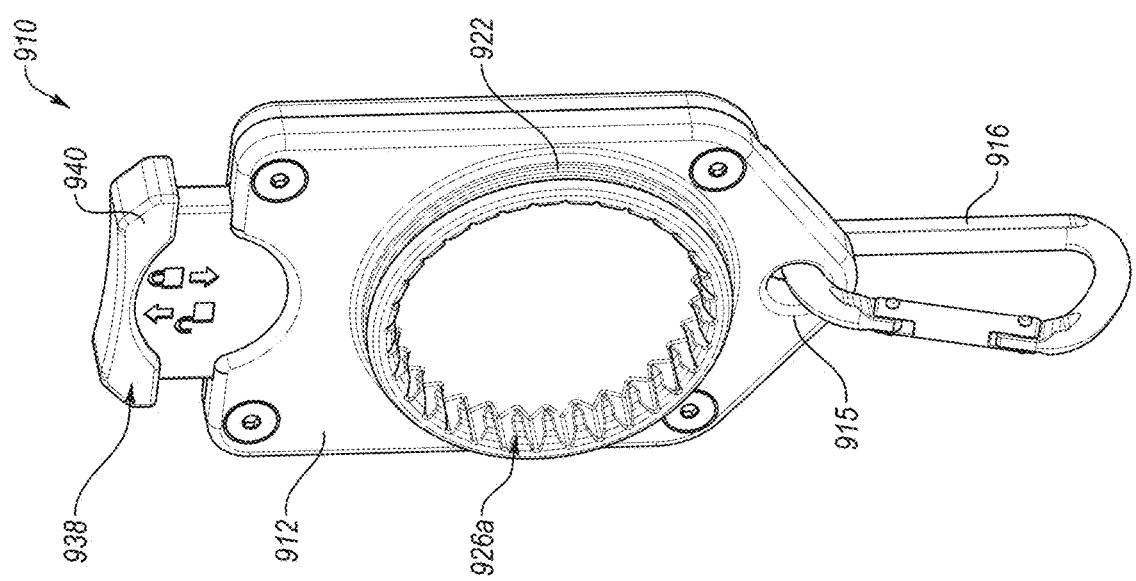
FIG. 37 is a front perspective view of another exemplary connector.
Figure 39:
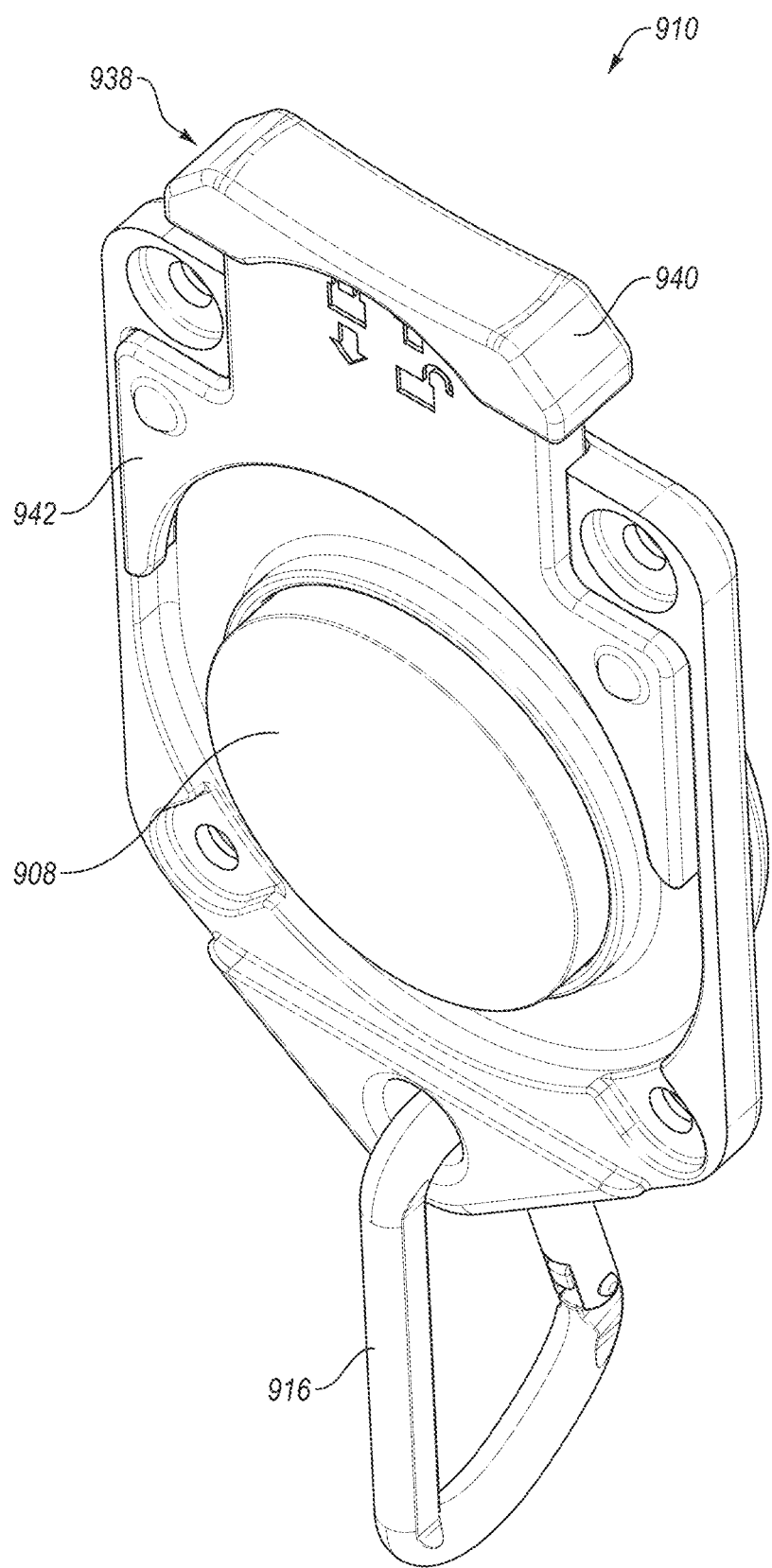
FIG. 39 is a partial perspective view of the exemplary connector shown in FIG. 37, illustrating an exemplary locking mechanism.

As shown in FIGS. 37-39, the connectors 910 may include a locking mechanism 938. In some embodiments, when engaged, the locking mechanism 938 may be sized and configured to lock the connector 910 to a structure, such as another connector 910, the accessory 918, the base 902, and/or the base attachment portions 920. The locking mechanism 938 may prevent the connector 910 from being removed or at least more difficult (e.g., requires more force) to remove. In some embodiments, the locking mechanism 938 may be sized and configured to prevent rotation of the connector 910 when engaged and to allow movement of the connector 910 when disengaged. In some embodiments, the locking mechanism 938 may be a slider that slides into the body of the connector 910 when engaged and out of the body of the connector 910 when disengaged. In some embodiments, the locking mechanism 938 may be a pin-lock, a latch, a cam-lock, a push-button-lock, a twist lock, a detent lock, or any other suitable locking mechanism.

In some embodiments, the locking mechanism 938 may include an exterior portion 940, which may be external to the body of the connector 910, and an interior portion 942, which may be internal to the body of the connector 910 (e.g., between the first side 912 and the second side 914). In some embodiments, the exterior portion 940 may provide a guide, lever, or a user interface for a user to engage and/or disengage the locking mechanism 938. For example, the exterior portion 940 may be graspable by a user such that the user may move the locking mechanism 938 to unlock the locking mechanism 938. The exterior portion 940 may also be used to lock the locking mechanism 938. In some embodiments, the exterior portion 940 may have an offset and the offset may prevent the exterior portion 940 from entering the body of the connector 910 and the offset may contact an upper surface of the connector 910 when the locking mechanism 938 is engaged.

In some embodiments, the interior portion 942 of the locking mechanism 938 may be sized and configured to engage an interface between the connector 910 and the accessory 918, the base attachment portion 920, another connector 910, and/or the base 902. For example, the second connector attachment portion 924 may be attached to the engagement portion 928 of the base attachment portion 920 or a first connector attachment portion of another connector and the interior portion 942 of the locking mechanism 938 may be pushed down or inserted such that the interior portion 942 engages the interface between the connector 910 and the base attachment portion 920 or the other connector such that the connector 910 may not be removed from the base 902 and/or the other connector.

In an example operation, a user may attach the connector 910 to the base 902, the base attachment portion 920, another connector 910, and/or the accessory 918. The user may engage the locking mechanism 938 such that the locking mechanism 938 engages an interface between the attached components (e.g., the connector 910 and another connector 910). As a result, the connector 910 may be locked to the other component and may not be removed from the other component, at least not without additional force being exerted. For example, the user may push the exterior portion 940 down or into the connector 910 such that the interior portion 942 engages the interface between the attached components. If the user desires to remove the connector 910, the user may disengage the locking mechanism 938 such that the locking mechanism 938 disengages the interface between the attached components. As a result, the connector 910 may be unlocked and may be removed from the other component. For example, the user may lift or move the exterior portion 940 of the locking mechanism 938 away from the connector 910 such that the interior portion 942 disengages the interface between the attached components. Thus, the locking mechanism 938 may provide for more stability as, for example, the base 902 is attached to the golf cart and the golf cart is driven around the golf course, or, for another example, the base 902 is attached to a push cart and the push cart is pushed around the golf course.

Modifications, additions, or omissions may be made to the attachment system 900 as shown in FIGS. 35-36 and/or the connector 910 shown in FIGS. 35-39 without departing from the scope of the present disclosure. For example, while the attachment system 900 is described as being attached to golf-related mounting surfaces and golf related accessories being attached to the base 902, it will be appreciated that the attachment system 900 may be attached to any suitable mounting surface and any suitable accessories 918 may be attached. Furthermore, the base 902, the connectors 910, and/or the accessories 918 may be similar to the components and features described in this disclosure.

Figure 41:
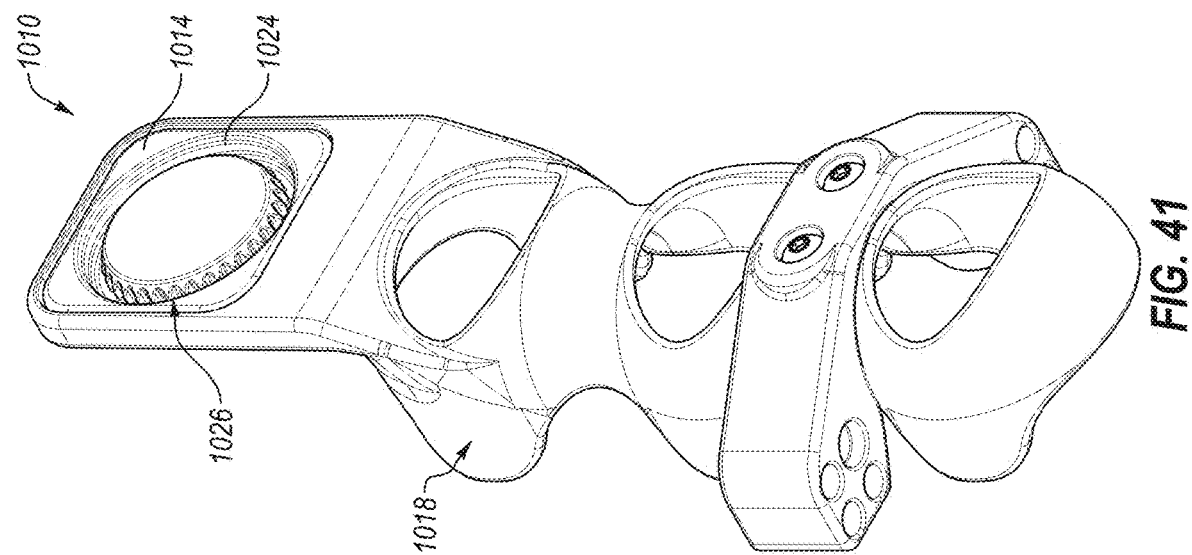
FIG. 41 is a rear perspective view of the exemplary connector shown in FIG. 40.
Figure 40:
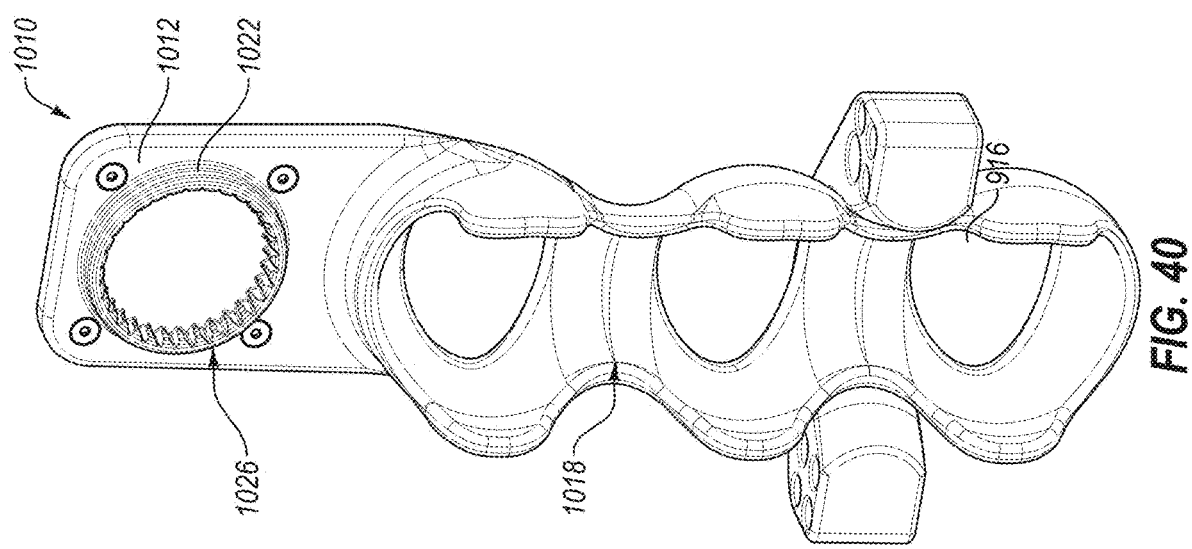
FIG. 40 is a front perspective view of an exemplary connector, the connector including an exemplary accessory, the accessory sized and configured to hold golf balls and golf tees.

FIG. 40 and FIG. 41 illustrate another exemplary connector 1010 and the connector 1010 may be integrated with an example accessory 1018. The example accessory 1018 may be sized and configured to hold one or more golf balls and/or tees. The connector 1010 and the accessory 1018 may be at least partially similar to or the same as the connectors and accessories described in this disclosure. For example, the connector 1010 may include a first side 1012 having a first connector attachment portion 1022 with engaging portions 1026 and a second side 1014 having a second connector attachment portion 1024 with engaging portions 1026, any or all of which may be similar to similar components and features described in this disclosure. Furthermore, the exemplary connector 1010 may be utilized with the attachment systems described throughout the disclosure.

In some embodiments the connector 1010, or a portion of the connector 1010, may be integrated into the accessory 1018 such that the connector 1010 and the accessory 1018 may form one unit. The unit may be integrally formed as part of a unitary, one-piece structure, or the unit may include one or more connected parts or components. For example, as shown in FIGS. 40-41, the accessory 1018 may be sized and configured to hold one or more golf balls and/or tees, and the connector 1010 may be at least partially integrated into the accessory 1018, which may allow the accessory 1018 to be connected to a base, another connector, or other suitable structure or surface. For instance, the connector 1010 may be built into the accessory 1018, the connector 1010 may be attached to the accessory 1018, or the accessory 1018 may include at least a portion of the functionality of the connector 1010.

Figure 43:
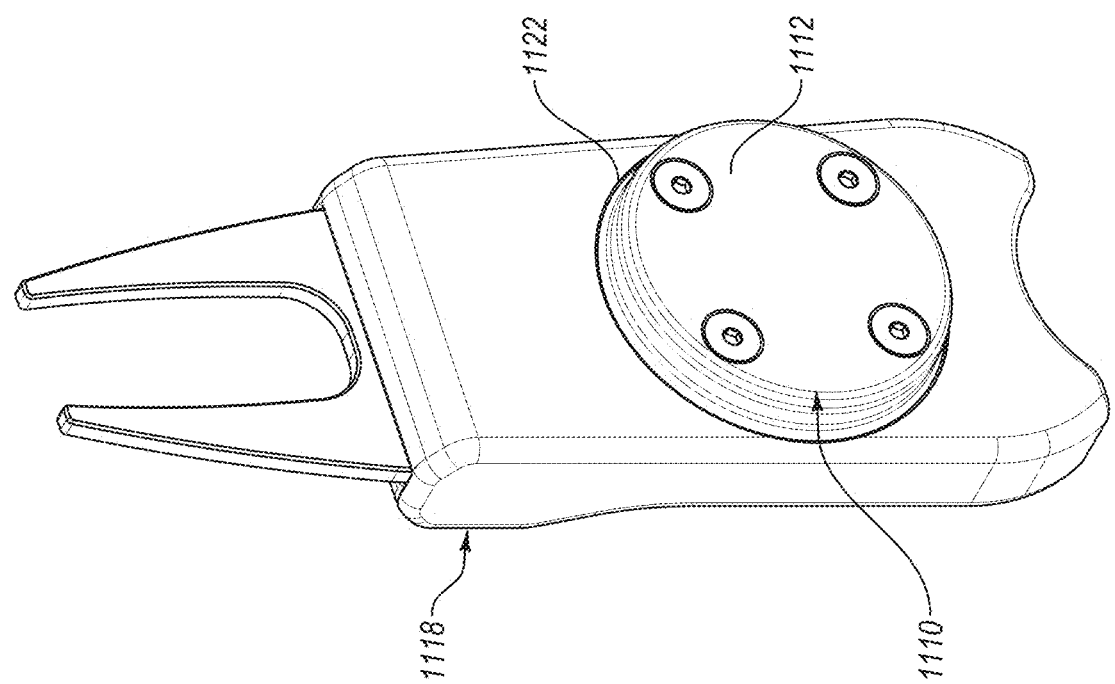
FIG. 43 is a rear perspective view of the exemplary connector shown in FIG. 42.
Figure 42:
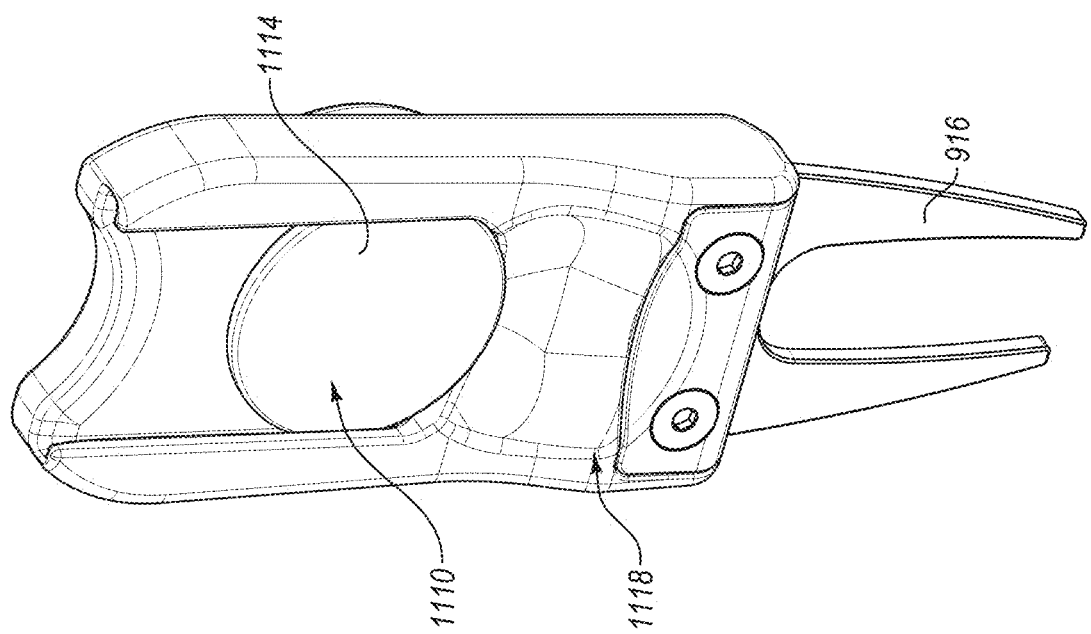
FIG. 42 is a front perspective view an exemplary connector, the connector including an example accessory, the example accessory configured as a divot repair tool.
Figure 45:
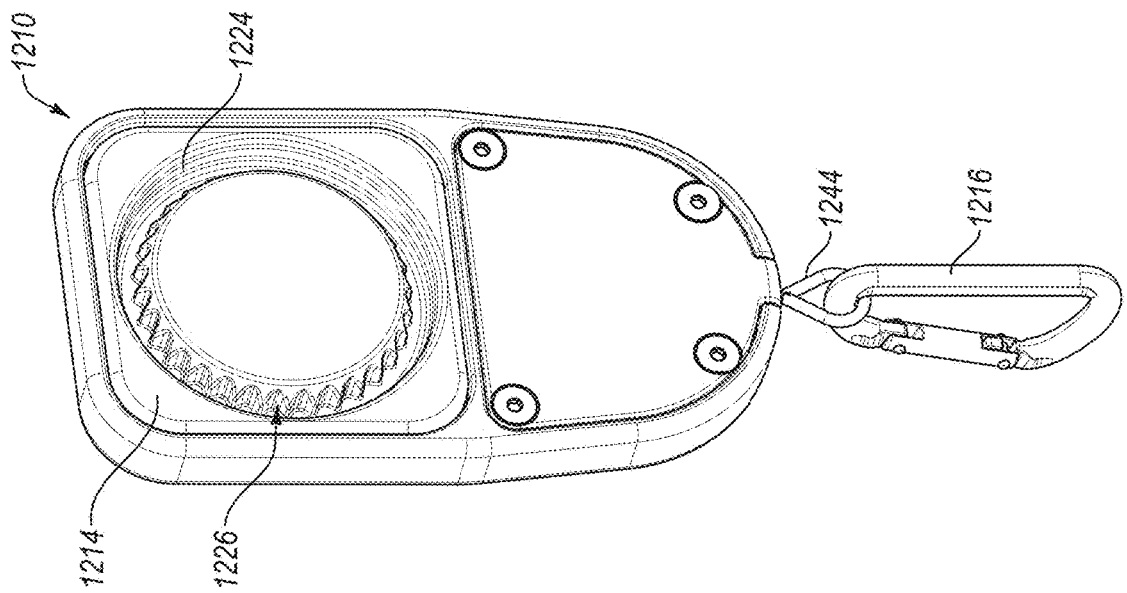
FIG. 45 is a rear perspective view of the exemplary connector shown in FIG. 44.
Figure 44:
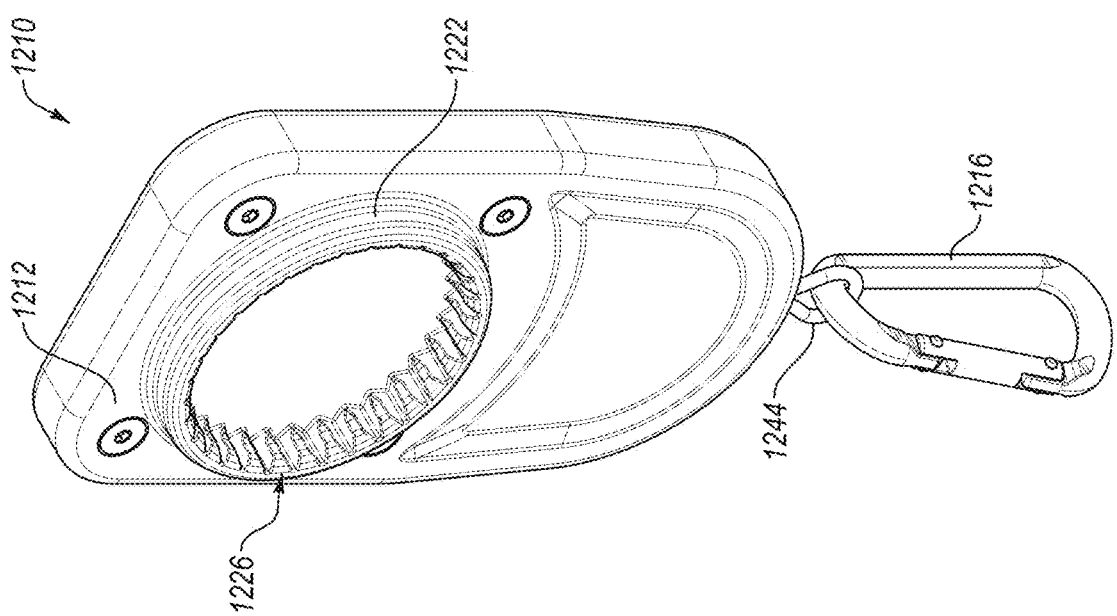
FIG. 44 is a front perspective view of an exemplary connector, the connector including an extendable tether.

FIG. 42 and FIG. 43 illustrate another exemplary connector 1110, and the connector may be integrated with an example accessory 1118, which may be a divot repair tool. The connector 1110 and the accessory 1118 may be at least partially similar to or the same as the connectors and accessories described in this disclosure. For example, the connector 1110 may include a first side 1112 with a connector attachment portion 1122 and a second side 1014, which may be similar to other similar components and features described in this disclosure. Furthermore, the exemplary connector 1110 may be utilized with the attachment systems described throughout the disclosure.

As shown in FIGS. 42-43, the accessory 1118 may be a divot repair tool and the divot repair tool may include at least a portion of the connector 1110. The connector 1110 integrated into the accessory 1118 may have a connector attachment portion 1122. In some embodiments, the connector 1110 may have a magnetic structure such as a magnet disposed between the first side 1112 of the connector 1110 and the second side 1014 of the connector 1110. This may allow the accessory 1118 to be connected to another accessory 1118, another connector 1110, and/or the base. After reviewing this disclosure, one skilled in the art may appreciate that the attachment system, base, connectors 1110, and/or accessories 1118 may be separate, partially integrated, or integrated structures, depending, for example, upon the intended use of the system and/or components.

FIG. 44, FIG. 45, FIG. 46, and FIG. 47 respectively are a front perspective view, a rear perspective view, a rear partial view, and a front perspective of an exemplary connector 1210 including an extendable tether 1244. The connector 1210 may be at least partially similar to or the same as the connectors described in this disclosure. For example, the connector 1210 may include a first side 1212 having a first connector attachment portion 1222 with engaging portions 1226 and a second side 1214 having a second connector attachment portion 1224 with engaging portions 1226, any or all of which may be similar to similar components and features described in this disclosure. In addition, an accessory attachment mechanism 1216 may be attached to the connector 1210, which may be similar to the accessory attachment mechanisms described previously. Furthermore, the exemplary connector 1210 may be utilized with the attachment systems described in this disclosure.

Figure 46:
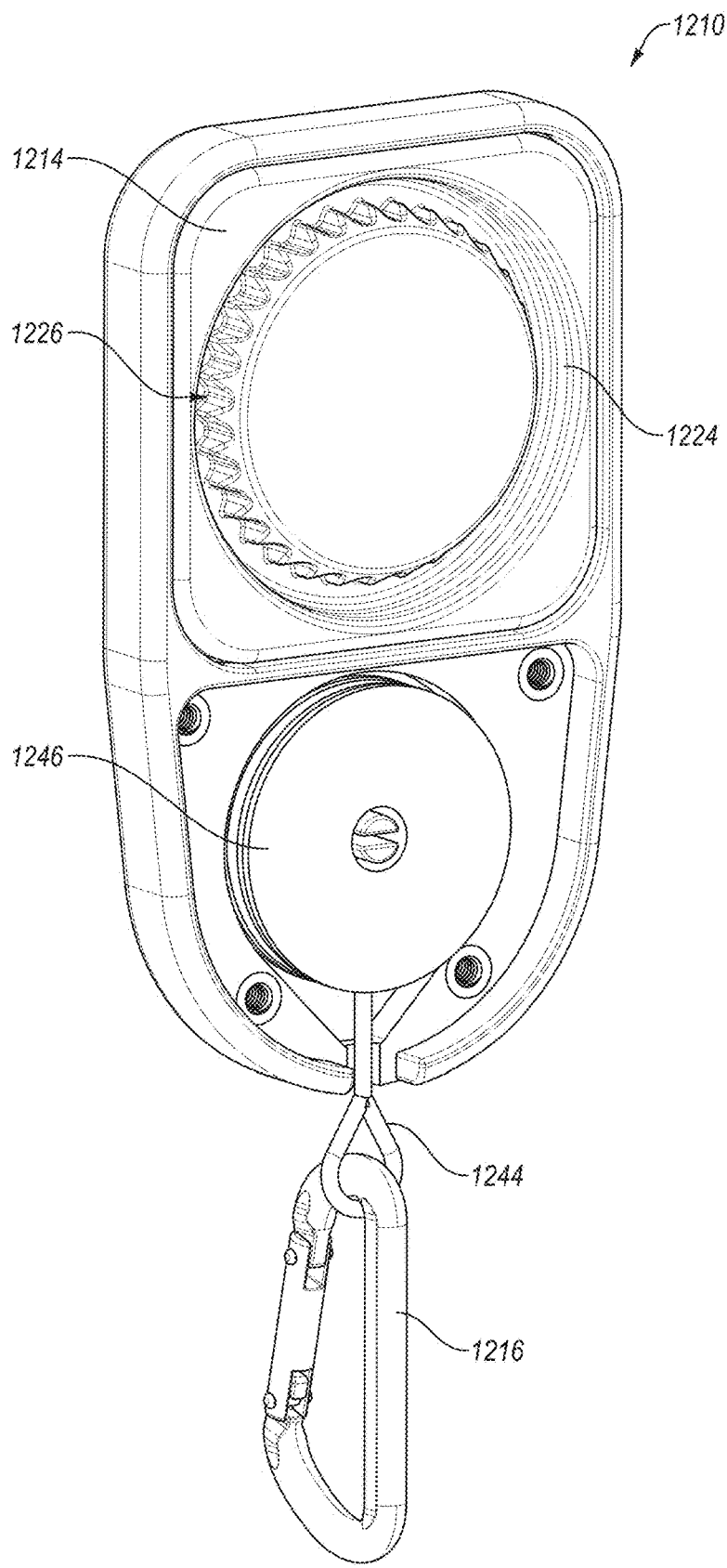
FIG. 46 is a rear partial perspective view of the exemplary connector shown in FIG. 44.
Figure 47:
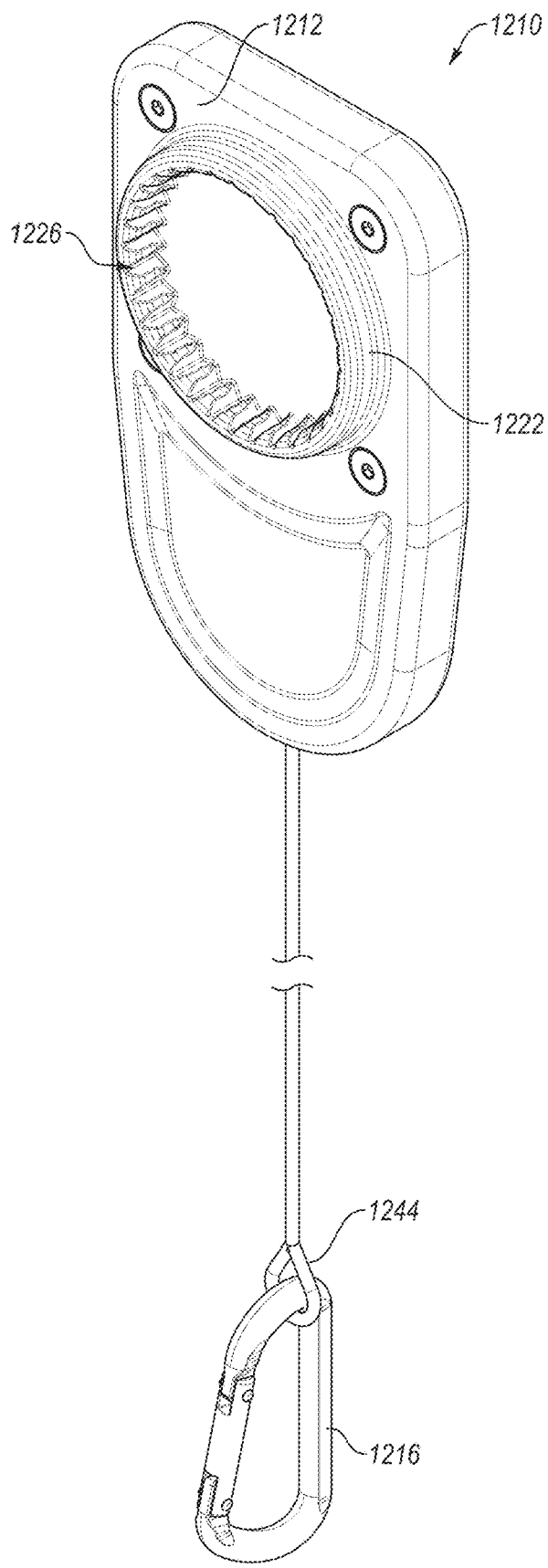
FIG. 47 is a front perspective view of the exemplary connector shown in FIG. 44 illustrating the tether extended.

As shown in FIGS. 44-47, the accessory attachment mechanism 1216 (e.g., a carabiner) may be attached to the connector 1210 via the extendable tether 1244. In some embodiments, as shown in FIG. 46, the extendable tether 1244 may be disposed within the body of the connector 1210. For example, the extendable tether 1244 may be disposed around a spool 1246 between the first side 1212 and the second side 1214 of the connector 1210. In some embodiments, and as shown in FIG. 47, the extendable tether 1244 may be spooled out of the connector 1210 when a force is applied (e.g., when a user pulls the accessory attachment mechanism 1216 to use the accessory attached to the accessory attachment mechanism 1216), and the extendable tether 1244 may retract back into the connector 1210 when the force is released (e.g., the user releases the accessory attachment mechanism 1216 and/or the accessory). In some embodiments, the extendable tether 1244 may be a strap, a lanyard, a cord, a rope, a cable, a leash, or any other mechanism which may extend out of and/or retract into the connector 1210.

The extendable tether 1244 may allow a user to utilize an accessory attached to the accessory attachment mechanism 1216 (e.g., a towel) without having to remove the connector 1210 from the attachment system. For example, in rainy conditions, a golfer may wipe their hands and/or clubs off using a towel, which may be attached to the connector 1210 via the accessory attachment mechanism 1216. Rather than removing the accessory from the accessory attachment mechanism 1216, the user may utilize the extendable tether 1244 to pull the accessory to a desired position so that the accessory may be utilized. When the user is finished utilizing the accessory, the extendable tether 1244 may retract back into the body of the connector 1210 and the connector 1210 may remain attached to the accessory.

Figure 49:
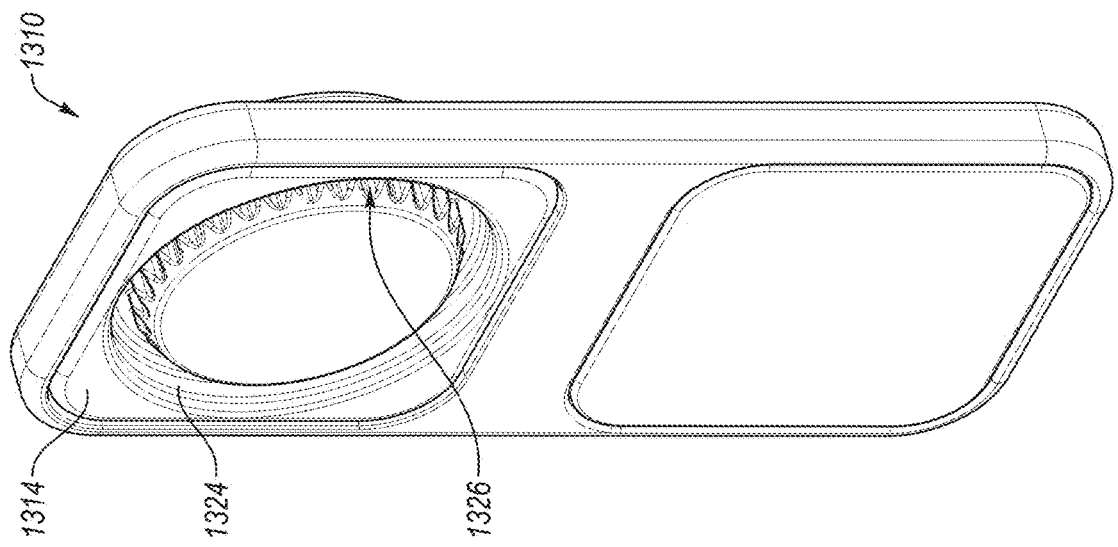
FIG. 49 is a rear perspective view of the exemplary connector shown in FIG. 48.
Figure 48:
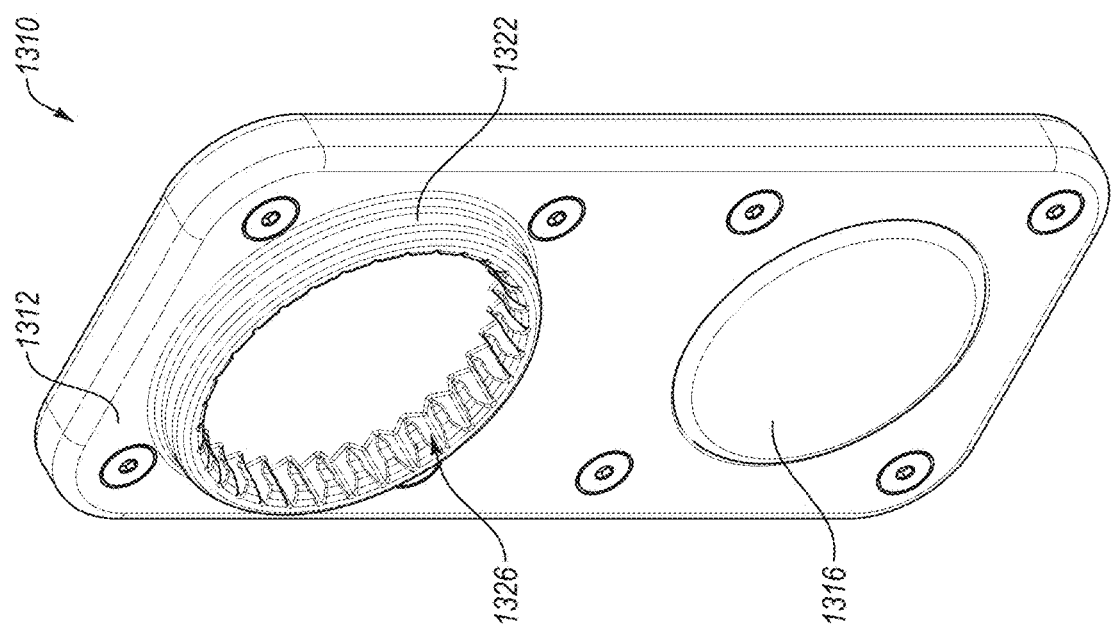
FIG. 48 is a front perspective view of an exemplary connector, the connector including an exemplary accessory attachment mechanism.

FIG. 48 and FIG. 49 illustrate another exemplary connector 1310, and the connector may include an exemplary accessory attachment mechanism 1316. The connector 1310 may be at least partially similar to or the same as the connectors described in this disclosure. For example, the connector 1310 may include a first side 1312 with a first connector attachment portion 1322 and engaging portions 1326, and a second side 1314 with a second connector attachment portion 1324 and engaging portions 1326. The exemplary connector 1210 may be utilized with the attachment systems described in this disclosure.

As shown in FIG. 48, the accessory attachment mechanism 1316 may be at least partially integrated with the connector 1310. For example, the accessory attachment mechanism 1316 may be a hook and loop fastener such as Velcro®, which may facilitate attachment of an accessory, such as a glove, to the connector 1310. For instance, the hook and loop fastener may be sized and configured to accommodate accessories of varying sizes. This may allow the accessory to be connected to another accessory, another connector 1310, and/or the base. Additionally, or alternative, the accessory attachment mechanism 1316 may include a metallic or magnetic surface, which may facilitate attachment of an accessory such as a ball marker.

Figure 50:
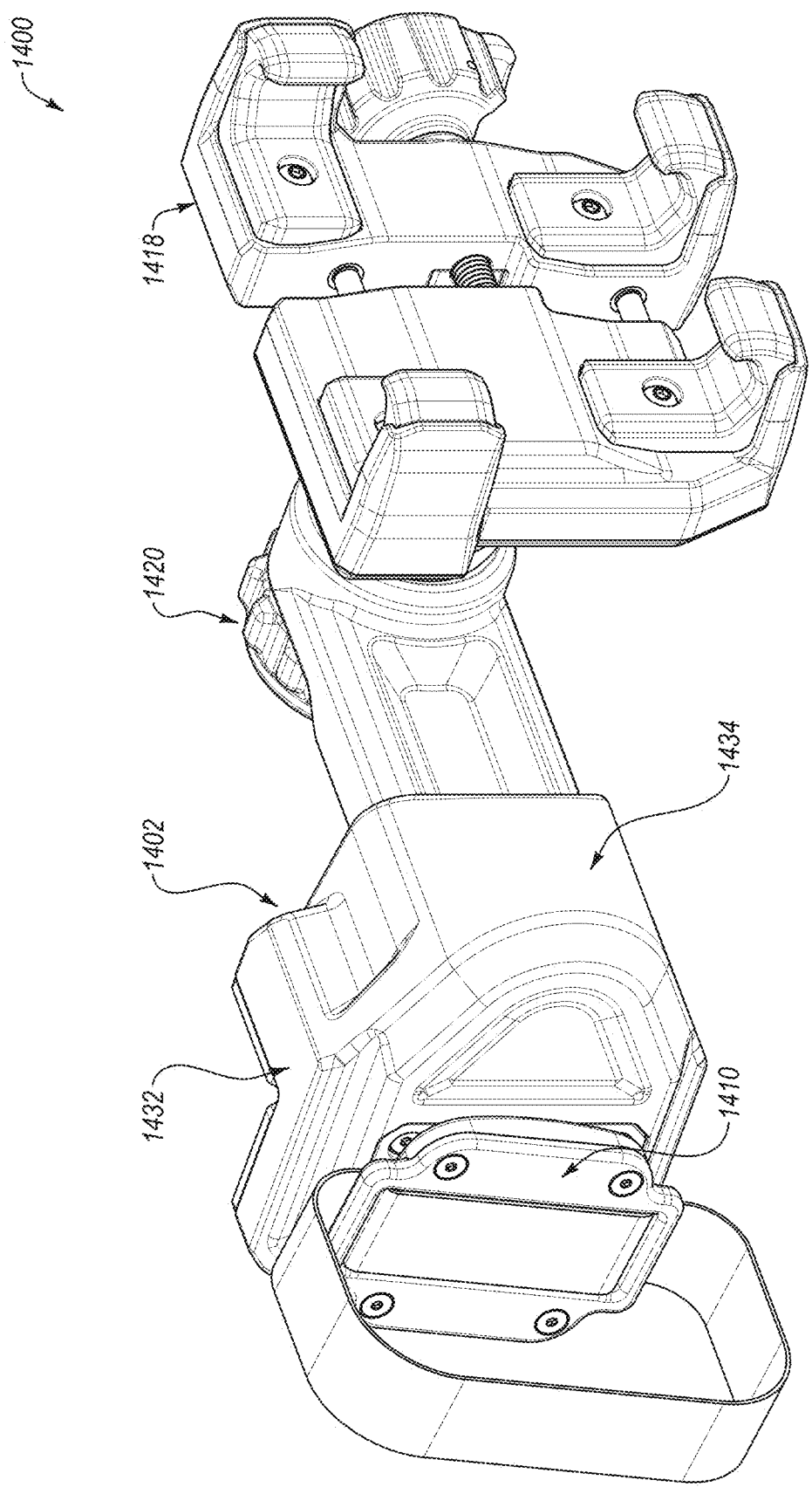
FIG. 50 is a front perspective view of an exemplary attachment system, illustrating an exemplary base, an exemplary connector, and exemplary accessory (e.g., a phone holder)

FIG. 50 illustrates another exemplary attachment system 1400, illustrating an exemplary base 1402, an exemplary connector 1410, and an exemplary accessory 1418 (e.g., a phone holder). The attachment system 1400 may be at least partially similar or the same as other attachment systems, components, and features described in this disclosure. For example, the attachment system 1400 may include a base 1402, one or more connectors 1410, and one or more accessories 1418.

As mentioned in this disclosure, the base, connectors, accessories, etc. may have different shapes, sizes, features, aspects, and the like. In addition, the base, connectors, and accessories may be separate structures, or may be at least partially or entirely integrated. The structures, for example, could be integrally formed as part of a unitary, one-piece structure, and/or the structures may be separate components that are integrally connected to form a single structure. For example, as shown in FIG. 50, the accessory 1418 may be fixed to the base 1402 and/or integrated with the base 1402 such that the base 1402 and the accessory 1418 are one unit. In some embodiments, the accessory 1418 may be detachable from the base 1402. In some embodiments, the accessory 1418 may include one or more of the base attachment portions 1420. In these and other embodiments, a connector 1410 may be connected to the accessory 1418 at the one or more base attachment portions 1420

In some embodiments, the base 1402 may not include base attachment portions 1420. In these embodiments, the connector 1410 and/or the accessory 1410 may be attached directly to the base 1402 and/or be integrated with the base 1402 such that the connector 1410 and/or the accessory 1418 form one unit with the base 1402.

Figure 52:
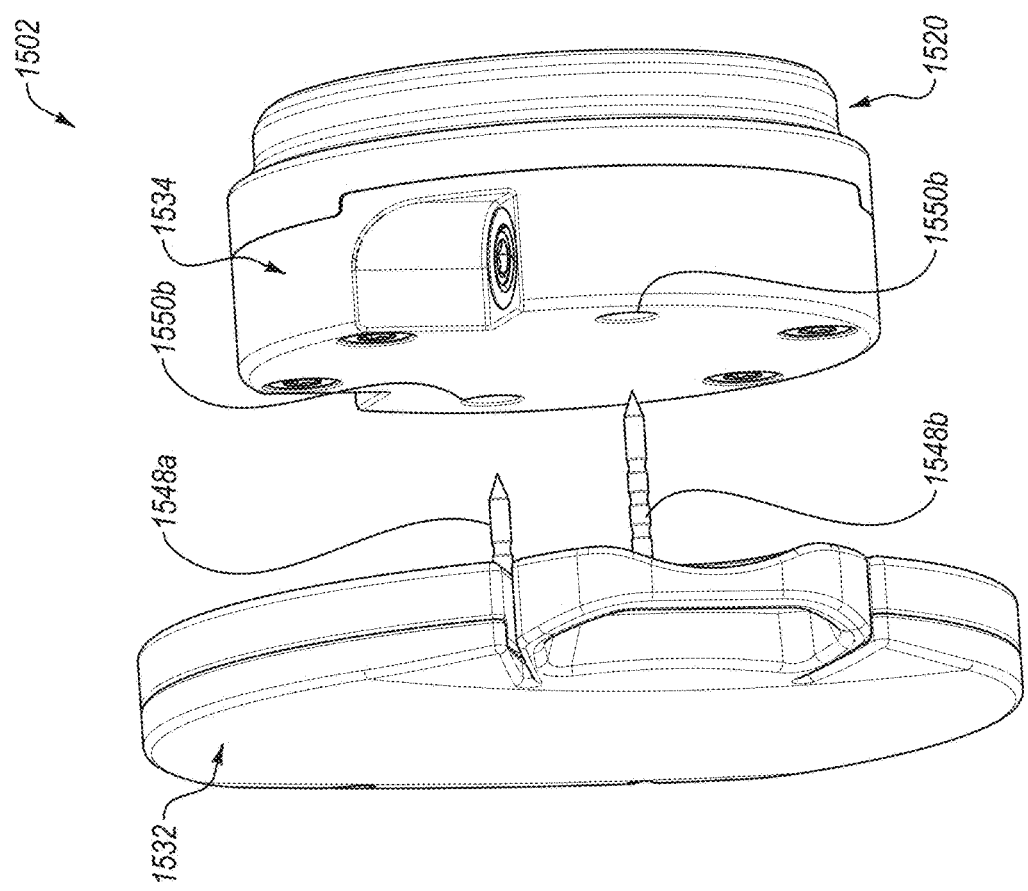
FIG. 52 is a rear exploded view of the exemplary base shown in FIG. 51.
Figure 51:
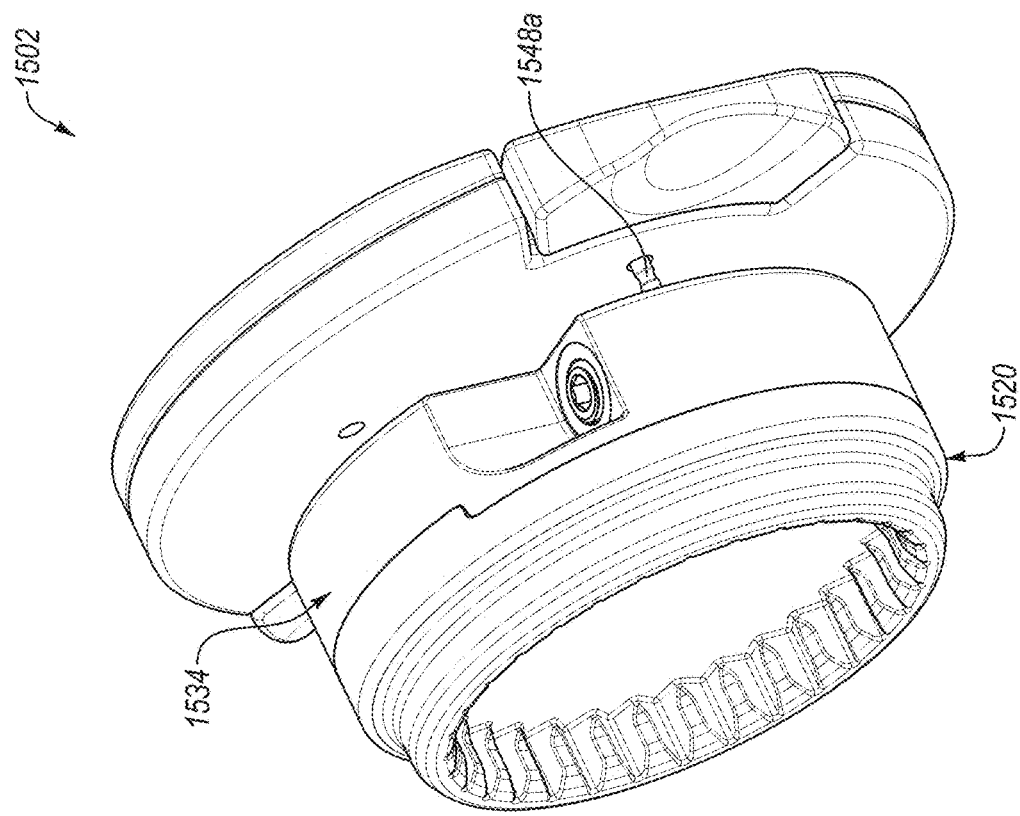
FIG. 51 is a front perspective view of an exemplary base.

FIGS. 51 and 52 illustrate an example base 1502. The base 1502 may include a first base portion 1532 and a second base portion 1534. The first base portion 1532 may include one or more engagement portions 1548. The engagement portions 1548 may be configured to penetrate through a material such as the fabric of a golf bag. For example, the engagement portions 1548 may be needles, pins, spikes, or other pointed objects which may penetrate a material.

In some embodiments, the second base portion 1534 may include one or more receiving portions 1550. The receiving portions 1550 may be configured to receive the engagement portions 1548 of the first base portion 1532. For example, the receiving portions 1550 may be apertures sized and configured to receive the engagement portions 1548 of the first base portion 1532. The engagement portions 1548 of the first base portion 1532 and the receiving portions 1550 of the second base portion 1534 may allow the first base portion 1532 and the second base portion 1534 to be coupled.

In some embodiments, the first base portion 1532 may include multiple engagement portions 1548 and/or the second base portion may include multiple receiving portions 1550. For example, the first base portion 1532 may include a first engagement portion 1548a and a second engagement portion 1548b. The second base portion 1534 may include a first receiving portion 1550a sized and configured to receive the first engagement portion 1548a and the second base portion 1534 may include a second receiving portion 1550b sized and configured to receive the second engagement portion 1548b.

In some embodiments, the second base portion 1534 may include a base attachment portion 1520. The base attachment portion 1520 may be sized and configured to engage with one or more connectors such as the connectors described throughout this disclosure.

In some embodiments, the first base portion 1532 may include one or more magnets. The one or more magnets may facilitate a magnetic attachment of the first base portion 1532 and the second base portion 1534. For example, the first base portion 1532 may include one or more magnets at the base of the engagement portions 1548, which may facilitate a magnetic attachment between the first base portion 1532 and the second base portion 1534 when the engagement portions 1548 engage the receiving portions 1550 of the second base portion 1534. Additionally, or alternatively, the second base portion 1534 may include one or more magnets.

In an example operation of the base 1502, the user may place the first base portion 1532 within a golf bag and manipulate the first base portion 1532 such that the engagement portions 1548 may penetrate a material of the golf bag . . . . For example, the user may place the first base portion 1532 within a pocket of the golf bag and the engagement portions 1548 may penetrate through the fabric of the pocket such that the engagement portions 1548 may be visibly seen by the user even if the pocket is closed. The user may then align the receiving portions 1550 with the engagement portions 1548 and attach the second base portion 1534 to the first base portion 1532. The user may then attach one or more connectors and/or accessories to the base 1502. The connectors and/or the accessories may be similar to similar components and features described in this disclosure.

After reviewing this disclosure, one skilled in the art may recognize that modifications, additions, or omissions may be made to the base 1502 shown in FIGS. 51-52 without departing from the scope of the present disclosure. For example, the engagement portions 1548 and/or the receiving portions 1550 may be omitted, and the first base portion 1532 and the second base portion 1534 may be magnetically attached. Additionally, while the base 1502 is described as being attached to a golf bag, it will be appreciated that base 1502 may be attached to any suitable mounting surface and any suitable accessories may be attached. In some embodiments, multiple accessories may be attached and/or the accessories may be directly attached to the base.

Figure 53:
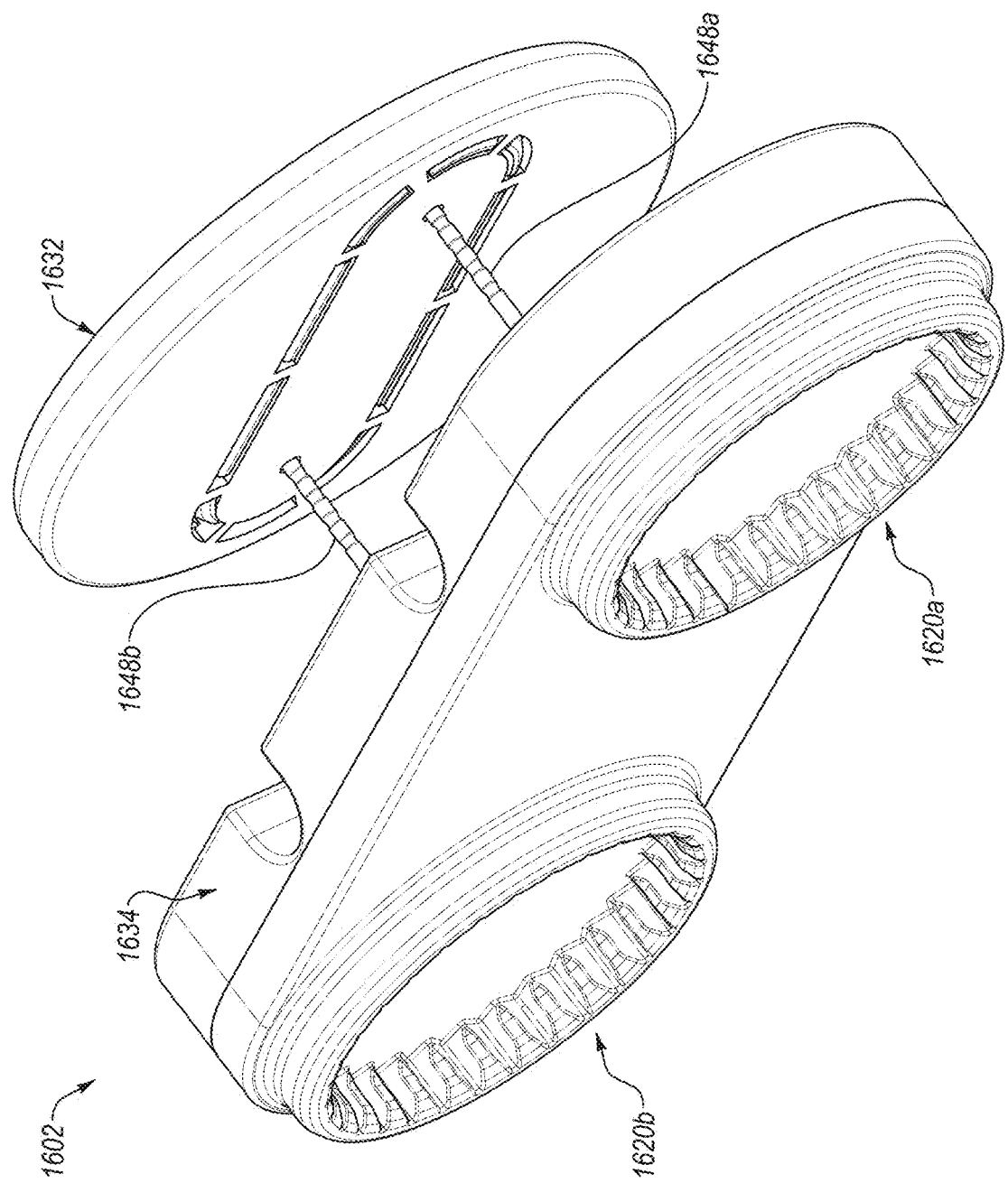
FIG. 53 is a front exploded view of an exemplary base.
Figure 54:
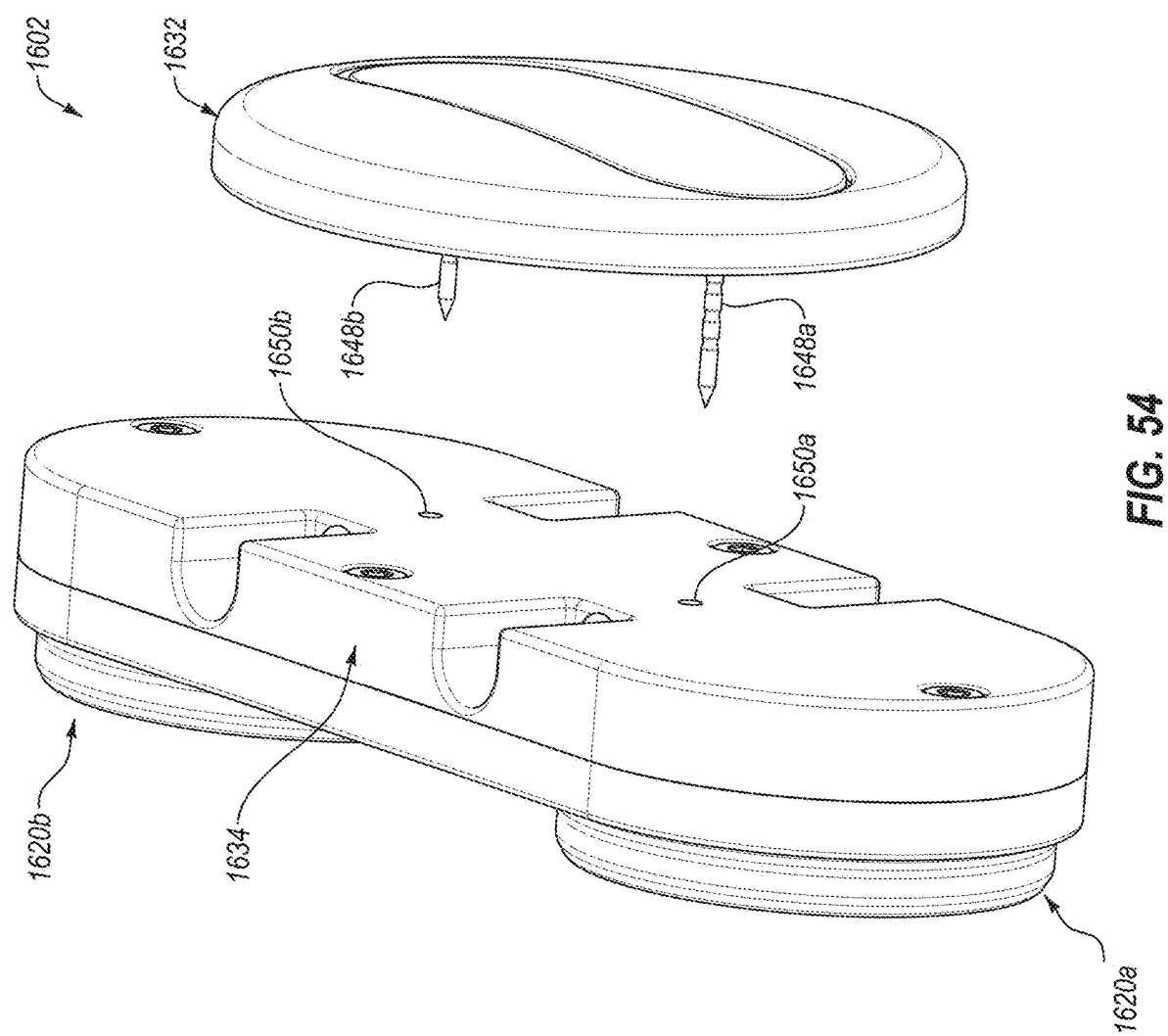
FIG. 54 is a rear exploded view of the exemplary base shown in FIG. 53.

Furthermore, multiple base attachment portions may be included. For example, as shown in FIG. 53 and FIG. 54, an exemplary base 1602 may include a first base portion 1632 having one or more engagement portions 1648 and a second base portion 1634 having one or more receiving portions 1650. The exemplary base 1602 may include multiple base attachment portions 1620. For example, the exemplary base 1602 may include a first base attachment portion 1620a and a second base attachment portion 1620b. One or more connectors and/or accessories may be attached to the first base attachment portion 1620a and/or the second base attachment portion 1620b.

Figure 56:
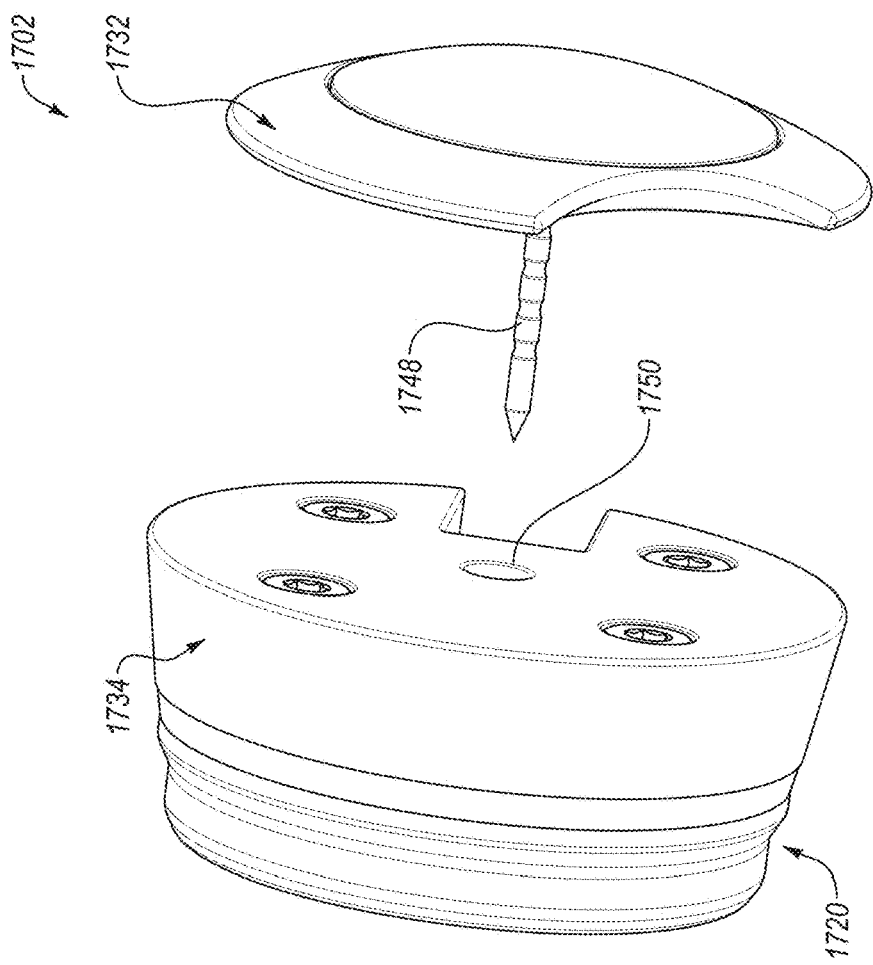
FIG. 56 is a rear exploded view of the exemplary base shown in FIG. 55.
Figure 55:
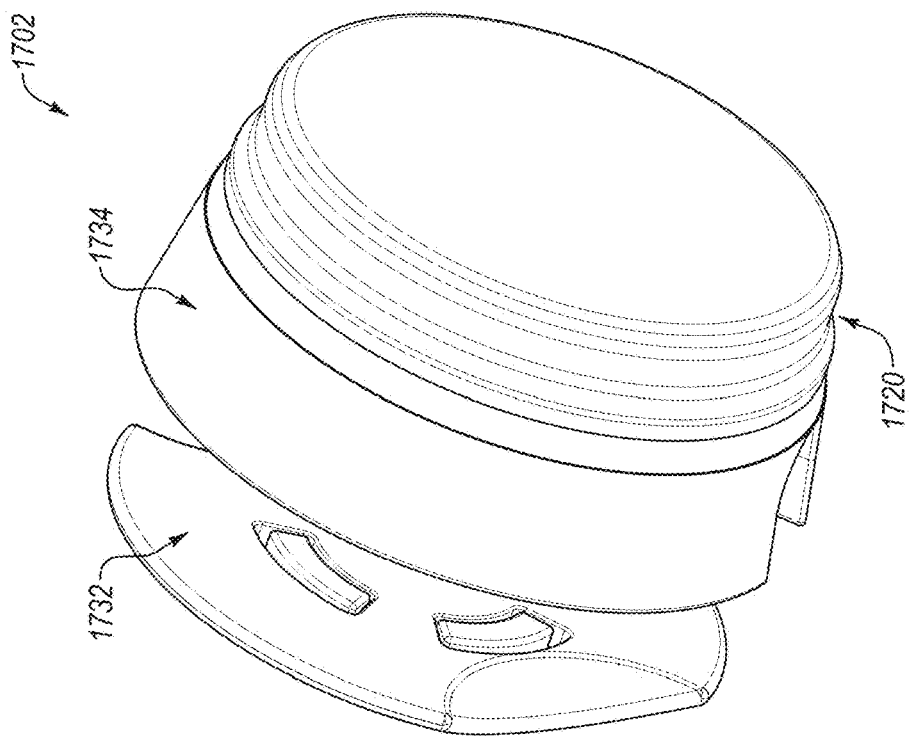
FIG. 55 is a front exploded view of an exemplary base.

Furthermore, the base attachment portions may be sized and configured for an accessory to be directly attached to the base. As shown in FIG. 55 and FIG. 56, an exemplary base 1702 may include a first base portion 1732 and a second base portion 1734. The second base portion 1734 may include a base attachment portion 1720. The base attachment portion 1720 may be sized and configured for an accessory to be directly attached to the base 1702 via the base attachment portion 1720. For example, a head cover may be directly attached to the base attachment portion 1720. As shown in FIG. 55 and FIG. 56, the base attachment portion 1720 may be outwardly extending and sized and configured to correspond to an inwardly extending structure included on a connector and/or an accessory. In some embodiments, the base attachment portion 1720 may be inwardly extending and sized and configured to correspond to an outwardly extending structure included on a connector and/or an accessory.

In some embodiments, the first base portion 1732 may include a single engagement portion 1748. In these and other embodiments, the second base portion 1734 may include a single receiving portion 1750. It will also be appreciated that the base 1702 may be configured such that the first base portion 1732 may include one or more of the receiving portions 1750 and the second base portion 1734 may include one or more of the engagement portions 1748.

Figure 58:
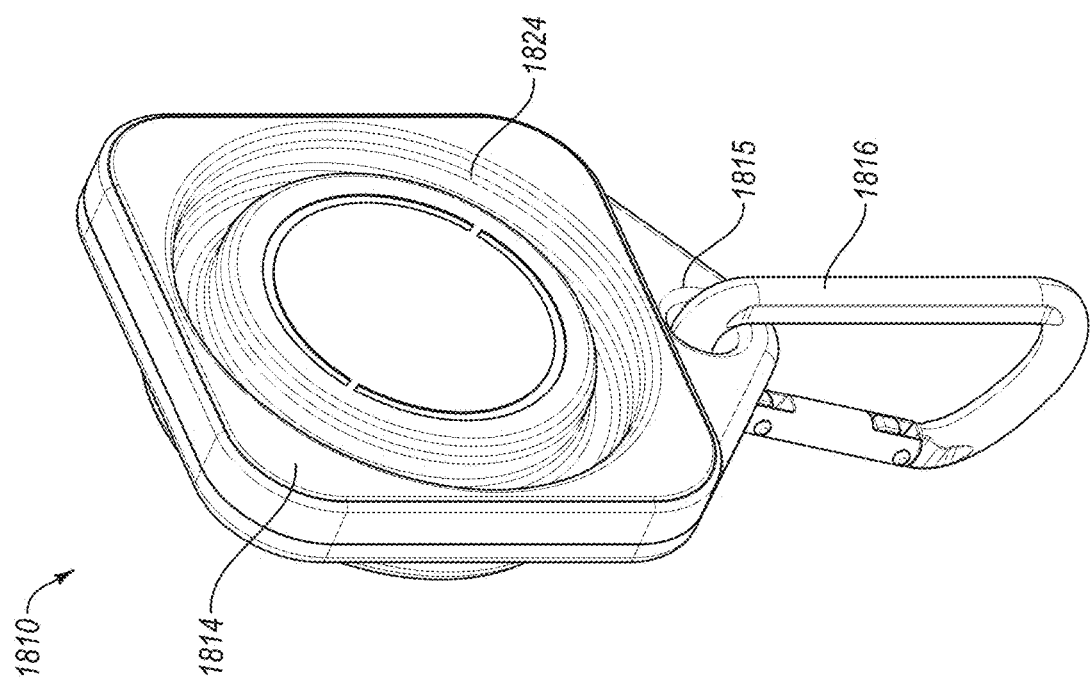
FIG. 58 is a rear perspective view of the exemplary connector shown in FIG. 57.
Figure 57:
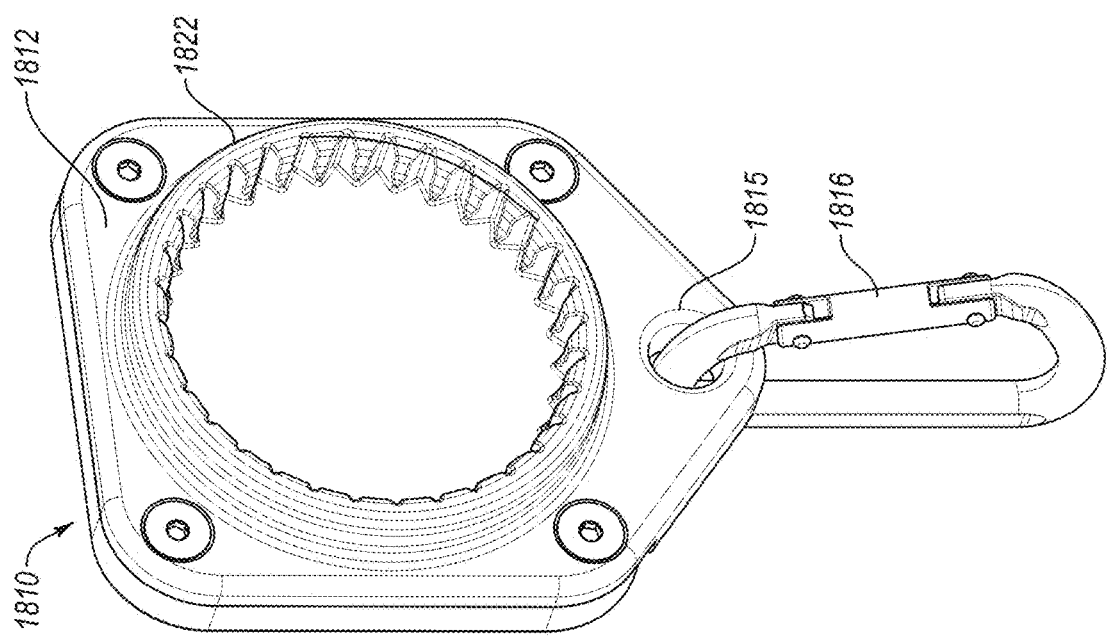
FIG. 57 is a front perspective view of an exemplary connector.

The accompanying figures illustrate that different types of connectors may be used to attach different types of accessories. For example, one connector or type of connector may be used to attach a rangefinder while another connector or type of connector may be used to attach a towel, a glove, phone, electronic device, etc. After reviewing this disclosure, one skilled in the art may appreciate that the connectors may allow other structures and/or devices to be connected. Additionally, after reviewing this disclosure, one skilled in the art may appreciate that the connectors may include or be constructed from any suitable material. As shown in FIG. 57 and FIG. 58, an exemplary connector 1810 may include a first side 1812 having a first connector attachment portion 1822 and a second side 1814 having a second connector attachment portion 1824. The exemplary connector 1810, the first side 1812, and/or the second side 1814 may be constructed from or include any suitable material. For example, the exemplary connector 1810, the first side 1812, and/or the second side 1814 may be constructed from materials such as rubber, plastic, silicone, polyurethane, high density foam, and/or other similar materials. In some embodiments, the exemplary connector 1810, the first side 1812, and/or the second side may have a thermoplastic elastomer coating such as a thermoplastic rubber.

Figure 59:
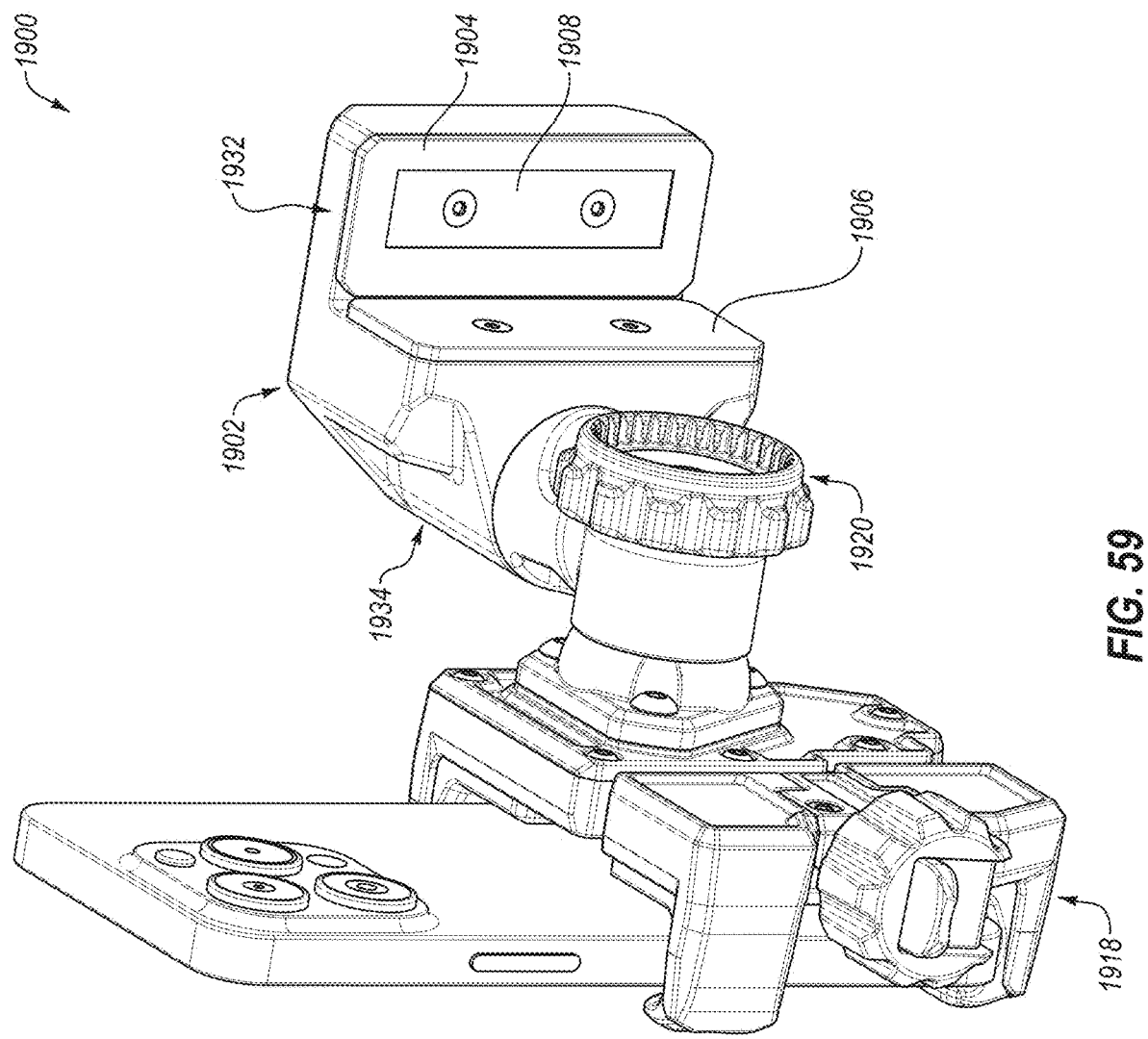
FIG. 59 is a rear perspective view of an exemplary attachment system illustrating an exemplary base and an exemplary accessory (e.g., a phone holder)
Figure 60:
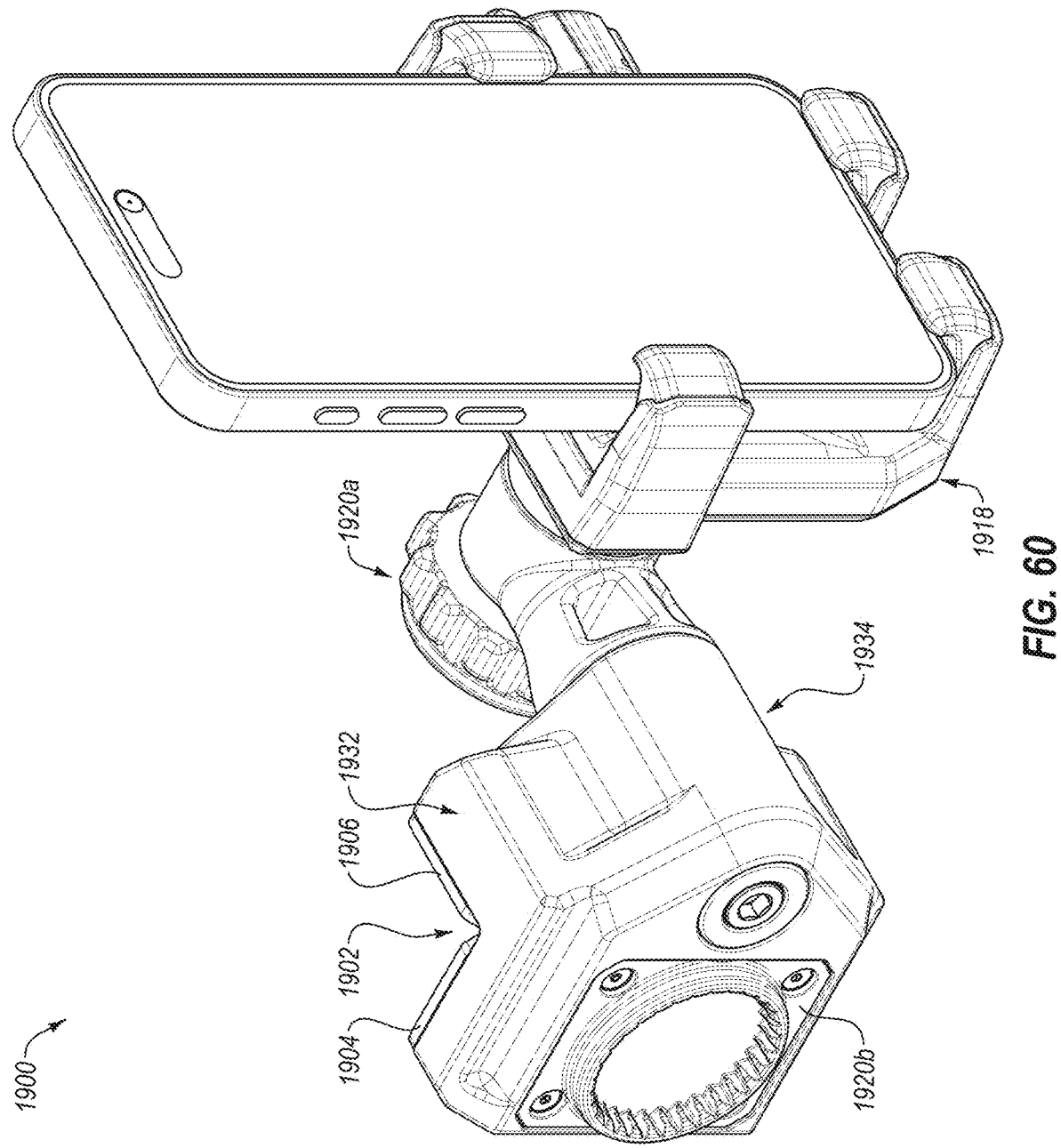
FIG. 60 is a front perspective view of the exemplary attachment system of FIG. 59.

Further, the base may have other suitable shapes, sizes, configurations, and/or arrangements depending, for example, upon the type of support surface or structure. As shown in FIGS. 59 and 60, an exemplary attachment system 1900 may include a base 1902 and an exemplary accessory 1918 (e.g., a phone holder) attached to the base 1902. The base may include a first base portion 1932 and a second base portion 1934. The first base portion 1932 may include a first side 1904 and a second side 1906. As shown in FIG. 59, the first side 1904 may include one or more magnets 1908 sized and configured to attach the base 1902 to a mounting surface. The magnets 1908 may be at least partially surrounded by a border, and the border may provide cushioning, a friction surface, and/or the like. The border may be similar to the border described with respect to FIG. 1.

In some embodiments, the second side 1906 may include a pad, which may provide a cushioning, a friction surface, and/or the like. In some embodiments, the pad may provide a gap, space, and/or cushioning between the base 102 and a mounting surface or structure. The pad may be constructed from materials such as rubber, plastic, silicone, polyurethane, high density foam, and/or other similar materials, and the pad may be configured to be at least partially disposed between the base 1902 and a mounting surface. Alternatively, or additionally, the pad may include properties that are mark resistant.

While the second side 1902 is illustrated as not including one or more magnets 1908, it will be appreciated that the second side 1906 may include one or more magnets 1908. It will also be the first side 1904 may omit the one or more magnets 1908 and/or may include the pad.

As shown in FIG. 60, the second base portion 1934 may include one or base attachment portions 1920 and a connector and/or the accessory 1918 may be attached to the base attachment portions 1920. In some embodiments, the accessory 1918 may include one or more base attachment portions 1920 and a connector and/or another accessory may be attached to the base attachment portions 1920. For example, the second base portion 1934 may include a first base attachment portion 1920a and the accessory 1918 may include a second base attachment portion 1920b.

After reviewing this disclosure, one skilled in the art may appreciate that the attachment system may include any suitable base, connectors, and/or accessories, and the base, connectors, and accessories may have different shapes, sizes, configurations, and/or arrangements depending, for example, upon the intended use of the attachment system.

Figure 61:
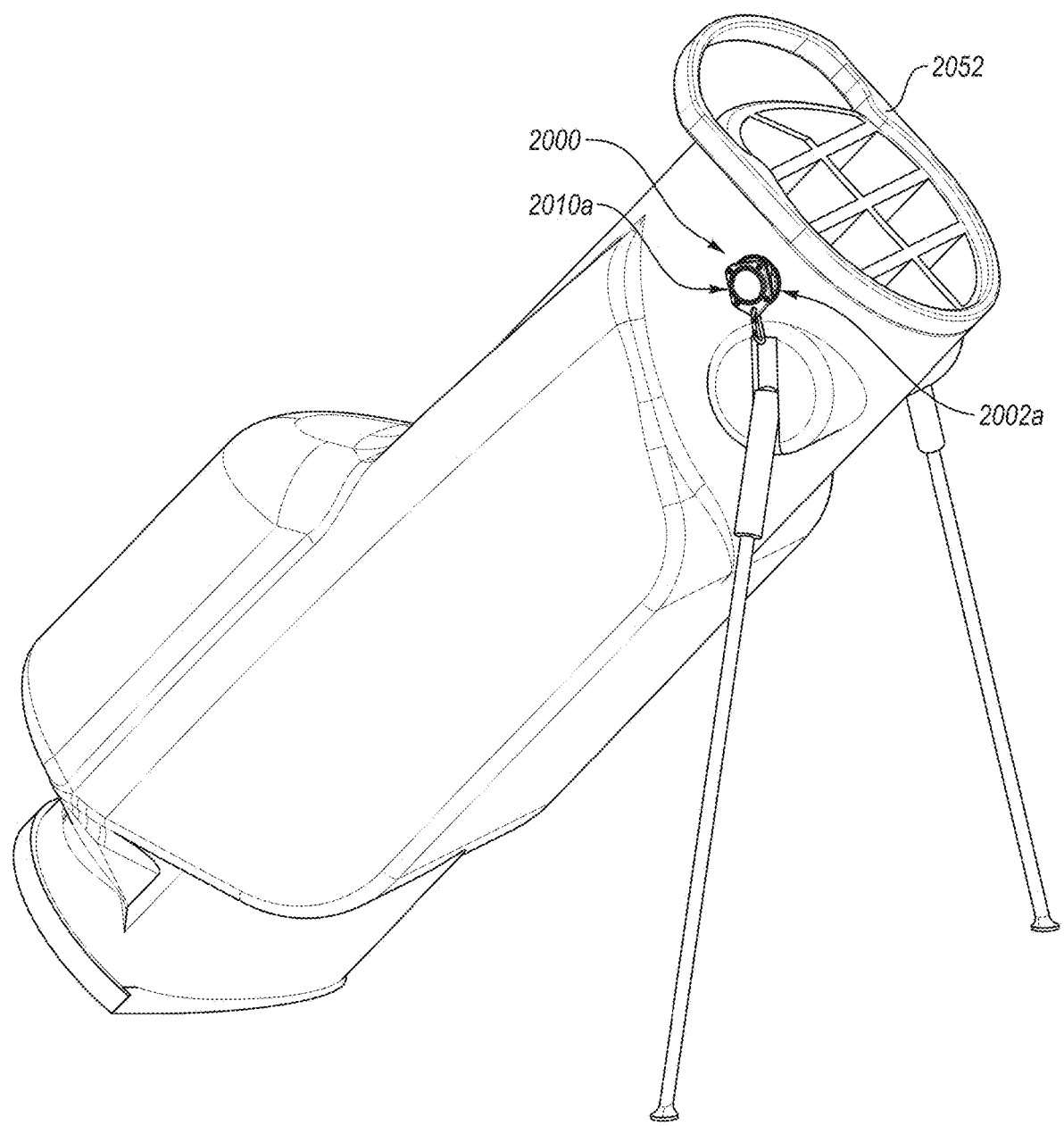
FIG. 61 is a perspective view of an exemplary attachment system illustrating an exemplary base attached to a golf bag and an exemplary connector.
Figure 62:
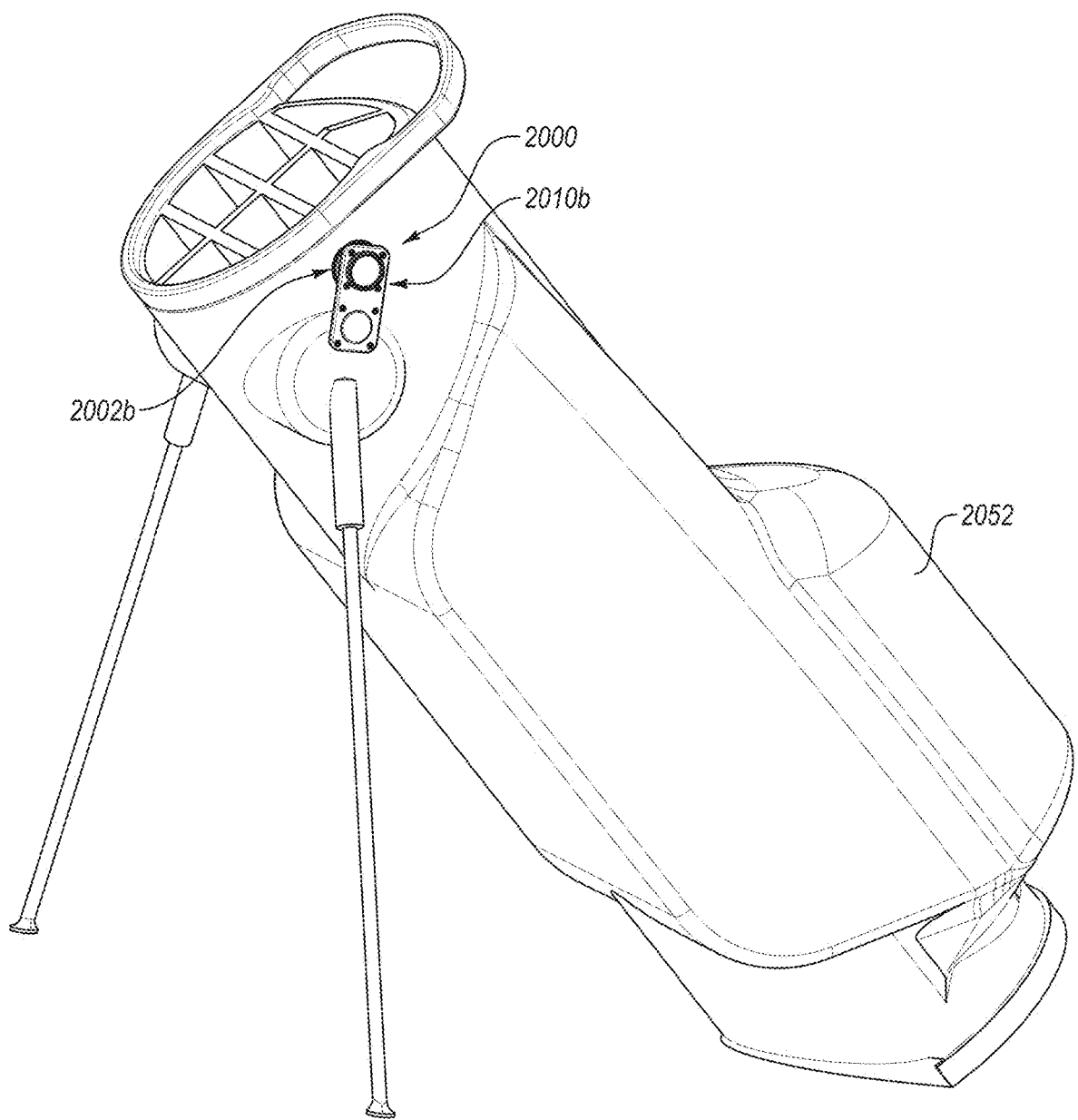
FIG. 62 is another perspective view of the exemplary attachment system of FIG. 61 illustrating another exemplary base attached to a golf bag and an exemplary connector.
Figure 63:
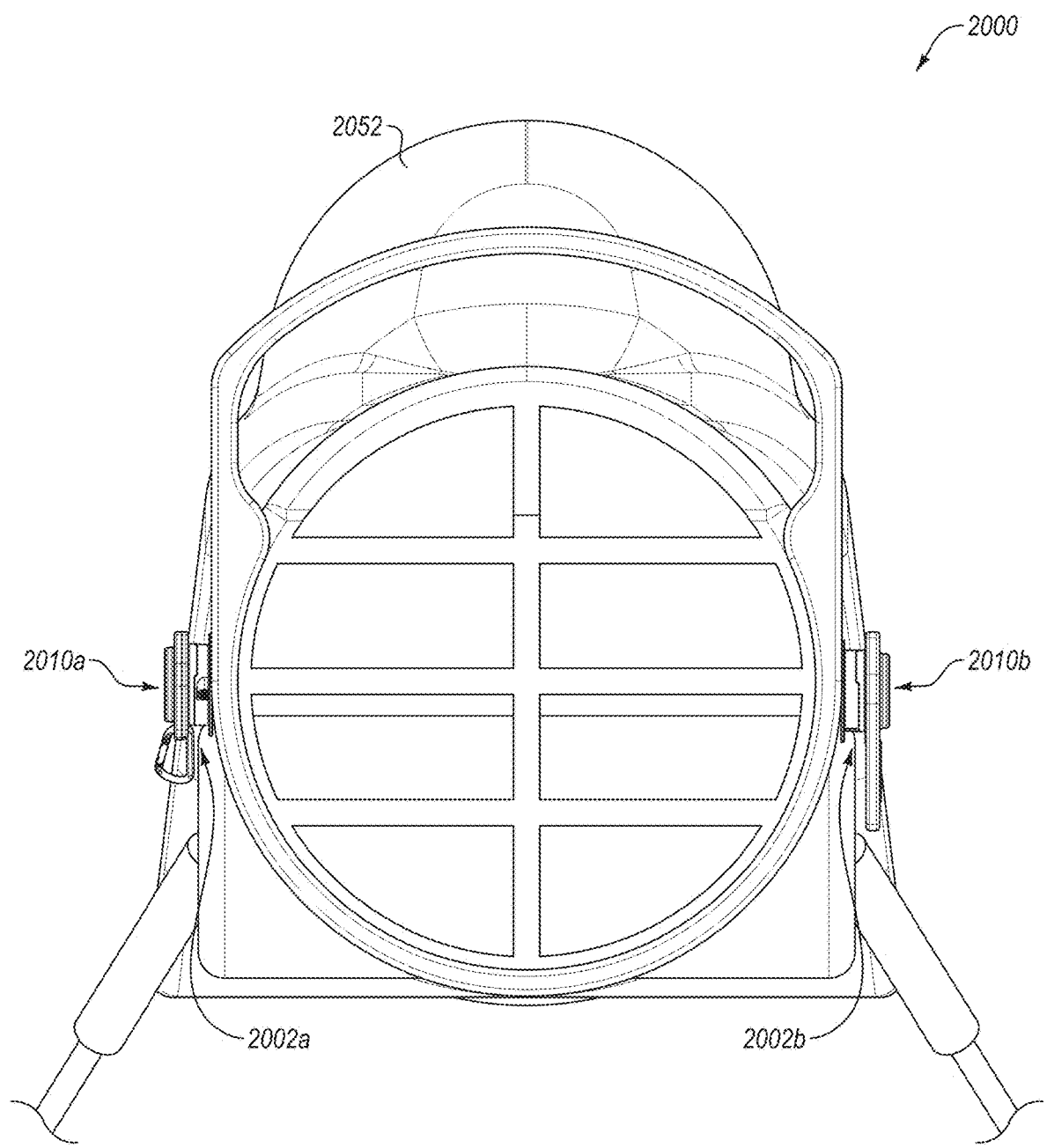
FIG. 63 is a top view of the exemplary attachment system of FIG. 61.

As shown in FIGS. 61-63, an exemplary attachment system 2000 may include a first base 2002a and a second base 2002b. The first base 2002a and/or the second base 2002b may be sized and configured to be attached to a mounting surface such as a golf bag 2052. The first base 2002a may be sized and configured to be attached to a first connector 2010a and/or an accessory. For example, the first base 2002a may include a base attachment portion or the first connector 2010a may be attached directly to the first base 2002a. The second base 2002b may be sized and configured to be attached to a second connector 2010b and/or an accessory. For example, the second base 2002b may include a base attachment portion or the second connector 2010b may be attached directly to the second base 2002b. As shown in FIGS. 61-63, any of the components of the attachment system 2000 may be built-into the mounting surface such as the golf bag 2052 and/or integrated with the mounting surface such as the golf bag 2052 such the attachment system 2000 and the mounting surface form a single unit. For example, the first base 2002a and/or the second base 2002b may be integrally formed as part of the golf bag 2052. In another example, the first connector 2010a and/or the second connector 2002b may be integrally formed as part of the golf bag 2052. In a third example, a first accessory (not shown) and/or a second accessory (not shown) may be integrally formed as part of the golf bag 2052.

The first base 2002a, the second base 2002b, the first connector 2010a, the second connector 2010b, the first accessory, and/or the second accessory may be similar to components and features described in this disclosure. FIGS. 61-64 are described with respect to the golf bag 2052. It will be appreciated that the attachment system 2000 and any components of the attachment system 2000 may be integrally formed with other golf-related structures such as a golf cart or a push cart or other non-golf related structures.

Figure 64:
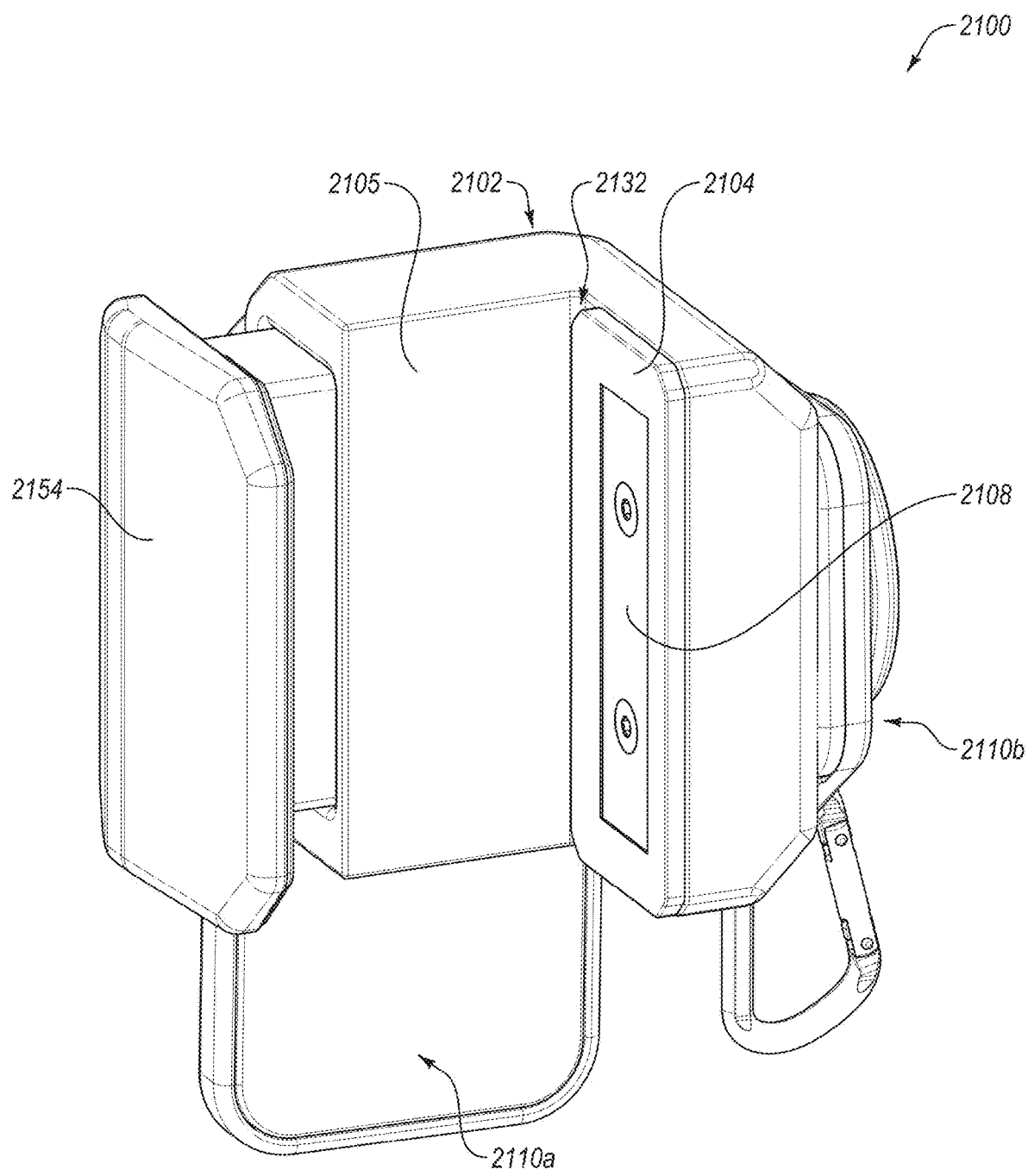
FIG. 64 is a rear perspective view of an exemplary attachment system illustrating an exemplary base and exemplary connectors.
Figure 65:
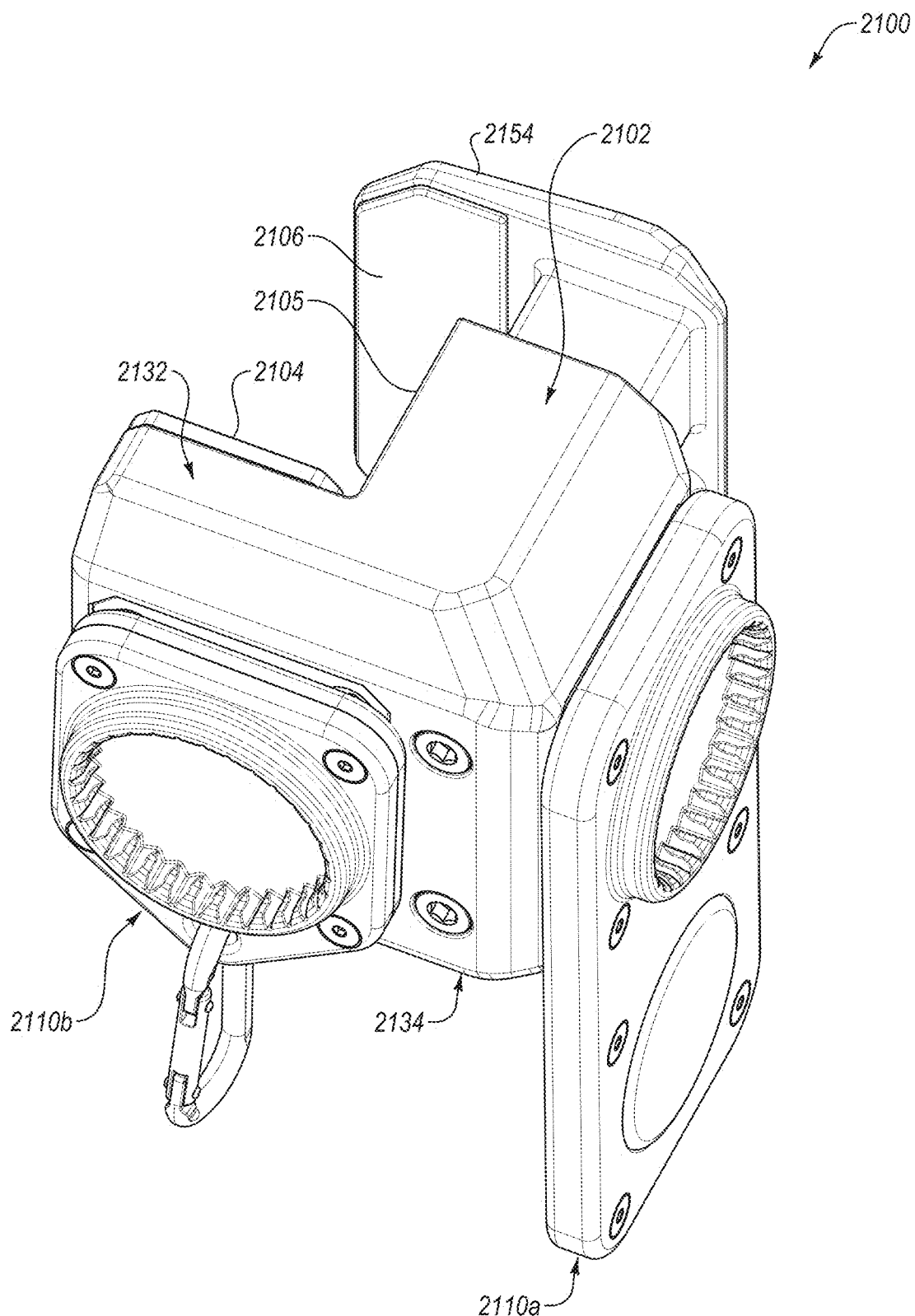
FIG. 65 is a front perspective view of the exemplary attachment system of FIG. 64.

After reviewing this disclosure, one skilled in the art may appreciate that the attachment system may include any suitable base, connectors, and/or accessories, and the base, connectors, and accessories may be adjustable depending upon the intended use of the attachment system. As shown in FIGS. 64-65, an exemplary attachment system 2100 may include a base 2102 and one or more connectors 2110. The base 2102 and/or the connectors 2110 may be similar to similar components and features described in this disclosure. For example, the base 2102 may include a first base portion 2132 with a first side 2104, a second side 2105, and a third side 2106 and a second base portion 2102 sized and configured to be attached to a first connector 2110a and/or a second connector 2110b.

The base 2102 may be adjustable in shape and/or size such that the base 2102 may be attached to mounting surfaces of different shapes and/or sizes. For example, the base 2102 may include a clamp 2154 that may be extended to provide a more secure fit between the base 2102 and the mounting surface and/or retracted to provide a more secure fit between the base 2102 and the mounting surface. In some embodiments, the base 2102 may include one or more magnets 2108. As shown in FIG. 64, the first side 2104 of the first base portion 2132 may include the one or more magnets 2108 and the clamp 2154 may form at least a portion of the second side 2105, and/or the third side 2106. In some embodiments, the adjustable clamp 2154 may include the one or more magnets 2108.

In an example operation, a user may adjust the attachment system 2100 depending on the shape and size of the mounting surface. For example, the user may adjust the attachment system 2100 to the size of a roll bar or roof support of a golf cart utilizing the clamp 2154. The base 2102 may be magnetically attached to the mounting surface. The clamp 2154 may be manipulated by the user to tighten the base 2102 against the mounting surface to provide a more secure fit between the base 2102 and the mounting surface. The clamp 2154 may be manipulated by the user to loosen the base 2102 from the mounting surface and the base 2102 may be removed.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. Unless otherwise described herein with respect to a particular element of the present disclosure, the terms "about," "approximately," and "substantially" may be interpreted as within 15% of actual value(s), target value(s), possible value(s), and predicted value(s).

In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used in the present disclosure to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations may be made hereto without departing from the spirit and scope of the present disclosure.

What is claimed is:

1. An attachment system comprising:
 a base including a first surface with one or more magnets, the first surface being sized and configured to attach the base to a mounting surface;
 one or more connectors, each connector of the one or more connectors comprising:

a first side including a first connector attachment portion; and a second side including a second connector attachment portion, the first connector attachment portion and the second connector attachment portion being engaged when the first side of the connector of the one or more connectors is connected to the second side of an adjacent connector;

wherein the first connector attachment portion of the connector of the one or more connectors and the second connector attachment portion of an adjacent second connector of the one or more connectors are engaged when the first connector and the second adjacent connector are disposed in a stacked configuration; and wherein the base is sized and configured to be attached to the connector of the one or more connectors.

2. The attachment system of claim 1, further comprising a second surface of the base, the second surface of the base including one or more magnets, the second surface being disposed at an angle relative to the first surface, the second surface being sized and configured to attach the base to the mounting surface.

3. The attachment system of claim 1, wherein the base further includes a base attachment portion, the base attachment portion sized and configured to be attached to the connector of the one or more connectors.

4. The attachment system of claim 3, wherein the connector of the one or more connectors is interchangeably connected to another connector of the one or more connectors; and
wherein the connector of the one or more connectors is interchangeably connected to the base attachment portion of the base.

5. The attachment system of claim 1, wherein an accessory is attached to the connector of the one or more connectors.

6. The attachment system of claim 1, wherein the connector of the one or more connectors is integrated with an accessory as part of a one-piece structure.

7. The attachment system of claim 3, wherein the base attachment portion is sized and configured to engage the first connector attachment portion when a connector of the one or more connectors is connected to the base.

8. The attachment system of claim 3, wherein the base attachment portion and the first connector attachment portion have corresponding generally ring-shaped structures.

9. The attachment system of claim 3, wherein the second connector attachment portion is sized and configured to engage the base attachment portion when a connector of the one or more connectors is connected to the base.

10. The attachment system of claim 9, wherein the base attachment portion and the second connector attachment portion have corresponding generally ring-shaped structures.

11. The attachment system of claim 3, wherein the first connector attachment portion includes an outwardly extending structure and the second connector attachment portion includes a corresponding inwardly extending structure;
wherein the base attachment portion includes an outwardly extending structure;
wherein the outwardly extending structure of the first connector attachment portion and the outwardly extending structure of the base attachment portion are compatible outwardly extending structures; and
wherein the outwardly extending structure of the first connector attachment portion and the outwardly extending structure of the base attachment portion are sized and configured to interchangeably receive the corresponding inwardly extending structure of the second connector attachment portion to facilitate interchangeable attachment of the base and the one or more connectors.

12. The attachment system of claim 1, wherein the connector of the one or more connectors includes a magnet at least partially disposed between the first connector attachment portion and the second connector attachment portion.

13. The attachment system of claim 1, wherein the connector of the one or more connectors includes a locking mechanism, the locking mechanism sized and configured to lock the connector to the base or another connector of the one or more connectors.

14. An attachment system comprising:
a base including an angled body, the angled body including a first portion disposed at an angle relative to a second portion to create the angled body, the base comprising:
a first base portion sized and configured to be releasably attached to a mounting surface; and
a second base portion including one or more base attachment portions, each base attachment portion of the one or more base attachment portions sized and configured to be releasably attached to an accessory.

15. The attachment system of claim 14, wherein the first base portion includes at least one magnet, the first base portion being magnetically attached to the mounting surface.

16. The attachment system of claim 14, wherein a base attachment portion of the one or more base attachment portions includes a magnet, the magnet being sized and configured to allow the accessory to be magnetically attached to the base attachment portion.

17. The attachment system of claim 14, wherein the first base portion includes at least one magnet;
wherein the second base portion includes at least one magnet;
wherein a magnetic field of the at least one magnet of the first base portion and a magnetic field of the at least one magnet of the second base portion cooperate to create a cumulative magnetic field;
wherein a connector is magnetically attached to a base attachment portion of the one or more base attachment portions, the connector sized and configured to facilitate releasable attachment of the accessory to the base attachment portion; and
wherein a magnetic field of the at least one magnet of the first base portion and a magnetic field of the connector cooperate to create a cumulative magnetic field.

18. The attachment system of claim 14, further comprising one or more connectors sized and configured to be magnetically attached to a base attachment portion of the one or more base attachment portions, a connector of the one or more connectors including a connector attachment portion configured to engage an engagement portion of the base attachment portion of the one or more base attachment portions when the connector is attached to the base attachment portion.

19. The attachment system of claim 14, wherein the first portion of the body of the base is disposed at a substantially right angle relative to the second portion of the body of the base;
wherein the first base portion is disposed on one side of the base and the second base portion is disposed on an opposing side of the base;

wherein the first base portion is at least partially disposed on the first portion of the base and the first base portion is at least partially disposed the second portion of the base; and wherein the first base portion includes one or more magnets.

20. An attachment system comprising:
a base comprising:
  a first base portion including a first magnetic structure and a second magnetic structure, the first magnetic structure and the second magnetic structure being spaced apart by a distance, the first magnetic structure and the second magnetic structure being disposed at an angle, the first magnetic structure and the second magnetic structure being sized and configured to allow the base to be magnetically attached to a support surface; and
  a second base portion including a first base attachment portion and a second base attachment portion, the first base attachment portion and the second base attachment portion being spaced apart by a distance, the first base attachment portion being sized and configured to allow a first connector to be magnetically attached to the base, the second base attachment portion being sized and configured to allow a second connector to be magnetically attached to the base;
  wherein a magnetic field of the first magnetic structure of the first base portion cooperates with a magnetic field of the first base attachment portion of the second base portion;
  wherein a magnetic field of the second magnetic structure of the first base portion cooperates with a magnetic field of the second base attachment portion of the second base portion;
  wherein, when a first connector is connected to the first base attachment portion, a magnetic field of the first connector cooperates with the magnetic field of the first magnetic structure of the first base portion and the magnetic field of the first base attachment portion; and
  wherein, when a second connector is connected to the second base attachment portion, a magnetic field of the second connector cooperates with the magnetic field of the second magnetic structure of the first base portion and the magnetic field of the second base attachment portion.

21. An attachment system comprising:
a base comprising:
  a first portion of the base sized and configured to be releasably attached to a mounting surface; and
  a second portion of the base including two or more base attachment portions, each base attachment portion of the two or more base attachment portions including a magnet sized and configured to allow an accessory to be attached to the base attachment portion.

22. The attachment system of claim 21, further comprising one or more connectors sized and configured to be connected to a base attachment portion of the two or more base attachment portions or another connector of the one or more connectors, each connector of the one or more connectors comprising;
  a first side including a first connector attachment portion; and
  a second side including a second connector attachment portion, the first connector attachment portion and the second connector attachment portion being engaged when the first side of a connector is connected to the second side of an adjacent connector
  wherein the connector is sized and configured to allow the accessory to be attached to the base attachment portion.

23. The attachment system of claim 22, wherein a base attachment portion of the two or more base attachment portions includes a magnet, the magnet being sized and configured to be magnetically attached to a connector of the one or more connectors.

24. The attachment system of claim 22, wherein the first base portion includes at least one magnet;
  wherein the second base portion includes at least one magnet;
  wherein a magnetic field of the at least one magnet of the first base portion and a magnetic field of the at least one magnet of the second base portion cooperate to create a cumulative magnetic field; and
  wherein a connector of the one or more connectors is sized and configured to be magnetically attached to a base attachment portion of the two or more base attachment portions.

25. The attachment system of claim 21, wherein the first base portion includes at least one magnet, the first base portion being magnetically attached to the mounting surface.

26. The attachment system of claim 21, wherein the first base portion includes a first surface with one or more magnets, the first surface being sized and configured to attach the base to a mounting surface; and
  wherein the first base portion includes a second surface with one or more magnets, the second surface being sized and configured to attach the base to a mounting surface, the first surface and the second surface being disposed at an angle.

* * * * *